United States Patent
Yang et al.

(10) Patent No.: US 11,375,540 B2
(45) Date of Patent: Jun. 28, 2022

(54) DATA TRANSMISSION AND RECEIVING METHOD AND APPARATUS, AND BASE STATION AND TERMINAL

(71) Applicant: XI'AN ZHONGXING NEW SOFTWARE CO., LTD., Shaanxi (CN)

(72) Inventors: Ling Yang, Shenzhen (CN); Yajun Zhao, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 139 days.

(21) Appl. No.: 16/335,448

(22) PCT Filed: Sep. 28, 2017

(86) PCT No.: PCT/CN2017/104076
§ 371 (c)(1),
(2) Date: Aug. 23, 2019

(87) PCT Pub. No.: WO2018/059512
PCT Pub. Date: Apr. 5, 2018

(65) Prior Publication Data
US 2019/0373635 A1    Dec. 5, 2019

(30) Foreign Application Priority Data

Sep. 30, 2016    (CN) .......................... 201610875407.8

(51) Int. Cl.
*H04W 74/08* (2009.01)
*H04B 7/0408* (2017.01)
*H04B 7/06* (2006.01)

(52) U.S. Cl.
CPC ...... *H04W 74/0808* (2013.01); *H04B 7/0408* (2013.01); *H04B 7/0617* (2013.01)

(58) Field of Classification Search
CPC .. H04B 7/0408; H04B 7/0617; H04B 7/0695; H04B 7/088; H04W 74/006; H04W 74/0808

See application file for complete search history.

(56) References Cited

U.S. PATENT DOCUMENTS 10,568,136 B2 *   2/2020   Chou .................... H04W 16/14
2010/0172296 A1   7/2010   Singh et al.
(Continued)

FOREIGN PATENT DOCUMENTS

CN   102007709 A   4/2011
CN   104185269 A   12/2014
(Continued)

OTHER PUBLICATIONS

Ericsson, "LBT model for LAA RRM testing," 3GPP TSG-RAN WG4 Meeting #79, R4-163467, Nanjing, China, May 23-27, 2016.
(Continued)

*Primary Examiner* — Wutchung Chu
(74) *Attorney, Agent, or Firm* — Foley & Lardner LLP

(57) ABSTRACT

Provided are a data transmission method and apparatus, a data receiving method and apparatus, a base station and a terminal. The method includes: acquiring predefined information; determining, according to the predefined information, whether to perform a listen-before-talk (LBT) mechanism before transmission; and when LBT indication information is carried in the predefined information, performing the LBT mechanism before a transmission device performs transmission according to a predetermined transmission mode, or when the LBT indication information is not carried in the predefined information, performing a predetermined non-LBT processing operation before the transmission device performs the transmission according to the predetermined transmission mode. By means of the above steps, the signals in the beamforming system are (Continued)

separately processed by performing the LBT mechanism or performing the predetermined non-LBT processing operation, which effectively solves the low signal transmission efficiency problem of the beamforming system.

18 Claims, 10 Drawing Sheets

(56) References Cited

U.S. PATENT DOCUMENTS

| | | | | |
|---|---|---|---|---|
| 2011/0128948 A1* | 6/2011 | Jeon | .................... | H04W 74/002 370/338 |
| 2011/0263207 A1* | 10/2011 | Tijink | .................. | G07B 15/063 455/66.1 |
| 2015/0365973 A1* | 12/2015 | Choi | ................... | H04W 74/006 370/336 |
| 2016/0081010 A1* | 3/2016 | Seok | ................. | H04W 72/0453 370/329 |
| 2016/0119902 A1* | 4/2016 | Cheong | ............... | H04B 17/309 370/329 |
| 2016/0174206 A1* | 6/2016 | Xia | ......................... | H04B 7/063 370/329 |
| 2016/0192395 A1* | 6/2016 | Yoo | ..................... | H04B 7/0874 370/329 |
| 2016/0262188 A1* | 9/2016 | Zhang | .................. | H04J 11/0056 |
| 2016/0285611 A1* | 9/2016 | Fischer | ............... | H04W 72/082 |
| 2016/0353467 A1* | 12/2016 | Nekovee | ............. | H04B 7/0695 |
| 2017/0142742 A1* | 5/2017 | Fischer | ................ | H04W 24/02 |
| 2017/0142746 A1* | 5/2017 | Koorapaty | ............ | H04W 36/08 |
| 2017/0303136 A1* | 10/2017 | Park | .................. | H04W 74/0808 |
| 2017/0331577 A1* | 11/2017 | Parkvall | ................ | H04L 5/1469 |
| 2017/0332368 A1* | 11/2017 | Einhaus | ................ | H04B 7/0608 |
| 2018/0054382 A1* | 2/2018 | Luo | ........................ | H04L 12/185 |
| 2018/0054832 A1* | 2/2018 | Luo | ....................... | H04B 17/318 |
| 2018/0213561 A1* | 7/2018 | Bhorkar | .................. | H04L 5/005 |
| 2018/0213571 A1* | 7/2018 | Wang | ................ | H04W 74/0833 |
| 2018/0235008 A1* | 8/2018 | Park | ....................... | H04W 16/28 |
| 2018/0372830 A1* | 12/2018 | Schuehler | ............. | G01S 13/886 |
| 2019/0116616 A1* | 4/2019 | Si | ....................... | H04W 72/1289 |
| 2019/0124690 A1* | 4/2019 | Siomina | ............ | H04W 72/0453 |
| 2019/0166563 A1* | 5/2019 | Ansari | .................. | H04B 7/0617 |
| 2019/0200389 A1* | 6/2019 | Li | ......................... | H04B 7/0695 |
| 2019/0268939 A1* | 8/2019 | Yang | ..................... | H04W 74/08 |

FOREIGN PATENT DOCUMENTS

| | | | | |
|---|---|---|---|---|
| CN | 104639228 A | 5/2015 | | |
| CN | 105592478 A | 5/2016 | | |
| CN | 105611540 A | 5/2016 | | |
| CN | 105611637 A | 5/2016 | | |
| WO | WO-2017028899 A1 * | 2/2017 | ........ | H04W 72/0453 |

OTHER PUBLICATIONS

International Search Report and Written Opinion for Int. Appl. No. PCT/CN2017/104076, dated Jan. 4, 2018.

First Office Action for CN Appl. No. 201610875407.8, dated Mar. 18, 2022.

First Search Report on CN Appl. No. 201610875407.8, dated Mar. 11, 2022.

* cited by examiner

DATA TRANSMISSION AND RECEIVING METHOD AND APPARATUS, AND BASE STATION AND TERMINAL

CROSS-REFERENCE TO RELATED APPLICATIONS

This is a U.S. National Stage Application, under 35 U.S.C. 371, of International Patent Application No. PCT/CN2017/104076, filed on Sep. 28, 2017, which claims priority to Chinese Patent Application No. 201610875407.8 filed on Sep. 30, 2016, the contents of both of which are incorporated herein by reference in their entireties.

TECHNICAL FIELD

The present application relates to the field of communications, for example, relates to a data transmission method and apparatus, a data receiving method and apparatus, a base station and a terminal.

BACKGROUND

The rapid development of mobile Internet and the Internet of Things has provoked the explosive growth of data traffic and the extensive rise of diversified and differentiated services. Compared with the 4th (4G) generation mobile communication technology, the 5th generation (5G) mobile communication technology, as a new generation mobile communication technology, will support a higher rate, massive link (such as one million links per square kilometer), ultra-low latency (such as 1 ms), higher reliability, and hundredfold energy efficiency improvement to support the new requirement changes. The 5G study item (SI) aims to determine and meet design requirements of key technologies of a new radio (NR) system within any spectrum bandwidth range (at least 100 GHz), and support the NR to operate on licensed spectrum, unlicensed spectrum (such as the 5 GHz frequency band and the 60 GHz frequency band) and shared spectrum (such as the potential 37 GHz frequency band and the 3.5 GHz frequency band in the United States). Unlicensed spectrum may be used for transmitting the data traffic in the licensed spectrum. Based on this, unlicensed spectrum will become an important research topic in the future 5G standardization process.

In the Rel-13 and Rel-14 licensed assisted access (LAA), listen-before-talk (LBT) is recognized as the basis of the coexistence mechanism. At the same time, from the perspective of coexistence of LAA and Wi-Fi, energy detection (ED)-based LBT is proved to be an effective channel access mechanism. For a high-frequency (i.e., millimeter wave frequency band) scenario in NR, the downlink/uplink adopts a directional transmission manner such that the signal energy is concentrated in a certain beam range, which can compensate for a large path loss. However, the ED-based LBT mechanism designed for LAA channel access in the Rel-13 and Rel-14 does not take into account cases of the directional transmission of the uplink and downlink. For example, in a case 1: an LBT result of a device when the receiver and the transmitter do not use beamforming is not taken into account. A BS1 performs transmission to a UE1, and a BS2 performs transmission to a UE2. The BS1 and the BS2 are within the energy detection range of each other. It is assumed BS1 performs a clear channel assessment (CCA) before transmitting data to UE1, and the BS1 transmits data to UE1 upon detecting that a channel is idle. The BS2 senses the transmission of the BS1 when the BS2 performs CCA detection, so the BS2 considers that the channel is busy and does not transmit information to the UE2. For the case 1, since the signal is sent in the omnidirectional manner, a node located around the transmitter may sense the energy of signal transmission by surrounding nodes, and then determines that the channel is unavailable, and performs no transmission. This ED-based LBT manner is applicable to low-frequency scenarios. However, for high-frequency scenarios and to compensate for channel fading and path loss, the directional transmission manner needs to be used, and the LBT mechanism in the related art is no longer applicable to high-frequency scenarios. In a case 2, if the transmitter performs transmission in a manner of beamforming, when the BS2 performs channel contention access according to the relevant ED-LBT mechanism, the energy of the BS1 is not detected, and the BS2 transmits information to the UE2. At this time, if both the UE1 and the UE2 are within the coverage ranges of the BS1 and the BS2, neither UE1 nor UE2 can correctly receive their respective information since inter-RAT interference depends on whether the transmitter and/or the receiver supports beamforming.

Therefore, a low signal transmission efficiency problem of the beamforming system exists in the related art.

SUMMARY

Embodiments of the present disclosure provide a data transmission method and apparatus, a data receiving method and apparatus, a base station and a terminal to at least solve the inefficient signal transmission problem in the beamforming system in the related art.

According to an embodiment of the present disclosure, a data transmission method is provided. The method includes: acquiring predefined information; determining, according to the predefined information, whether to perform a listen-before-talk (LBT) mechanism before transmission; and when LBT indication information is carried in the predefined information, performing the LBT mechanism before a transmission device performs transmission according to a predetermined transmission mode; or when the LBT indication information is not carried in the predefined information, performing a predetermined non-LBT processing operation before the transmission device performs the transmission according to the predetermined transmission mode.

Alternatively, the predetermined transmission mode includes: an omnidirectional mode or a directional mode.

Alternatively, the directional mode includes at least one of: a directional transmit beam; and a directional receive beam.

Alternatively, for one transmission device, a relationship between the directional transmit beam and the directional receive beam includes: the directional transmit beam being the same as the directional receive beam; or the directional transmit beam being different from the directional receive beam; or the directional transmit beam partially overlapping the directional receive beam.

Alternatively, the relationship between the directional transmit beam and the directional receive beam is determined in at least one of the following manners: predefinition; pre-agreement between a base station and a user equipment (UE); indication through physical layer downlink control information (DCI) signaling; or configuration through higher-layer radio resource control (RRC) signaling.

Alternatively, in a case where the transmission device performs transmission according to the directional mode, performing the LBT mechanism before performing the transmission according to the directional mode includes: determining signal energy received by the transmission device in a directional beam; comparing the signal energy received in the directional beam with a predetermined threshold value; and determining, based on the comparison result, a busy/idle state of a channel in the directional beam.

Alternatively, determining the signal energy received by the transmission device in the directional beam includes: the signal energy received by the transmission device in a beam range being equal to a norm of a value, where the value is a product of a beamforming weight of the transmission device and a sum of signals received in the beam range by the transmission device from surrounding devices. Alternatively, the signal energy received by the transmission device in the beam range being equal to a norm of a value, where the value is an accumulated sum of the signals received by the transmission device in the beam range from all of the surrounding devices. Alternatively, the signal energy received by the transmission device in the beam range being equal to $\|V^*(H_1^*X_1+H_2^*X_2+ \ldots +H_n^*X_n)\|$ or $\|V^*H_1^*X_1+V^*H_2^*X_2+ \ldots V^*H_n^*X_n\|$ where V denotes the beamforming weight, $H_1, H_2, \ldots, H_n$ each denote a channel matrix between the transmission device and one of the surrounding devices, $X_1, X_2, \ldots, X_n$ each denote a transmit signal vector of one of the surrounding devices of the transmission device, * denotes a product operator, $\|\ \|$ denotes a norm operator, n is the number of the surrounding devices of the transmission device, $H_i^*X_i$ denotes a signal sent by an i-th surrounding device and received by the transmission device, and $V^*H_i^*X_i$ denotes a signal sent by the i-th surrounding device and received by the transmission device in the beam range. Alternatively, the signal energy received by the transmission device in the beam range being equal to an accumulated sum of signal energy received from all of the surrounding devices by the transmission device in the beam range; or the signal energy received by the transmission device in the beam range being equal to $\|V^*H_1^*X_1\|+\|V^*H_2^*X_2\|+ \ldots +\|V^*H_n^*X_n\|$.

V denotes the beamforming weight, $H_1, H_2, \ldots, H_n$ each denote a channel matrix between the transmission device and one of the surrounding devices, $X_1, X_2, \ldots, X_n$ each denote a transmit signal vector of one of the surrounding devices of the transmission device, * denotes a product operator, $\|\ \|$ denotes a norm operator, n is the number of the surrounding devices of the transmission device, $H_i^*X_i$ denotes the signal sent by the i-th surrounding device and received by the transmission device, and $V^*H_i^*X_i$ denotes the signal sent by the i-th surrounding device and received by the transmission device in the beam range.

Alternatively, determining the busy/idle state of the channel in the directional beam includes: in a case of the signal energy received in the directional beam being not greater than the predetermined threshold value, determining that the channel in the directional beam is idle; or in a case of the signal energy received in the directional beam being greater than the predetermined threshold value, determining that the channel in the directional beam is busy.

Alternatively, a case where the transmission device performs transmission by using a plurality of directional beams includes: determining, according to signal energy received in each of the plurality of directional beams, busy/idle states of channels on the plurality of directional beams or busy/idle states of channels in a beam region formed by the plurality of directional beams.

Alternatively, determining, according to the signal energy received in the each of the plurality of directional beams, the busy/idle state of the channel on each of the plurality of directional beams or the busy/idle states of the channels in the beam region formed by the plurality of directional beams includes: if the LBT is successfully performed on at least one of the plurality of directional beams, determining that the plurality of directional beams are available or that the channels are idle, and performing transmission only on the directional beam on which the LBT is successfully performed; or if the LBT is successfully performed on all of the plurality of directional beams, determining that the plurality of directional beams are available or that the channels are idle; or if the LBT fails to be performed on at least one of the plurality of directional beams, determining that the plurality of directional beams are not available or that the channels are busy; or if a number of directional beams, among the plurality of directional beams, on which the LBT is successfully performed reaches a predetermined threshold value, determining that the plurality of directional beams are available or that the channels are idle, and performing transmission only on the directional beam on which the LBT is successfully performed; or if a number of directional beams, among the plurality of directional beams, on which the LBT fails to be performed reaches a predetermined threshold value, determining that the plurality of directional beams are not available or that the channels are busy.

Alternatively, a case where the transmission device performs transmission by using a plurality of directional beams includes: determining, according to a sum of signal energy received in each of the plurality of directional beams, busy/idle states of channels on the plurality of directional beams or busy/idle states of channels in a beam region formed by the plurality of directional beams.

Alternatively, in a case where the plurality of directional beams belong to a same antenna element or antenna port, a method for calculating the signal energy received in the beam region formed by the plurality of directional beams includes: signal energy received in the beam region formed by the plurality of directional beams is equal to an accumulated sum of signal energy received by the transmission device in a first beam, signal energy received by the transmission device in a second beam, . . . and signal energy received by the transmission device in an m-th beam. Alternatively, the signal energy received in the beam region formed by the plurality of directional beams is equal to $\|V^1{}^*(H_1^*X_1+H_2^*X_2+ \ldots +H_n^*X_n)\|+\|V^2{}^*(H_1^*X_1+H_2^*X_2+ \ldots +H_n^*X_n)\|+ \ldots \|V^m{}^*(H_1^*X_1+H_2^*X_2+ \ldots +H_n^*X_n)\|$, where $V^1, V^2, \ldots, V^m$ denote beamforming weights of m beams, $H_1, H_2, \ldots, H_n$ each denote the channel matrix between the transmission device and the surrounding device, $X_1, X_2, \ldots, X_n$ each denote the transmit signal vector of the surrounding device of the transmission device, * denotes the product operator, $\|\ \|$ denotes the norm operator, n is the number of surrounding devices of the transmission device, m is the number of directional beams transmitted by the transmission device, $H_j^*X_j$ denotes a signal sent by a j-th surrounding device and received by the transmission device, $V^{i*}H_j^*X_j$ denotes a signal sent by the j-th surrounding device and received by the transmission device in an i-th beam range, and $V^{i*}(H_1^*X_1+H_2^*X_2+ \ldots +H_n^*X_n)$ denotes signals sent by the surrounding devices and received in the i-th beam. Alternatively, the signal energy received in the beam region formed by the plurality of directional beams is equal to a norm of a value, wherein the value is the accumulated sum of the signal energy received by the transmission device in the first beam, the signal energy received by the transmission device in the second beam, . . . and the signal energy received by the transmission device in the m-th beam. Alternatively, the signal energy received in the beam region formed by the plurality of directional beams being equal to $\|V^1*(H_1*X_1+H_2*X_2+ \ldots +H_n*X_n)+V^2*(H_1*X_1+H_2*X_2+ \ldots +H_n*X_n)+ \ldots +V^m*(H_1*X_1+H_2*X_2+ \ldots +H_n*X_n)\|$. $V^1, V^2, \ldots, V^m$ denote beamforming weights of m beams, $H_1, H_2, \ldots, H_n$ each denote the channel matrix between the transmission device and the surrounding device, $X_1, X_2, \ldots, X_n$ each denote the transmit signal vector of the surrounding device of the transmission device, * denotes the product operator, $\| \|$ denotes the norm operator, n is the number of surrounding devices of the transmission device, m is the number of directional beams transmitted by the transmission device, $H_j*X_j$ denotes a signal sent by the j-th surrounding device and received by the transmission device, $V^{i*}H_j*X_j$ denotes a signal sent by the j-th surrounding device and received by the transmission device in an i-th beam range, and $V^{i*}(H_1*X_1+H_2*X_2+ \ldots +H_n*X_n)$ denotes signals sent by the surrounding devices and received in the i-th beam.

Alternatively, in a case where the plurality of directional beams belong to different antenna elements or antenna ports, a method for calculating signal energy received in the beam region formed by the plurality of directional beams includes: signal energy received in the beam region formed by the plurality of directional beams is equal to an accumulated sum of signal energy received by the transmission device in a first beam, signal energy received by the transmission device in a second beam, . . . and signal energy received by the transmission device in an m-th beam.

Alternatively, the signal energy received in the beam region formed by the plurality of directional beams is equal to $\|V^{1*}(H_1^1*X_1+H_2^1*X_2+ \ldots +H_n^1*X_n)\|+\|V^{2*}(H_1^2*X_1+H_2^2*X_2+ \ldots +H_n^2*X_n)\|+ \ldots \|V^{m*}(H_1^m*X_1+H_2^m*X_2+ \ldots +H_n^m*X_n)\|$. $V^1, V^2, \ldots, V^m$ denote beamforming weights of m beams, $H_1^i, H_2^i, \ldots, H_n^i$ each denote the channel matrix between the transmission device and one of the n surrounding devices on the i-th beam, $X_1, X_2, \ldots, X_n$ each denote the transmit signal vector of the surrounding device of the transmission device, $H_j^i*X_j$ denotes a signal sent by a j-th surrounding device and received by the transmission device, $V^{i*}H_j^i*X_j$ denotes a signal sent by the j-th surrounding device and received by the transmission device in the i-th beam range, $V^{i*}(H_1^i*X_1+H_2^i*X_2+ \ldots +H_n^i*X_n)$ denotes signals sent by n surrounding devices and received by the transmission device in the i-th beam range, $\|V^{i*}(H_1^i*X_1+H_2^i*X_2+ \ldots +H_n^i*X_n)\|$ denotes signal energies received by the transmission device in the i-th beam range from n surrounding devices, * denotes the product operator, $\| \|$ denotes the norm operator, n is the number of surrounding devices of the transmission device, m is the number of beams. Alternatively, the signal energy received in the beam region formed by the plurality of directional beams is equal to a norm of the accumulated sum of the signal energy received by the transmission device in the first beam, the signal energy received by the transmission device in the second beam, . . . and the signal energy received by the transmission device in the m-th beam. Alternatively, the signal energy received in the beam region formed by the plurality of directional beams is equal to $\|V^{1*}(H_1*X_1+H_2*X_2+ \ldots +H_n*X_n)+V^{2*}(H_1^2*X_1+H_2^2*X_2+ \ldots +H_n^2*X_n)+ \ldots +V^{m*}(H_1^m*X_1+H_2^m*X_2+ \ldots +H_n^m*X_n)\|$. $V^1, V^2, \ldots, V^m$ denote beamforming weights of m beams, $H_1^i, H_2^i, \ldots, H_n^i$ each denote the channel matrix on the i-th beam between the transmission device and one of the n surrounding devices, $X_1, X_2, \ldots, X_n$ each denote the transmit signal vector of the surrounding device of the transmission device, $H_j^i*X_j$ denotes a signal sent by the j-th surrounding device and received by the transmission device, $V^{i*}H_j^i*X_j$ denotes a signal sent by the j-th surrounding device and received by the transmission device in the i-th beam range, $V^{i*}(H_1^i*X_1+H_2^i*X_2+ \ldots +H_n^i*X_n)$ denotes signals sent by n surrounding devices and received by the transmission device in the i-th beam range, * denotes the product operator, $\| \|$ denotes the norm operator, n is the number of surrounding devices of the transmission device, m is the number of beams. The signal energy received in the beam region formed by the plurality of directional beams is equal to an accumulated sum of signal energies sent by n1 surrounding devices and received by the transmission device in the first beam, signal energies sent by n2 surrounding devices and received by the transmission device in the second beam, . . . and signal energies sent by nn surrounding devices and received by the transmission device in the m-th beam. Alternatively, the signal energy received in the beam region formed by the plurality of directional beams is equal to $\|V^{1*}(H_1^1*X_1^1+H_2^1*X_2^1+ \ldots +H_{n1}^1*X_{n1}^1)\|+\|V^{2*}(H_1^2*X_1^2+H_2^2*X_2^2+ \ldots +H_{n2}^2*X_{n2}^2)\|+ \ldots \|V^{m*}(H_1^m*X_1^m+H_2^m*X_2^m+ \ldots +H_{nn}^m*X_{nn}^m)\|$. $V^1, V^2, \ldots, V^m$ denote beamforming weights of m beams, $H_1^i, H_2^i, \ldots, H_{nj}^i$ each denote the channel matrix between the transmission device and one of the nj surrounding devices on the i-th beam, $X_1^i, X_2^i, \ldots, X_{nj}^i$ denote the transmit signal vectors of the nj surrounding devices of the transmission device on the i-th beam, $H_{nj}^i*X_{nj}^i$ denotes a signal sent by a nj-th surrounding device and received by the transmission device, $V^{i*}H_{nj}^i*X_{nj}^i$ denote a signal sent by the nj-th surrounding device and received by the transmission device in the i-th beam range, $V^{i*}(H_1^i*X_1^i+H_2^i*X_2^i+ \ldots +H_{nj}^i*X_{nj}^i)$ denotes signals sent by the nj surrounding devices and received by the transmission device in the i-th beam range, $\|V^{i*}(H_1^i*X_1^i+H_2^i*X_2^i+ \ldots +H_{nj}^i*X_{nj}^i)\|$ denotes signal energy sent by the nj surrounding devices and received by the transmission device in the i-th beam range, * denotes the product operator, $\| \|$ denotes the norm operator, nj is the number of surrounding devices of the transmission device, m is the number of beams. Alternatively, the signal energy received in the beam region formed by the plurality of directional beams being equal to a norm of an accumulated sum of signals sent by the n1 surrounding devices and received by the transmission device in the first beam, signals sent by the n2 surrounding devices and received by the transmission device in the second beam, . . . and signals sent by the nn surrounding devices and received by the transmission device in the m-th beam. Alternatively, the signal energy received in the beam region formed by the plurality of directional beams being equal to $\|V^{1*}(H_1^1*X_1^1+H_2^1*X_2^1+ \ldots +H_{n1}^1*X_{n1}^1)+V^{2*}(H_1^2*X_1^2+H_2^2*X_2^2+ \ldots +H_{n1}^2*X_{n1}^2)+ \ldots +V^{m*}(H_1^m*X_1^m+H_2^m*X_2^m+ \ldots +H_{nn}^m*X_{nn}^m)\|$. $V^1, V^2, \ldots, V^m$ denote beamforming weights of m beams, $H_1^i, H_2^i, \ldots, H_{nj}^i$ each denote the channel matrix between the transmission device and one of the nj surrounding devices on the i-th beam, $X_1^i, X_2^i, \ldots, X_{nj}^i$ denote the transmit signal vectors of the nj surrounding devices of the transmission device on the i-th beam, $H_{nj}^i*X_{nj}^i$ denotes a signal sent by a nj-th surrounding device and received by the transmission device, $V^{i*}H_{nj}^i*X_{nj}^i$ denotes a signal sent by the nj-th surrounding device and received by the transmission device in the i-th beam range, $V^{i*}(H_1^i*X_1^i+H_2^i*X_2^i+ \ldots +H_{nj}^i*X_{nj}^i)$ denotes signals sent by the nj surrounding devices and received by the transmission device in the i-th beam range, * denotes the product operator, $\| \|$ denotes the norm operator, nj is the number of the surrounding devices of the transmission device, m is the number of beams. Alternatively, the signal energy received in the beam region formed by the plurality of directional beams being equal to a norm of an accumulated sum of signals sent by the n surrounding devices and received by the transmission device in the first beam, signals sent by the n surrounding devices and received by the transmission device in the second beam, . . . and signals sent by the n surrounding devices and received by the transmission device in the m-th beam. Alternatively, the signal energy received in the beam region formed by the plurality of directional beams being equal to $\|V^{1*}(H_1^{1*}X_1^{1}+H_2^{1*}X_2^{1}+ \ldots +H_n^{1*}X_n^{1})+V^{2*}(H_1^{2*}X_1^{2}+H_2^{2*}X_2^{2}+ \ldots +H_n^{2*}X_n^{2})+ \ldots +V^{m*}(H_1^{m*}X_1^{m}+H_2^{m*}X_2^{m}+ \ldots +H_n^{m*}X_n^{m})\|$. $V^1, V^2, \ldots, V^m$ denote beamforming weights of m beams, $H_1^i, H_2^i, \ldots, H_n^i$ each denote the channel matrix between the transmission device and one of the surrounding devices on the i-th beam, $X_1^i, X_2^i, \ldots, X_n^i$ denote the transmit signal vectors of the surrounding devices of the transmission device on the i-th beam, * denotes the product operator, $\| \|$ denotes the norm operator, n is the number of surrounding devices of the transmission device, m is the number of beams, i is a positive integer within [1, m], $H_j^{i*}X_j^i$ denotes a signal sent by the j-th surrounding device and received by the transmission device on the i-th beam, and $V^{i*}H_j^{i*}X_j^i$ is the signal sent by the j-th surrounding device and received by the transmission device in the i-th beam range.

Alternatively, the beamforming weight includes: a transmit beamforming weight of the transmission device; or a receive beamforming weight of the transmission device.

Alternatively, the transmit beamforming weight and/or the receive beamforming weight are determined in one of following manners: in a manner of predefinition; in a manner of configuration by a base station; in a manner of configuration by a user equipment (UE); in a manner of pre-agreement between the base station and the UE; in a manner of indication through physical layer downlink control information (DCI) signaling; or in a manner of performing singular value decomposition (SVD) on a channel matrix H between a transmitting device and a receiving device.

Alternatively, a case where the transmission device performs transmission by using a plurality of directional beams includes: determining channel conditions of the plurality of directional beams according to signal energy received in a beam region formed by the plurality of directional beams.

Alternatively, calculation of the signal energy received in the beam region formed by the plurality of directional beams includes: the signal energy received in the beam region formed by the plurality of directional beams is equal to a norm of a value, where the value is a product of a sum of signals received from surrounding devices of the transmission device and a beamforming weight formed by the plurality of directional beams.

Alternatively, the method includes: when signal energy received in a beam coverage range formed by the plurality of directional beams is not greater than a predetermined threshold value, determining that channels in a beam formed by the plurality of directional beams are idle or that channels in the plurality of directional beams are idle; or when the signal energy received in the beam coverage range formed by the plurality of directional beams is greater than the predetermined threshold value, determining that the channels in the beam formed by the plurality of directional beams are busy or that the channels in the plurality of directional beams are busy.

Alternatively, a case where the channels in the beams are detected to be busy includes: performing, by the transmission device, an LBT detection on a finer directional beam in the directional beam on which the LBT fails to be performed; or performing, by the transmission device, the LBT detection on directional beams other than the directional beams on which the LBT fails to be performed.

Alternatively, a case where the transmission device performs the LBT mechanism on a plurality of directional beams includes: performing Cat2 LBT simultaneously on the plurality of directional beams; or performing Cat4 LBT on a main directional beam of the plurality of directional beams, and when the LBT process is about to be completed, starting performing the Cat2 LBT on other directional beams; or performing the Cat4 LBT on the plurality of directional beams.

Alternatively, the main directional beam of the plurality of directional beams is determined in one of following manners: determination by a base station, determination by a user equipment (UE), determination by the base station and the UE, predefinition, indication through physical layer downlink control information (DCI) signaling, or indication through higher-layer radio resource control (RRC) signaling.

Alternatively, when performing the Cat4 LBT on the plurality of directional beams, the method includes: respectively generating a random backoff value N on each of the plurality of directional beams; or using the same random backoff value N for the plurality of directional beams.

Alternatively, the method includes: performing a Cat2 LBT mechanism on a directional beam or using Cat2 LBT having a shorter detection duration in a transmission period, a channel occupancy time, or a beam group; or performing the Cat2 LBT mechanism, a Cat4 LBT mechanism, Cat4 LBT corresponding to a predetermined priority level, or Cat3 LBT on a directional beam outside the transmission period, the channel occupancy time, or the beam group; or performing the Cat4 LBT mechanism, the Cat4 LBT corresponding to the predetermined priority level, or the Cat3 LBT on a directional beam in the transmission period, or the channel occupancy time, or an initial beam group.

Alternatively, the predetermined priority level or an LBT mechanism used for the directional beam is determined in one of following manners: pre-agreement between a base station and a user equipment (UE); predefinition; indication through physical layer downlink control information (DCI) signaling by the base station; or indication through higher-layer radio resource control (RRC) signaling.

Alternatively, the method includes: performing a same LBT mechanism or different LBT mechanisms on directional beams in different beam groups or different channel occupancy times or different transmission periods.

Alternatively, the predefined information includes at least one of: a transmission mode, indication signaling, an information type, frame structure information, a beam identifier (ID), a beamforming weight, a beam type, a beam pattern, a threshold value, an LBT mechanism indication, a time domain resource, a corresponding relationship between the time domain resource and a beam, a frequency domain resource, a frequency domain hopping manner, a channel reciprocity indication, data, a beam switching indication, or a transmission mode switching indication.

Alternatively, the indication signaling includes at least one of: physical layer downlink control information (DCI) signaling, or higher-layer radio resource control (RRC) signaling.

Alternatively, the information type includes at least one of: control information, data, a reference signal, or a traffic type.

Alternatively, the beam type includes: a single-beam type and a multi-beam type.

Alternatively, the predefined information is determined in at least one of following manners: predefinition, pre-agreement between a base station and a user equipment (UE), indication through physical layer downlink control information (DCI) signaling, or configuration through higher-layer radio resource control (RRC) signaling.

Alternatively, performing the predetermined non-LBT processing operation includes one of the following: performing directional beam randomization; processing using directional beam pattern; performing frequency domain frequency hopping; or processing using semi-statically configured directional beam.

Alternatively, performing the directional beam randomization, processing using the directional beam pattern, or performing spectrum frequency hopping includes: determining a transmission beam, a transmission beam pattern, or a frequency domain hopping position according to a fixed rule; or determining the transmission beam, the transmission beam pattern, or the frequency domain hopping position in a random manner.

Alternatively, determining the transmission beam, the transmission beam pattern, or the frequency domain hopping position according to the fixed rule includes: determining the transmission beam according to beam indexes a decreasing order of beam index; or determining the transmission beam pattern according to a decreasing order of beam pattern index; or determining the frequency domain hopping position according to a decreasing order of frequency domain position index; or determining the transmission beam according to an increasing order of beam index; or determining the transmission beam pattern according to an increasing order of beam pattern index; or determining the frequency domain hopping position according to an increasing order of frequency domain position; or determining the transmission beam according to at least one of beams with even indexes/beams with odd indexes; or determining the transmission beam pattern according to at least one of beam patterns with even indexes/beam patterns with odd indexes; or determining the frequency domain hopping position according to at least one of frequency domain positions with even indexes/frequency domain positions with odd indexes; or determining the transmission beam according to beams with even indexes and an increasing order or a decreasing order or according to beams with odd indexes and in the increasing order or the decreasing order; or determining the transmission beam pattern according to beam patterns with even indexes and an increasing order or a decreasing order or according to beam patterns with odd indexes and in the increasing order or the decreasing order; or determining the frequency domain hopping position according to frequency domain positions with even indexes and an increasing order or a decreasing order or according to frequency domain positions with odd indexes and in the increasing order or the decreasing order; or determining, from a plurality of beams, a beam as the transmission beam, where the index of the beam in the plurality of beams modulo an offset is equal to M; or determining, from a plurality of beam patterns, a beam pattern as the transmission beam pattern, where the index of the beam pattern in the plurality of beam patterns modulo an offset is equal to M; or determining a spectrum resource whose frequency domain index modulo an offset being equal to M as the frequency domain hopping position; or indicating, through physical layer downlink control information (DCI) signaling, the beam index, the beam pattern, a frequency domain index in a frequency domain resource, the offset in the beam, an offset in a beam pattern set, or an offset in the frequency domain resource used by the transmission device; or indicating, through higher-layer radio resource control (RRC) signaling, the beam index, the beam pattern, the frequency domain index in the frequency domain resource, the offset in the beam, the offset in the beam pattern set, or the offset in the frequency domain resource used by the transmission device.

Alternatively, indicating, through the physical layer DCI signaling or the higher-layer RRC signaling, the transmission beam, the beam pattern or the frequency domain hopping position includes: determining the transmission beam, the beam pattern or the frequency domain hopping position through a value corresponding to the number of bits of bit information; determining the transmission beam, the beam pattern or the frequency domain hopping position through a bitmap; or determining the transmission beam, the beam pattern or the frequency domain hopping position through a beam indication field or a frequency hopping indication field.

Alternatively, the fixed rule, the offset or M is determined in one of following manners: predefinition; pre-agreement between a base station and a user equipment (UE); indication through the physical layer DCI signaling; or configuration through the higher-layer RRC signaling.

Alternatively, determining the transmission beam, the transmission beam pattern, or the frequency domain staring position of frequency hopping in the random manner comprises: generating a positive integer within [1, p] or [0, p−1] in a manner of a random sequence or in a manner of a random function; wherein p is a number of beams or a number of frequency domain resources.

Alternatively, the random function includes: a uniform distribution function; a binomial distribution function; or a normal distribution function.

Alternatively, the fixed rule and/or the random manner are determined in one of following manners: predefinition; pre-agreement between a base station and a user equipment (UE); indication through physical layer downlink control information (DCI) signaling; or configuration through higher-layer radio resource control (RRC) signaling.

Alternatively, processing using the semi-statically configured directional beam comprises: in a predetermined period, measuring a configured directional beam or a beam in a directional beam set, and determining, based on measurement information, whether to perform a directional beam switching operation.

Alternatively, a criterion for determining directional beam switching includes: performing the directional beam switching operation when a load, an interference value, or an information transmission error probability on a current transmission beam in the predetermined period is measured to be greater than a predetermined threshold value; or not performing the directional beam switching operation when the load, the interference value, or the information transmission error probability on the current transmission beam in the predetermined period is measured to be not greater than the predetermined threshold value.

Alternatively, Cat2 LBT, or Cat2 LBT having a shorter detection duration, or Cat4 LBT corresponding to a predetermined priority level, is performed on a beam having a larger load, interference value, or information transmission error probability.

Alternatively, the predetermined priority level is determined through at least one of: a traffic type; indication through physical layer downlink control information (DCI) signaling; predefinition; different signals; different channels; or different beams.

Alternatively, a channel occupation duration of a beam having a smaller load, interference value, or information transmission error probability is adjusted.

Alternatively, a measurement quantity to be measured includes: a received signal strength indication (RSSI); reference signal receiving power (RSRP); reference signal receiving quality (RSRQ); or acknowledgement (ACK)/negative acknowledgement (NACK) feedback information.

In another aspect of the present disclosure, a data receiving method is provided. The data receiving method includes: acquiring predefined information; and performing, according to the predefined information, information reception processing in an omnidirectional mode or a directional mode.

Alternatively, whether a reception device performs a listen-before-talk (LBT) mechanism before performing the information reception according to the omnidirectional mode or the directional mode is determined in one of following manners: predefinition; pre-agreement between a transmitting device and the reception device; indication through physical layer downlink control information (DCI) signaling; or indication through higher-layer radio resource control (RRC) signaling.

Alternatively, before the reception device performs the information reception according to the omnidirectional mode, the method includes: performing the LBT mechanism or interference measurement; and performing a predetermined processing based on an LBT result or an interference measurement result.

Alternatively, performing the predetermined processing based on the LBT result or the interference measurement result includes: when the LBT fails or succeeds, reporting the LBT result to a transmission device on a transmitting side; or in when the LBT fails or succeeds, sending an indication signal to the transmission device on the transmitting side; or when the interference measurement result meets a predetermined threshold, reporting the interference measurement result to the transmission device; or when the interference measurement result meets the predetermined threshold, sending an indication signal to the transmission device.

Alternatively, performing the predetermined processing based on the LBT result or the interference measurement result includes: when the LBT fails, the reception device performing a reception mode switching operation; or when the interference measurement result meets a predetermined threshold, the reception device performing the reception mode switching operation; or when the LBT fails and a transmission mode switching indication is enabled, the reception device performing the reception mode switching operation; or when the interference measurement result meets the predetermined threshold and the transmission mode switching indication is enabled, the reception device performing the reception mode switching operation.

Alternatively, performing, by the reception device, the reception mode switching operation includes: switching from an omnidirectional reception mode to a directional reception mode.

Alternatively, the reception device determines to perform the reception mode switching operation or acquisition of the transmission mode switching indication in at least one of following manners: indication though physical layer downlink control information (DCI) signaling; predefinition; reception of indication information of the transmitting device; agreement between the transmitting device and the reception device; indication through higher-layer radio resource control (RRC) signaling; or event-based triggering.

Alternatively, a directional beam to which the reception device switches is determined in at least one of following manners: indication through physical layer downlink control information (DCI) signaling; indication through higher-layer radio resource control (RRC) signaling; predefinition; determining based on measurement; or determining based on a signal to interference plus noise ratio (SINR).

Alternatively, after switching from the omnidirectional reception mode to the directional reception mode, the method further includes: performing the LBT mechanism on a switched-to beam.

Alternatively, before the reception device performs reception according to the directional mode, the method includes: performing the LBT mechanism on a directional beam.

Alternatively, performing the LBT mechanism on a beam includes one of: if the LBT on the beam succeeds, sending indication information to a transmission device; if the LBT on the beam fails, sending indication information to the transmission device; or if the LBT on the beam fails, performing the LBT mechanism on the beam again or switching to another beam and performing the LBT mechanism on the another beam.

Alternatively, the directional mode includes at least one of: a directional transmit beam or a directional receive beam.

Alternatively, for one reception device, a relationship between the directional transmit beam and the directional receive beam includes: the directional transmit beam being the same as the directional receive beam; or the directional transmit beam being different from the directional receive beam; or the directional transmit beam partially overlapping the directional receive beam.

Alternatively, the relationship between the directional transmit beam and the directional receive beam is determined in at least one of the following manners: predefinition; pre-agreement between a base station and a user equipment (UE); indication through physical layer downlink control information (DCI) signaling; or configuration through higher-layer radio resource control (RRC) signaling.

Alternatively, performing the LBT mechanism on a beam includes: determining signal energy received by the reception device in the directional beam; comparing the signal energy received in the directional beam with a predetermined threshold value; and determining, based on the comparison result, a busy/idle state of a channel in the directional beam.

Alternatively, determining the signal energy received by the reception device in the directional beam includes: the signal energy received by the reception device in a beam range is equal to a norm of a value, where the value is a product of a beamforming weight of the reception device and a sum of signals received in the beam range by the reception device from surrounding devices. Alternatively, the signal energy received by the reception device in the beam range is equal to a norm of a value, where the value is an accumulated sum of the signals received by the reception device in the beam range from all of the surrounding devices. Alternatively, the signal energy received by the reception device in the beam range is equal to $\|V^*(H_1^*X_1 + H_2^*X_2 + \ldots + H_n^*X_n)\|$ or $\|V^*H_1^*X_1 + V^*H_2^*X_2 + \ldots V^*H_n^*X_n\|$ where V denotes the beamforming weight, $H_1, H_2, \ldots, H_n$ each denote a channel matrix between the reception device and one of the surrounding devices, $X_1, X_2, \ldots, X_n$ each denote a transmit signal vector of one of the surrounding devices of the reception device, * denotes a product operator, $\| \|$ denotes a norm operator, n is the number of the surrounding devices of the reception device, $H_i*X_i$ denotes a signal sent by an i-th surrounding device and received by the reception device, and $V*H_i*X_i$ denotes a signal sent by the i-th surrounding device and received by the reception device in the beam range. Alternatively, the signal energy received by the reception device in the beam range being equal to an accumulated sum of signal energy received from all of the surrounding devices by the reception device in the beam range; or the signal energy received by the reception device in the beam range being equal to $\|V*H_1*X_1\|+\|V*H_2*X_2\|+ \ldots +\|V*H_n*X_n\|$. V denotes the beamforming weight, $H_1, H_2, \ldots, H_n$ each denote a channel matrix between the reception device and one of the surrounding devices, $X_1, X_2, \ldots, X_n$ each denote a transmit signal vector of one of the surrounding devices of the reception device, * denotes a product operator, $\| \|$ denotes a norm operator, n is the number of the surrounding devices of the reception device, $H_i*X_i$ denotes the signal sent by the i-th surrounding device and received by the reception device, and $V*H_i*X_i$ denotes the signal sent by the i-th surrounding device and received by the reception device in the beam range.

Alternatively, determining the busy/idle state of the channel in the directional beam includes: when the signal energy received in the directional beam is not greater than the predetermined threshold value, determining that the channel in the directional beam is idle; or when the signal energy received in the directional beam is greater than the predetermined threshold value, determining that the channel in the directional beam is busy.

Alternatively, when the reception device performs signal reception by using a plurality of directional beams, the reception device determines, according to signal energy received in each of the plurality of directional beams, busy/idle states of channels on the plurality of directional beams or busy/idle states of channels in a beam region formed by the plurality of directional beams.

Alternatively, determining, according to the signal energy received in the each of the plurality of directional beams, the busy/idle state of the channel on each of the plurality of directional beams or the busy/idle states of the channels in the beam region formed by the plurality of directional beams includes: if the LBT is successfully performed on at least one of the plurality of directional beams, determining that the plurality of directional beams are available or that the channels are idle, and performing signal reception only on the directional beam on which the LBT is successfully performed; or if the LBT is successfully performed on all of the plurality of directional beams, determining that the plurality of directional beams are available or that the channels are idle; or if the LBT fails on at least one of the plurality of directional beams, determining that the plurality of directional beams are not available or that the channels are busy; or if a number of directional beams, among the plurality of directional beams, on which the LBT is successfully performed reaches a predetermined threshold value, determining that the plurality of directional beams are available or that the channels are idle, and performing transmission only on the directional beam on which the LBT is successfully performed; or if a number of directional beams, among the plurality of directional beams, on which the LBT fails reaches a predetermined threshold value, determining that the plurality of directional beams are not available or that the channels are busy.

Alternatively, when the reception device performs signal reception by using a plurality of directional beams, the reception device determines, according to a sum of signal energies received in the plurality of directional beams, busy/idle states of channels on the plurality of directional beams or busy/idle states of channels in a beam region formed by the plurality of directional beams.

Alternatively, when the plurality of directional beams belong to a same antenna element or antenna port, a method for calculating the signal energy received in the beam region formed by the plurality of directional beams includes: signal energy received in the beam region formed by the plurality of directional beams is equal to an accumulated sum of signal energy received by the reception device in a first beam, signal energy received by the reception device in a second beam, . . . and signal energy received by the reception device in an m-th beam. Alternatively, the signal energy received in the beam region formed by the plurality of directional beams is equal to $$\|V^{1}*(H_1*X_1+H_2*X_2+\ldots+H_n*X_n)\|+\|V^{2}*(H_1*X_1+H_2*X_2+\ldots+H_n*X_n)\|+\ldots\|V^{m}*(H_1*X_1+H_2*X_2+\ldots+H_n*X_n)\|,$$

where $V^1, V^2, \ldots, V^m$ denote beamforming weights of m beams, $H_1, H_2, \ldots, H_n$ each denote the channel matrix between the reception device and the surrounding device, $X_1, X_2, \ldots, X_n$ each denote the transmit signal vector of the surrounding device of the reception device, * denotes the product operator, $\| \|$ denotes the norm operator, n is the number of surrounding devices of the reception device, m is the number of directional beams used in the signal reception of the reception device, $H_j*X_j$ denotes a signal sent by a j-th surrounding device and received by the reception device, $V^{i}*H_j*X_j$ denotes a signal sent by the j-th surrounding device and received by the reception device in an i-th beam range, and $V^{i}*(H_1*X_1+H_2*X_2+\ldots+H_n*X_n)$ denotes signals sent by the surrounding devices and received in the i-th beam. Alternatively, the signal energy received in the beam region formed by the plurality of directional beams is equal to a norm of a value, where the value is the accumulated sum of the signal energy received by the reception device in the first beam, the signal energy received by the reception device in the second beam, . . . and the signal energy received by the reception device in the m-th beam. Alternatively, the signal energy received in the beam region formed by the plurality of directional beams being equal to $$\|V^{1}*(H_1*X_1+H_2*X_2+\ldots+H_n*X_n)+V^{2}*(H_1*X_1+H_2*X_2+\ldots+H_n*X_n)+\ldots+V^{m}*(H_1*X_1+H_2*X_2+\ldots+H_n*X_n)\|.$$

$V^1, V^2, \ldots, V^m$ denote beamforming weights of m beams, $H_1, H_2, \ldots, H_n$ each denote the channel matrix between the reception device and the surrounding device, $X_1, X_2, \ldots, X_n$ each denote the transmit signal vector of the surrounding device of the reception device, * denotes the product operator, $\| \|$ denotes the norm operator, n is the number of surrounding devices of the reception device, m is the number of directional beams used in the signal reception of the reception device, $H_j*X_j$ denotes a signal sent by the j-th surrounding device and received by the reception device, $V^{i}*H_j*X_j$ denotes a signal sent by the j-th surrounding device and received by the reception device in an i-th beam range, and $V^{i}*(H_1*X_1+H_2*X_2+\ldots+H_n*X_n)$ denotes signals sent by the surrounding devices and received in the i-th beam.

Alternatively, when the plurality of directional beams belong to different antenna elements or antenna ports, a method for calculating signal energy received in the beam region formed by the plurality of directional beams includes: signal energy received in the beam region formed by the plurality of directional beams is equal to an accumulated sum of signal energy received by the reception device in a first beam, signal energy received by the reception device in a second beam, . . . and signal energy received by the reception device in an m-th beam. Alternatively, the signal energy received in the beam region formed by the plurality of directional beams is equal to $$\|V^{1*}(H_1^{1*}X_1+H_2^{1*}X_2+\ldots+H_n^{1*}X_n)\|+\|V^{2*}$$
$$(H_1^{2*}X_1+H_2^{2*}X_2+\ldots+H_n^{2*}X_n)\|+\ldots\|V^{m*}$$
$$(H_1^{m*}X_1+H_2^{m*}X_2+\ldots+H_n^{m*}X_n)\|.$$

$V^1, V^2, \ldots, V^m$ denote beamforming weights of m beams, $H_1^i, H_2^i, \ldots, H_n^i$ each denote the channel matrix between the reception device and one of the n surrounding devices on the i-th beam, $X_1, X_2, \ldots, X_n$ each denote the transmit signal vector of the surrounding device of the reception device, $H_j^{i*}X_j$ denotes a signal sent by a j-th surrounding device and received by the reception device, $V^{i*}H_j^{i*}X_j$ denotes a signal sent by the j-th surrounding device and received by the reception device in the i-th beam range, $V^{i*}(H_1^{i*}X_1+H_2^{i*}X_2+\ldots+H_n^{i*}X_n)$ denotes signals sent by n surrounding devices and received by the reception device in the i-th beam range, $\|V^{i*}(H_1^{i*}X_1+H_2^{i*}X_2+\ldots+H_n^{i*}X_n)\|$ denotes signal energies received by the reception device in the i-th beam range from n surrounding devices, * denotes the product operator, $\| \|$ denotes the norm operator, n is the number of surrounding devices of the reception device, m is the number of beams. Alternatively, the signal energy received in the beam region formed by the plurality of directional beams is equal to a norm of the accumulated sum of the signal energy received by the reception device in the first beam, the signal energy received by the reception device in the second beam, . . . and the signal energy received by the reception device in the m-th beam. Alternatively, the signal energy received in the beam region formed by the plurality of directional beams is equal to $$\|V^{1*}(H_1^{1*}X_1+H_2^{1*}X_2+\ldots+H_n^{1*}X_n)+V^{2*}$$
$$(H_1^{2*}X_1+H_2^{2*}X_2+\ldots+H_n^{2*}X_n)+\ldots+V^{m*}$$
$$(H_1^{m*}X_1+H_2^{m*}X_2+\ldots+H_n^{m*}X_n)\|.$$

$V^1, V^2, \ldots, V^m$ denote beamforming weights of m beams, $H_1^i, H_2^i, \ldots, H_n^i$ each denote the channel matrix on the i-th beam between the reception device and one of the n surrounding devices, $X_1, X_2, \ldots, X_n$ each denote the transmit signal vector of the surrounding device of the reception device, $H_j^{i*}X_j$ denotes a signal sent by the j-th surrounding device and received by the reception device, $V^{i*}H_j^{i*}X_j$ denotes a signal sent by the j-th surrounding device and received by the reception device in the i-th beam range, $V^{i*}(H_1^{i*}X_1+H_2^{i*}X_2+\ldots+H_n^{i*}X_n)$ denotes signals sent by n surrounding devices and received by the reception device in the i-th beam range, * denotes the product operator, $\| \|$ denotes the norm operator, n is the number of surrounding devices of the reception device, m is the number of beams. The signal energy received in the beam region formed by the plurality of directional beams is equal to an accumulated sum of signal energies sent by n1 surrounding devices and received by the reception device in the first beam, signal energies sent by n2 surrounding devices and received by the reception device in the second beam, . . . and signal energies sent by nn surrounding devices and received by the reception device in the m-th beam. Alternatively, the signal energy received in the beam region formed by the plurality of directional beams is equal to $$\|V^{1*}(H_1^{1*}X_1^1+H_2^{1*}X_2^1+\ldots+H_{n1}^{1*}X_{n1}^1)\|+\|V^{2*}$$
$$(H_1^{2*}X_1^2+H_2^{2*}X_2^2+\ldots+H_{n2}^{2*}X_{n2}^2)\|+\ldots$$
$$\|V^{m*}(H_1^{m*}X_1^m+H_2^{m*}X_2^m+\ldots+H_{nn}^{m*}X_{nn}^m)\|.$$

$V^1, V^2, \ldots, V^m$ denote beamforming weights of m beams, $H_1^i, H_2^i, \ldots, H_{nj}^i$ each denote the channel matrix between the reception device and one of the nj surrounding devices on the i-th beam, $X_1^i, X_2^i, \ldots, X_{nj}^i$ denotes the transmit signal vectors of the nj surrounding devices of the reception device on the i-th beam, $H_{nj}^{i*}X_{nj}^i$ denotes a signal sent by a nj-th surrounding device and received by the reception device, $V^{i*}H_{nj}^{i*}X_{nj}^i$ denote a signal sent by the nj-th surrounding device and received by the reception device in the i-th beam range, $V^{i*}(H_1^{i*}X_1^i+H_2^{i*}X_2^i+\ldots+H_{nj}^{i*}X_{nj}^i)$ denotes signals sent by the nj surrounding devices and received by the reception device in the i-th beam range, $\|V^{i*}(H_1^{i*}X_1^i+H_2^{i*}X_2^i+\ldots+H_{nj}^{i*}X_{nj}^i)\|$ denotes signal energy sent by the nj surrounding devices and received by the reception device in the i-th beam range, * denotes the product operator, $\| \|$ denotes the norm operator, nj is the number of the surrounding devices of the reception device, m is the number of beams. Alternatively, the signal energy received in the beam region formed by the plurality of directional beams being equal to a norm of an accumulated sum of signals sent by the n1 surrounding devices and received by the reception device in the first beam, signals sent by the n2 surrounding devices and received by the reception device in the second beam, . . . and signals sent by the nn surrounding devices and received by the reception device in the m-th beam. Alternatively, the signal energy received in the beam region formed by the plurality of directional beams being equal to $$\|V^{1*}(H_1^{1*}X_1^1+H_2^{1*}X_2^1+\ldots+H_{n1}^{1*}X_{n1}^1)+V^{2*}$$
$$(H_1^{2*}X_1^2+H_2^{2*}X_2^2+\ldots+H_{n1}^{2*}X_{n1}^2)+\ldots$$
$$+V^{m*}(H_1^{m*}X_1^m+H_2^{m*}X_2^m+\ldots+H_{nn}^{m*}X_{nn}^m)\|.$$

$V^1, V^2, \ldots, V^m$ denote beamforming weights of m beams, $H_1^i, H_2^i, \ldots, H_{nj}^i$ each denote the channel matrix between the reception device and one of the nj surrounding devices on the i-th beam, $X_1^i, X_2^i, \ldots, X_{nj}^i$ denote the transmit signal vectors of the nj surrounding devices of the reception device on the i-th beam, $H_{nj}^{i*}X_{nj}^i$ denotes a signal sent by a nj-th surrounding device and received by the reception device, $V^{i*}H_{nj}^{i*}X_{nj}^i$ denotes a signal sent by the nj-th surrounding device and received by the reception device in the i-th beam range, $V^{i*}(H_1^{i*}X_1^i+H_2^{i*}X_2^i+\ldots+H_{nj}^{i*}X_{nj}^i)$ denotes signals sent by the nj surrounding devices and received by the reception n device in the i-th beam range, * denotes the product operator, $\| \|$ denotes the norm operator, nj is the number of surrounding devices of the reception device, m is the number of beams. Alternatively, the signal energy received in the beam region formed by the plurality of directional beams being equal to a norm of an accumulated sum of signals sent by the n surrounding devices and received by the reception device in the first beam, signals sent by the n surrounding devices and received by the reception device in the second beam, . . . and signals sent by the n surrounding devices and received by the reception device in the m-th beam. Alternatively, the signal energy received in the beam region formed by the plurality of directional beams being equal to $$\|V^{1*}(H_1^{1*}X_1^1+H_2^{1*}X_2^1+\ldots+H_n^{1*}X_n^1)+V^{2*}$$
$$(H_1^{2*}X_1^2+H_2^{2*}X_2^2+\ldots+H_n^{2*}X_n^2)+\ldots$$
$$+V^{m*}(H_1^{m*}X_1^m+H_2^{m*}X_2^m+\ldots+H_n^{m*}X_n^m)\|.$$

$V^1, V^2, \ldots, V^m$ denote beamforming weights of m beams, $H_1^i, H_2^i, \ldots, H_n^i$ each denote the channel matrix between the reception device and one of the surrounding devices on the i-th beam, $X_1^i, X_2^i, \ldots, X_n^i$ denote the transmit signal vectors of the surrounding devices of the reception device on the i-th beam, * denotes the product operator, $\| \|$ denotes the norm operator, n is the number of surrounding devices of the reception device, m is the number of beams, $H_j^{i*}X_j^i$ denotes a signal sent by the j-th surrounding device and received by the reception device on the i-th beam, and $V^{i*}H_j^{i*}X_j^i$ is the signal sent by the j-th surrounding device and received by the reception device in the i-th beam range.

Alternatively, the beamforming weight includes: a transmit beamforming weight of the reception device or a receive beamforming weight of the reception device.

Alternatively, the transmit beamforming weight and/or the receive beamforming weight are determined in one of following manners: in a manner of predefinition; in a manner of configuration by a base station; in a manner of configuration by a user equipment (UE); in a manner of pre-agreement between the base station and the UE; in a manner of indication through physical layer downlink control information (DCI) signaling; and in a manner of performing singular value decomposition (SVD) on a channel matrix H between a transmitting device and the reception device.

Alternatively, when the reception device performs signal reception by using a plurality of directional beams, the reception device determines channel conditions of the plurality of directional beams according to signal energy received in a beam region formed by the plurality of directional beams.

Alternatively, calculation of the signal energy received in the beam region formed by the plurality of directional beams includes: the signal energy received in the beam region formed by the plurality of directional beams is equal to a norm of a value, where the value is a product of a sum of signals received from surrounding devices of the reception device and a beamforming weight formed by the plurality of directional beams.

Alternatively, the method includes: when signal energy received in a beam coverage range formed by the plurality of directional beams is not greater than a predetermined threshold value, determining that the channel in a beam formed by the plurality of directional beams is idle or that channels in the plurality of directional beams are idle; or when the signal energy received in the beam coverage range formed by the plurality of directional beams is greater than the predetermined threshold value, determining that the channel in the beam formed by the plurality of directional beams is busy or that the channels in the plurality of directional beams are busy.

Alternatively, when the channels in the beams are detected to be busy, the reception device performs an LBT detection on a finer directional beam in the directional beam on which the LBT fails; or the reception device performs the LBT detection on directional beams other than the directional beams on which the LBT fails.

Alternatively, when the reception device performs the LBT mechanism on a plurality of directional beams, the reception device performs Cat2 LBT simultaneously on the plurality of directional beams; or the reception device performs Cat4 LBT on a main directional beam of the plurality of directional beams, and when the LBT process is about to be completed, the reception device starts performing the Cat2 LBT on other directional beams; or the reception device performs the Cat4 LBT on the plurality of directional beams.

Alternatively, the main directional beam of the plurality of directional beams is determined in one of following manners: determination by a base station, determination by a user equipment (UE), determination by the base station and the UE, predefinition, indication through physical layer downlink control information (DCI) signaling, or indication through higher-layer radio resource control (RRC) signaling.

Alternatively, when performing the Cat4 LBT on the plurality of directional beams, the method includes: respectively generating a random backoff value N on each of the plurality of directional beams; or using the same random backoff value N for the plurality of directional beams.

Alternatively, the method includes: performing a Cat2 LBT mechanism on a directional beam or using Cat2 LBT having a shorter detection duration in a transmission period, a channel occupancy time, or abeam group; or performing the Cat2 LBT mechanism, a Cat4 LBT mechanism, Cat4 LBT corresponding to a predetermined priority level, or Cat3 LBT on a directional beam outside the transmission period, the channel occupancy time, or the beam group; or performing the Cat4 LBT mechanism, the Cat4 LBT corresponding to the predetermined priority level, or the Cat3 LBT on a directional beam in the transmission period, or the channel occupancy time, or an initial beam group.

Alternatively, the predetermined priority level or an LBT mechanism used for the directional beam is determined in one of following manners: pre-agreement between a base station and a user equipment (UE); predefinition; indication through physical layer downlink control information (DCI) signaling by the base station; or indication through higher-layer radio resource control (RRC) signaling.

Alternatively, the method includes: performing a same LBT mechanism or different LBT mechanisms on directional beams in different beam groups or different channel occupancy times or different transmission periods.

Alternatively, the predefined information includes at least one of: a transmission mode, indication signaling, an information type, frame structure information, a beam identifier (ID), a beamforming weight, a beam type, a beam pattern, a threshold value, an LBT mechanism indication, a time domain resource, a corresponding relationship between the time domain resource and a beam, a frequency domain resource, a frequency domain hopping manner, a channel reciprocity indication, data, a beam switching indication, or a transmission mode switching indication.

Alternatively, the indication signaling includes at least one of: physical layer downlink control information (DCI) signaling, or higher-layer radio resource control (RRC) signaling.

Alternatively, the information type includes at least one of: control information, data, a reference signal, or a traffic type.

Alternatively, the beam type includes: a single-beam type and a multi-beam type.

Alternatively, the predefined information is determined in at least one of following manners: predefinition, pre-agreement between a base station and a user equipment (UE), indication through physical layer downlink control information (DCI) signaling, or configuration through higher-layer radio resource control (RRC) signaling.

Alternatively, before the reception device performs reception according to the directional mode, the method includes: performing a non-listen-before-talk (LBT) predetermined processing operation.

Alternatively, performing the predetermined non-LBT processing operation includes one of the following: performing directional beam randomization; processing using directional beam pattern; or processing using semi-statically configured directional beam.

Alternatively, performing the directional beam randomization or processing using the directional beam pattern includes: determining the receive beam or the receive beam pattern according to a fixed rule; or determining the receive beam or the receive beam pattern in a random manner.

Alternatively, determining the receive beam or the receive beam pattern according to the fixed rule includes: determining the receive beam according to a decreasing order of beam index; or determining the receive beam pattern according to a decreasing order of beam pattern index; or determining the receive beam according to an increasing order of beam index; or determining the receive beam pattern according to an increasing order of beam pattern index; or determining the receive beam according to at least one of beams with even indexes/beams with odd indexes; or determining the receive beam pattern according to at least one of beam patterns with even indexes/beam patterns with odd indexes; or determining the receive beam according to beams with even indexes and an increasing order or a decreasing order, or according to beams with odd indexes and in the increasing order or the decreasing order; or determining the receive beam pattern according to beam patterns with even indexes and an increasing order or a decreasing order, or according to beam patterns with odd indexes and in the increasing order or the decreasing order; or determining, from a plurality of beams, a beam as the receive beam, wherein the index of the beam in the plurality of beams modulo an offset is equal to M; or determining, from a plurality of beam patterns, a beam pattern as the receive beam pattern, wherein the index of the beam pattern in the plurality of beam patterns modulo an offset is equal to M; or indicating, through physical layer downlink control information (DCI) signaling, the beam index, the beam pattern, the offset in the beam, or an offset in a beam pattern set used by the reception device; or indicating, through higher-layer radio resource control (RRC) signaling, the beam index, the beam pattern, the offset in the beam, or the offset in the beam pattern set used by the reception device.

Alternatively, indicating, through the physical layer DCI signaling or the higher-layer RRC signaling, the receive beam or the receive beam pattern includes: determining the receive beam or the receive beam pattern through a value corresponding to the number of bits of bit information; determining the receive beam or the receive beam pattern through a bitmap; or determining the receive beam or the receive beam pattern through a beam indication field.

Alternatively, the fixed rule, the offset or M is determined in one of following manners: predefinition; pre-agreement between a base station and a user equipment (UE); indication through the physical layer DCI signaling; or configuration through the higher-layer RRC signaling.

Alternatively, determining the receive beam or the receive beam pattern in the random manner includes: generating a positive integer within [1, p] or [0, p−1] in a manner of a random sequence or in a manner of a random function; where p is a number of beams or a number of frequency domain resources.

Alternatively, the random function includes: a uniform distribution function; a binomial distribution function; or a normal distribution function.

Alternatively, the fixed rule and/or the random manner is determined in one of following manners: predefinition; pre-agreement between a base station and a user equipment (UE); indication through physical layer downlink control information (DCI) signaling; or configuration through higher-layer radio resource control (RRC) signaling.

Alternatively, processing using semi-statically configured directional beam includes: in a predetermined period, measuring the configured directional beam or a beam in a directional beam set, and determining, based on measurement information, whether to perform a directional beam switching operation.

Alternatively, a criterion for determining directional beam switching includes: performing the directional beam switching operation when a load, an interference value, or an information transmission error probability on a current receive beam in the predetermined period is measured to be greater than a predetermined threshold value; or not performing the directional beam switching operation when the load, the interference value, or the information transmission error probability on the current transmission beam in the predetermined period is measured to be not greater than the predetermined threshold value.

Alternatively, Cat2 LBT, or Cat2 LBT having a shorter detection duration, or Cat4 LBT corresponding to a predetermined priority level, is performed on a beam having a larger load, interference value, or information transmission error probability.

Alternatively, the predetermined priority level is determined through at least one of: a traffic type; indication through physical layer downlink control information (DCI) signaling; predefinition; different signals; different channels; or different beams.

Alternatively, a channel occupation duration of a beam having a smaller load, interference value, or information transmission error probability is adjusted.

Alternatively, a measurement quantity to be measured includes: a received signal strength indication (RSSI); reference signal receiving power (RSRP); reference signal receiving quality (RSRQ); or acknowledgement (ACK)/negative acknowledgement (NACK) feedback information.

In an aspect of the present disclosure, a data transmission apparatus is provided. The data transmission apparatus includes: a first acquiring module, which is configured to obtain predefined information; a first determining module, which is configured to determine, according to the predefined information, whether to perform a listen-before-talk (LBT) mechanism before transmission; and a first processing module, which is configured to: perform the LBT mechanism before a transmission device performs transmission according to a predetermined transmission mode when LBT indication information is carried in the predefined information, or perform a predetermined non-LBT processing operation before the transmission device performs the transmission according to the predetermined transmission mode when the LBT indication information is not carried in the predefined information.

In another aspect of the present disclosure, a data reception apparatus is provided. The data reception apparatus includes: a second acquiring module, which is configured to obtain predefined information; and a second processing module, which is configured to perform, according to the predefined information, information reception processing according to an omnidirectional mode or a directional mode.

In another aspect of the present disclosure, a base station is provided. The base station includes the data transmission apparatus and/or the data reception apparatus described above.

In another aspect of the present disclosure, a terminal is provided. The terminal includes the data transmission apparatus and/or the data reception apparatus described above.

According to another embodiment of the present disclosure, a storage medium is further provided. The storage medium is configured to store program codes for executing the following steps: acquiring predefined information; determining, according to the predefined information, whether to perform a listen-before-talk (LBT) mechanism before transmission; and if LBT indication information is carried in the predefined information, performing the LBT mechanism before a transmission device performs transmission according to a predetermined transmission mode; or if the LBT indication information is not carried in the predefined information, performing a predetermined non-LBT processing operation before the transmission device performs the transmission according to the predetermined transmission mode.

Alternatively, the storage medium is further configured to store program codes for executing the step described below. The predetermined transmission mode includes: an omnidirectional mode or a directional mode.

Alternatively, the storage medium is further configured to store program codes for executing the step described below. The directional mode includes at least one of: a directional transmit beam or a directional receive beam.

Alternatively, the storage medium is further configured to store program codes for executing the step described below. For one transmission device, a relationship between the directional transmit beam and the directional receive beam includes: the directional transmit beam being the same as the directional receive beam; or the directional transmit beam being different from the directional receive beam; or the directional transmit beam partially overlapping the directional receive beam.

Alternatively, the storage medium is further configured to store program codes for executing the step described below. The relationship between the directional transmit beam and the directional receive beam is determined in at least one of the following manners: predefinition; pre-agreement between a base station and a user equipment (UE); indication through physical layer downlink control information (DCI) signaling; or configuration through higher-layer radio resource control (RRC) signaling.

Alternatively, the storage medium is further configured to store program codes for executing the steps described below. In a case where the transmission device performs transmission according to the directional mode, performing the LBT mechanism before performing the transmission according to the directional mode includes: determining signal energy received by the transmission device in a directional beam; comparing the signal energy received in the directional beam with a predetermined threshold value; and determining, based on the comparison result, a busy/idle state of a channel in the directional beam.

Alternatively, the storage medium is further configured to store program codes for executing the step described below. The step of determining the signal energy received by the transmission device in the directional beam includes: the signal energy received by the transmission device in a beam range being equal to a norm of a value, where the value is a product of a beamforming weight of the transmission device and a sum of signals received in the beam range by the transmission device from surrounding devices. Alternatively, the signal energy received by the transmission device in the beam range being equal to a norm of a value, where the value is an accumulated sum of the signals received by the transmission device in the beam range from all of the surrounding devices. Alternatively, the signal energy received by the transmission device in the beam range being equal to $\|V^*(H_1^*X_1+H_2^*X_2+\ldots+H_n^*X_n)\|$ or $\|V^*H_1^*X_1+V^*H_2^*X_2+\ldots V^*H_n^*X_n\|$ where V denotes the beamforming weight, $H_1, H_2, \ldots, H_n$ each denote a channel matrix between the transmission device and one of the surrounding devices, $X_1, X_2, \ldots, X_n$ each denote a transmit signal vector of one of the surrounding devices of the transmission device, * denotes a product operator, $\| \|$ denotes a norm operator, n is the number of the surrounding devices of the transmission device, $H_i^*X_i$ denotes a signal sent by an i-th surrounding device and received by the transmission device, and $V^*H_i^*X_i$ denotes a signal sent by the i-th surrounding device and received by the transmission device in the beam range. Alternatively, the signal energy received by the transmission device in the beam range being equal to an accumulated sum of signal energy received from all of the surrounding devices by the transmission device in the beam range; or the signal energy received by the transmission device in the beam range being equal to $$\|V^*H_1^*X_1\|+\|V^*H_2^*X_2\|+\ldots+\|V^*H_n^*X_n\|.$$

V denotes the beamforming weight, $H_1, H_2, \ldots, H_n$ each denote a channel matrix between the transmission device and one of the surrounding devices, $X_1, X_2, \ldots, X_n$ each denote a transmit signal vector of one of the surrounding devices of the transmission device, * denotes a product operator, $\| \|$ denotes a norm operator, n is the number of the surrounding devices of the transmission device, $H_i^*X_i$ denotes the signal sent by the i-th surrounding device and received by the transmission device, and $V^*H_i^*X_i$ denotes the signal sent by the i-th surrounding device and received by the transmission device in the beam range.

Alternatively, the storage medium is further configured to store program codes for executing the step described below. The step of determining the busy/idle state of the channel in the directional beam includes: in a case of the signal energy received in the directional beam being not greater than the predetermined threshold value, determining that the channel in the directional beam is idle; or in a case of the signal energy received in the directional beam being greater than the predetermined threshold value, determining that the channel in the directional beam is busy.

Alternatively, the storage medium is further configured to store program codes for executing the step described below. A case where the transmission device performs transmission by using a plurality of directional beams includes: determining, according to signal energy received in each of the plurality of directional beams, busy/idle states of channels on the plurality of directional beams or busy/idle states of channels in a beam region formed by the plurality of directional beams.

Alternatively, the storage medium is further configured to store program codes for executing the step described below. The step of determining, according to the signal energy received in the each of the plurality of directional beams, the busy/idle state of the channel on each of the plurality of directional beams or the busy/idle states of the channels in the beam region formed by the plurality of directional beams includes: if the LBT is successfully performed on at least one of the plurality of directional beams, determining that the plurality of directional beams are available or that the channels are idle, and performing transmission only on the directional beam on which the LBT is successfully performed; or if the LBT is successfully performed on all of the plurality of directional beams, determining that the plurality of directional beams are available or that the channels are idle; or if the LBT fails to be performed on at least one of the plurality of directional beams, determining that the plurality of directional beams are not available or that the channels are busy; or if a number of directional beams, among the plurality of directional beams, on which the LBT is successfully performed reaches a predetermined threshold value, determining that the plurality of directional beams are available or that the channels are idle, and performing transmission only on the directional beam on which the LBT is successfully performed; or if a number of directional beams, among the plurality of directional beams, on which the LBT fails to be performed reaches a predetermined threshold value, determining that the plurality of directional beams are not available or that the channels are busy.

Alternatively, the storage medium is further configured to store program codes for executing the step described below. The case where the transmission device performs transmission by using a plurality of directional beams includes: determining, according to a sum of signal energy received in each of the plurality of directional beams, busy/idle states of channels on the plurality of directional beams or busy/idle states of channels in a beam region formed by the plurality of directional beams.

Alternatively, the storage medium is further configured to store program codes for executing the step described below. In the case where the plurality of directional beams belong to a same antenna element or antenna port, the method for calculating the signal energy received in the beam region formed by the plurality of directional beams includes: signal energy received in the beam region formed by the plurality of directional beams is equal to an accumulated sum of signal energy received by the transmission device in a first beam, signal energy received by the transmission device in a second beam, . . . and signal energy received by the transmission device in an m-th beam. Alternatively, the signal energy received in the beam region formed by the plurality of directional beams is equal to $\|V^1*(H_1*X_1+H_2*X_2+ \ldots +H_n*X_n)\|+\|V^2*(H_1*X_1+H_2*X_2+ \ldots +H_n*X_n)\|+ \ldots \|V^m*(H_1*X_1+H_2*X_2+ \ldots +H_n*X_n)\|$, where $V^1, V^2, \ldots, V^m$ denote beamforming weights of m beams, $H_1, H_2, \ldots, H_n$ each denote the channel matrix between the transmission device and the surrounding device, $X_1, X_2, \ldots, X_n$ each denote the transmit signal vector of the surrounding device of the transmission device, * denotes the product operator, $\| \|$ denotes the norm operator, n is the number of surrounding devices of the transmission device, m is the number of directional beams transmitted by the transmission device, $H_j*X_j$ denotes a signal sent by a j-th surrounding device and received by the transmission device, $V^{i*}H_j*X_j$ denotes a signal sent by the j-th surrounding device and received by the transmission device in an i-th beam range, and $V^{i*}(H_1*X_1+H_2*X_2+ \ldots +H_n*X_n)$ denotes signals sent by the surrounding devices and received in the i-th beam. Alternatively, the signal energy received in the beam region formed by the plurality of directional beams is equal to a norm of a value, wherein the value is the accumulated sum of the signal energy received by the transmission device in the first beam, the signal energy received by the transmission device in the second beam, . . . and the signal energy received by the transmission device in the m-th beam. Alternatively, the signal energy received in the beam region formed by the plurality of directional beams being equal to $\|V^1*(H_1*X_1+H_2*X_2+ \ldots +H_n*X_n)+V^2*(H_1*X_1+H_2*X_2+ \ldots +H_n*X_n)+ \ldots +V^m*(H_1*X_1+H_2*X_2+ \ldots +H_n*X_n)\|$. $V^1, V^2, \ldots, V^m$ denote beamforming weights of m beams, $H_1, H_2, \ldots, H_n$ each denote the channel matrix between the transmission device and the surrounding device, $X_1, X_2, \ldots, X_n$ each denote the transmit signal vector of the surrounding device of the transmission device, * denotes the product operator, $\| \|$ denotes the norm operator, n is the number of surrounding devices of the transmission device, m is the number of directional beams transmitted by the transmission device, $H_j*X_j$ denotes a signal sent by the j-th surrounding device and received by the transmission device, $V^{i*}H_j*X_j$ denotes a signal sent by the j-th surrounding device and received by the transmission device in an i-th beam range, and $V^{i*}(H_1*X_1+H_2*X_2+ \ldots +H_n*X_n)$ denotes signals sent by the surrounding devices and received in the i-th beam.

Alternatively, the storage medium is further configured to store program codes for executing the step described below. In the case where the plurality of directional beams belong to different antenna elements or antenna ports, a method for calculating signal energy received in the beam region formed by the plurality of directional beams includes: signal energy received in the beam region formed by the plurality of directional beams is equal to an accumulated sum of signal energy received by the transmission device in a first beam, signal energy received by the transmission device in a second beam, . . . and signal energy received by the transmission device in an m-th beam.

Alternatively, the signal energy received in the beam region formed by the plurality of directional beams is equal to $\|V^1*(H_1^1*X_1+H_2^1*X_2+ \ldots +H_n^1*X_n)\|+\|V^2*(H_1^2*X_1+H_2^2*X_2+ \ldots +H_n^2*X_n)\|+ \ldots \|V^m*(H_1^m*X_1+H_2^m*X_2+ \ldots +H_n^m*X_n)\|$. $V_1, V_2, \ldots, V_m$ denote beamforming weights of m beams, $H_1^i, H_2^i, \ldots, H_n^i$ each denote the channel matrix between the transmission device and one of the n surrounding devices on the i-th beam, $X_1, X_2, \ldots, X_n$ each denote the transmit signal vector of the surrounding device of the transmission device, $H_j^i*X_j$ denotes a signal sent by a j-th surrounding device and received by the transmission device, $V^{i*}H_j^i*X_j$ denotes a signal sent by the j-th surrounding device and received by the transmission device in the i-th beam range, $V^{i*}(H_1^i*X_1+H_2^i*X_2+ \ldots +H_n^i*X_n)$ denotes signals sent by n surrounding devices and received by the transmission device in the i-th beam range, $\|V^{i*}(H_1^i*X_1+H_2^i*X_2+ \ldots +H_n^i*X_n)\|$ denotes signal energies received by the transmission device in the i-th beam range from n surrounding devices, * denotes the product operator, $\| \|$ denotes the norm operator, n is the number of surrounding devices of the transmission device, m is the number of beams. Alternatively, the signal energy received in the beam region formed by the plurality of directional beams is equal to a norm of the accumulated sum of the signal energy received by the transmission device in the first beam, the signal energy received by the transmission device in the second beam, . . . and the signal energy received by the transmission device in the m-th beam. Alternatively, the signal energy received in the beam region formed by the plurality of directional beams is equal to $\|V^1*(H_1^1*X_1+H_2^1*X_2+ \ldots +H_n^1*X_n)+V^2*(H_1^2*X_1+H_2^2*X_2+ \ldots +H_n^2*X_n)+ \ldots +V^m*(H_1^m*X_1+H_2^m*X_2+ \ldots +H_n^m*X_n)\|$. $V^1, V^2, \ldots, V^m$ denote beamforming weights of m beams, $H_1^i, H_2^i, \ldots, H_n^i$ each denote the channel matrix on the i-th beam between the transmission device and one of the n surrounding devices, $X_1, X_2, \ldots, X_n$ each denote the transmit signal vector of the surrounding device of the transmission device, $H_j^i*X_j$ denotes a signal sent by the j-th surrounding device and received by the transmission device, $V^{i*}H_j^i*X_j$ denotes a signal sent by the j-th surrounding device and received by the transmission device in the i-th beam range, $V^{i*}(H_1^i*X_1+H_2^i*X_2+ \ldots +H_n^i*X_n)$ denotes signals sent by n surrounding devices and received by the transmission device in the i-th beam range, * denotes the product operator, $\| \|$ denotes the norm operator, n is the number of surrounding devices of the transmission device, m is the number of beams. The signal energy received in the beam region formed by the plurality of directional beams is equal to an accumulated sum of signal energies sent by n1 surrounding devices and received by the transmission device in the first beam, signal energies sent by n2 surrounding devices and received by the transmission device in the second beam, . . . and signal energies sent by nn surrounding devices and received by the transmission device in the m-th beam. Alternatively, the signal energy received in the beam region formed by the plurality of directional beams is equal to $\|V^1*(H_1^1*X_1^1+H_2^1*X_2^1+ \ldots +H_{n1}^1*X_{n1}^1)\|+\|V^2*(H_1^2*X_1^2+H_2^2*X_2^2+ \ldots +H_{n2}^2*X_{n2}^2)\|+ \ldots \|V^m*(H_1^m*X_1^m+H_2^m*X_2^m+ \ldots +H_{nn}^m*X_{nn}^m)\|$. $V^1, V^2, \ldots, V^m$ denote beamforming weights of m beams, $H_1^i, H_2^i, \ldots, H_{nj}^i$ each denote the channel matrix between the transmission device and one of the nj surrounding devices on the i-th beam, $X_1^i, X_2^i, \ldots, X_{nj}^i$ denotes the transmit signal vectors of the nj surrounding devices of the transmission device on the i-th beam, $H_{nj}^i*X_{nj}^i$ denotes a signal sent by a nj-th surrounding device and received by the transmission device, $V^{i*}H_{nj}^i*X_{nj}^i$ denote a signal sent by the nj-th surrounding device and received by the transmission device in the i-th beam range, $V^{i*}(H_1^i*X_1^i+H_2^i*X_2^i+ \ldots +H_{nj}^i*X_{nj}^i)$ denotes signals sent by the nj surrounding devices and received by the transmission device in the i-th beam range, $\|V^{i*}(H_1^i*X_1^i+H_2^i*X_2^i+ \ldots +H_{nj}^i*X_{nj}^i)\|$ denotes signal energy sent by the nj surrounding devices and received by the transmission device in the i-th beam range, * denotes the product operator, $\| \|$ denotes the norm operator, nj is the number of the surrounding devices of the transmission device, m is the number of beams. Alternatively, the signal energy received in the beam region formed by the plurality of directional beams being equal to a norm of an accumulated sum of signals sent by the n1 surrounding devices and received by the transmission device in the first beam, signals sent by the n2 surrounding devices and received by the transmission device in the second beam, . . . and signals sent by the nn surrounding devices and received by the transmission device in the m-th beam. Alternatively, the signal energy received in the beam region formed by the plurality of directional beams being equal to $\|V^1*(H_1^1*X_1^1+H_2^1*X_2^1+ \ldots +H_{n1}^1*X_{n1}^1)+V^2*(H_1^2*X_1^2+H_2^2*X_2^2+ \ldots +H_{n1}^2*X_{n1}^2)+ \ldots +V^{m*}(H_1^m*X_1^m+H_2^m*X_2^m+ \ldots +H_{nn}^m*X_{nn}^m)\|$. $V^1, V^2, \ldots, V^m$ denote beamforming weights of m beams, $H_1^i, H_2^i, \ldots, H_{nj}^i$ each denote the channel matrix between the transmission device and one of the nj surrounding devices on the i-th beam, $X_1^i, X_2^i, \ldots, X_{nj}^i$ denote the transmit signal vectors of the nj surrounding devices of the transmission device on the i-th beam, $H_{nj}^i*X_{nj}^i$ denotes a signal sent by a nj-th surrounding device and received by the transmission device, $V^{i*}H_{nj}^i*X_{nj}^i$ denotes a signal sent by the nj-th surrounding device and received by the transmission device in the i-th beam range, $V^{i*}(H_1^i*X_1^i+H_2^i*X_2^i+ \ldots +H_{nj}^i*X_{nj}^i)$ denotes signals sent by the nj surrounding devices and received by the transmission device in the i-th beam range, * denotes the product operator, $\| \|$ denotes the norm operator, nj is the number of the surrounding devices of the transmission device, m is the number of beams. Alternatively, the signal energy received in the beam region formed by the plurality of directional beams being equal to a norm of an accumulated sum of signals sent by the n surrounding devices and received by the transmission device in the first beam, signals sent by the n surrounding devices and received by the transmission device in the second beam, . . . and signals sent by the n surrounding devices and received by the transmission device in the m-th beam. Alternatively, the signal energy received in the beam region formed by the plurality of directional beams being equal to $\|V^1*(H_1^1*X_1^1+H_2^1*X_2^1+ \ldots +H_n^1*X_n^1)+V^2*(H_1^2*X_1^2+H_2^2*X_2^2+ \ldots +H_n^2*X_n^2)+ \ldots +V^{m*}(H_1^m*X_1^m+H_2^m*X_2^m+ \ldots +H_n^m*X_n^m)\|$. $V^1, V^2, \ldots, V^m$ denote beamforming weights of m beams, $H_1^i, H_2^i, \ldots, H_n^i$ each denote the channel matrix between the transmission device and one of the surrounding devices on the i-th beam, $X_1^i, X_2^i, \ldots, X_n^i$ denote the transmit signal vectors of the surrounding devices of the transmission device on the i-th beam, * denotes the product operator, $\| \|$ denotes the norm operator, n is the number of surrounding devices of the transmission device, m is the number of beams, i is a positive integer within [1, m], $H_j^i*X_j^i$ denotes a signal sent by the j-th surrounding device and received by the transmission device on the i-th beam, and $V^{i*}H_j^i*X_j^i$ is the signal sent by the j-th surrounding device and received by the transmission device in the i-th beam range.

Alternatively, the storage medium is further configured to store program codes for executing the step described below. The beamforming weight includes: a transmit beamforming weight of the transmission device or a receive beamforming weight of the transmission device.

Alternatively, the storage medium is further configured to store program codes for executing the step described below. The transmit beamforming weight and/or the receive beamforming weight are determined in one of following manners: in a manner of predefinition; in a manner of configuration by a base station; in a manner of configuration by a user equipment (UE); in a manner of pre-agreement between the base station and the UE; in a manner of indication through physical layer downlink control information (DCI) signaling; or in a manner of performing singular value decomposition (SVD) on a channel matrix H between a transmitting device and the reception device.

Alternatively, the storage medium is further configured to store program codes for executing the step described below. A case where the transmission device performs transmission by using a plurality of directional beams includes: determining channel conditions of the plurality of directional beams according to signal energy received in a beam region formed by the plurality of directional beams.

Alternatively, the storage medium is further configured to store program codes for executing the step described below. Calculation of the signal energy received in the beam region formed by the plurality of directional beams includes: the signal energy received in the beam region formed by the plurality of directional beams is equal to a norm of a value, where the value is a product of a sum of signals received from surrounding devices of the transmission device and a beamforming weight formed by the plurality of directional beams.

Alternatively, the storage medium is further configured to store program codes for executing the step described below. The step includes: when signal energy received in a beam coverage range formed by the plurality of directional beams is not greater than a predetermined threshold value, determining that channels in a beam formed by the plurality of directional beams are idle or that channels in the plurality of directional beams are idle; or when the signal energy received in the beam coverage range formed by the plurality of directional beams is greater than the predetermined threshold value, determining that the channels in the beam formed by the plurality of directional beams are busy or that the channels in the plurality of directional beams are busy.

Alternatively, the storage medium is further configured to store program codes for executing the step described below. The case where the channels in the beams are detected to be busy includes: performing, by the transmission device, an LBT detection on a finer directional beam in the directional beam on which the LBT fails to be performed; or performing, by the transmission device, the LBT detection on directional beams other than the directional beams on which the LBT fails to be performed.

Alternatively, the storage medium is further configured to store program codes for executing the step described below. The case where the transmission device performs the LBT mechanism on a plurality of directional beams includes: performing Cat2 LBT simultaneously on the plurality of directional beams; or performing Cat4 LBT on a main directional beam of the plurality of directional beams, and when the LBT process is about to be completed, starting performing the Cat2 LBT on other directional beams; or performing the Cat4 LBT on the plurality of directional beams.

Alternatively, the main directional beam of the plurality of directional beams is determined in one of following manners: determination by a base station, determination by a user equipment (UE), determination by the base station and the UE, predefinition, indication through physical layer downlink control information (DCI) signaling, or indication through higher-layer radio resource control (RRC) signaling.

Alternatively, the storage medium is further configured to store program codes for executing the step described below. The step of performing the Cat4 LBT on the plurality of directional beams includes: respectively generating a random backoff value N on each of the plurality of directional beams; or using the same random backoff value N for the plurality of directional beams.

Alternatively, the storage medium is further configured to store program codes for executing the step described below. The step includes: performing a Cat2 LBT mechanism on a directional beam or using Cat2 LBT having a shorter detection duration in a transmission period, a channel occupancy time, or abeam group; or performing the Cat2 LBT mechanism, a Cat4 LBT mechanism, Cat4 LBT corresponding to a predetermined priority level, or Cat3 LBT on a directional beam outside the transmission period, the channel occupancy time, or the beam group; or performing the Cat4 LBT mechanism, the Cat4 LBT corresponding to the predetermined priority level, or the Cat3 LBT on a directional beam in the transmission period, or the channel occupancy time, or an initial beam group.

Alternatively, the storage medium is further configured to store program codes for executing the step described below. The predetermined priority level or an LBT mechanism used for the directional beam is determined in one of following manners: pre-agreement between a base station and a user equipment (UE); predefinition; indication through physical layer downlink control information (DCI) signaling by the base station; or indication through higher-layer radio resource control (RRC) signaling.

Alternatively, the storage medium is further configured to store program codes for executing the step described below. The step includes: performing a same LBT mechanism or different LBT mechanisms on directional beams in different beam groups or different channel occupancy times or different transmission periods.

Alternatively, the storage medium is further configured to store program codes for executing the step described below. The predefined information includes at least one of: a transmission mode, indication signaling, an information type, frame structure information, a beam identifier (ID), a beamforming weight, a beam type, a beam pattern, a threshold value, an LBT mechanism indication, a time domain resource, a corresponding relationship between the time domain resource and a beam, a frequency domain resource, a frequency domain hopping manner, a channel reciprocity indication, data, a beam switching indication, or a transmission mode switching indication.

Alternatively, the storage medium is further configured to store program codes for executing the step described below. The indication signaling includes at least one of: physical layer downlink control information (DCI) signaling or higher-layer radio resource control (RRC) signaling.

Alternatively, the storage medium is further configured to store program codes for executing the step described below. The information type includes at least one of: control information, data, a reference signal, or a traffic type.

Alternatively, the storage medium is further configured to store program codes for executing the step described below. The beam type includes: a single-beam type and a multi-beam type.

Alternatively, the storage medium is further configured to store program codes for executing the step described below. The predefined information is determined in at least one of following manners: predefinition, pre-agreement between a base station and a user equipment (UE), indication through physical layer downlink control information (DCI) signaling, or configuration through higher-layer radio resource control (RRC) signaling.

Alternatively, the storage medium is further configured to store program codes for executing the step described below. The step of performing the predetermined non-LBT processing operation includes one of the following: performing directional beam randomization; processing using directional beam pattern; performing frequency domain hopping; or processing using semi-statically configured directional beam.

Alternatively, the storage medium is further configured to store program codes for executing the step described below. The step of performing the directional beam randomization, processing using the directional beam pattern, or processing using spectrum frequency hopping includes: determining a transmission beam, a transmission beam pattern, or a frequency domain hopping position according to a fixed rule; or determining the transmission beam, the transmission beam pattern, or the frequency domain hopping position in a random manner.

Alternatively, the storage medium is further configured to store program codes for executing the step described below. The step of determining the transmission beam, the transmission beam pattern, or the frequency domain hopping position according to the fixed rule includes: determining the transmission beam according to beam indexes a decreasing order of beam index; or determining the transmission beam pattern according to a decreasing order of beam pattern index; or determining the frequency domain hopping position according to a decreasing order of frequency domain position index; or determining the transmission beam according to an increasing order of beam index; or determining the transmission beam pattern according to an increasing order of beam pattern index; or determining the frequency domain hopping position according to an increasing order of frequency domain position; or determining the transmission beam according to at least one of beams with even indexes/beams with odd indexes; or determining the transmission beam pattern according to at least one of beam patterns with even indexes/beam patterns with odd indexes; or determining the frequency domain hopping position according to at least one of frequency domain positions with even indexes/frequency domain positions with odd indexes; or determining the transmission beam according to beams with even indexes and an increasing order or a decreasing order or according to beams with odd indexes and in the increasing order or the decreasing order; or determining the transmission beam pattern according to beam patterns with even indexes and an increasing order or a decreasing order or according to beam patterns with odd indexes and in the increasing order or the decreasing order; or determining the frequency domain hopping position according to frequency domain positions with even indexes and an increasing order or a decreasing order or according to frequency domain positions with odd indexes and in the increasing order or the decreasing order; or determining, from a plurality of beams, a beam as the transmission beam, where the index of the beam in the plurality of beams modulo an offset is equal to M; or determining, from a plurality of beam patterns, a beam pattern as the transmission beam pattern, where the index of the beam pattern in the plurality of beam patterns modulo an offset is equal to M; or determining a spectrum resource whose frequency domain index modulo an offset being equal to M as the frequency domain hopping position; or indicating, through physical layer downlink control information (DCI) signaling, the beam index, the beam pattern, a frequency domain index in a frequency domain resource, the offset in the beam, an offset in a beam pattern set, or an offset in the frequency domain resource used by the transmission device; or indicating, through higher-layer radio resource control (RRC) signaling, the beam index, the beam pattern, the frequency domain index in the frequency domain resource, the offset in the beam, the offset in the beam pattern set, or the offset in the frequency domain resource used by the transmission device.

Alternatively, the storage medium is further configured to store program codes for executing the step described below. The step of indicating, through the physical layer DCI signaling or the higher-layer RRC signaling, the transmission beam, the beam pattern or the frequency domain hopping position includes: determining the transmission beam, the beam pattern or the frequency domain hopping position through a value corresponding to a number of bits of bit information; determining the transmission beam, the beam pattern or the frequency domain hopping position through a bitmap; or determining the transmission beam, the beam pattern or the frequency domain hopping position through a beam indication field or a frequency hopping indication field.

Alternatively, the storage medium is further configured to store program codes for executing the step described below. The fixed rule, the offset or M is determined in one of following manners: predefinition; pre-agreement between a base station and a user equipment (UE); indication through the physical layer DCI signaling; or configuration through the higher-layer RRC signaling.

Alternatively, the storage medium is further configured to store program codes for executing the step described below. The step of determining the transmission beam, the transmission beam pattern, or the frequency domain staring position of frequency hopping in the random manner comprises: generating a positive integer within [1, p] or [0, p−1] in a manner of a random sequence or in a manner of a random function; wherein p is a number of beams or a number of frequency domain resources.

Alternatively, the storage medium is further configured to store program codes for executing the step described below. The random function includes: a uniform distribution function; a binomial distribution function; or a normal distribution function.

Alternatively, the storage medium is further configured to store program codes for executing the step described below. The fixed rule and/or the random manner are determined in one of following manners: predefinition; pre-agreement between a base station and a user equipment (UE); indication through physical layer downlink control information (DCI) signaling; or configuration through higher-layer radio resource control (RRC) signaling.

Alternatively, the storage medium is further configured to store program codes for executing the step described below. The step of processing using the semi-statically configured directional beam includes: in a predetermined period, measuring a configured directional beam or a beam in a directional beam set, and determining, based on measurement information, whether to perform a directional beam switching operation.

Alternatively, the storage medium is further configured to store program codes for executing the step described below. A criterion for determining directional beam switching includes: performing the directional beam switching operation when a load, an interference value, or an information transmission error probability on a current transmission beam in the predetermined period is measured to be greater than a predetermined threshold value; or not performing the directional beam switching operation when the load, the interference value, or the information transmission error probability on the current transmission beam in the predetermined period is measured to be not greater than the predetermined threshold value.

Alternatively, the storage medium is further configured to store program codes for executing the step described below. Cat2 LBT, or Cat2 LBT having a shorter detection duration, or Cat4 LBT corresponding to a predetermined priority level, is performed on a beam having a larger load, interference value, or information transmission error probability.

Alternatively, the storage medium is further configured to store program codes for executing the step described below. The predetermined priority level is determined through at least one of: a traffic type; indication through physical layer downlink control information (DCI) signaling; predefinition; different signals; different channels; or different beams.

Alternatively, the storage medium is further configured to store program codes for executing the step described below. A channel occupation duration of a beam having a smaller load, interference value, or information transmission error probability is adjusted.

Alternatively, the storage medium is further configured to store program codes for executing the step described below. A measurement quantity to be measured includes: a received signal strength indication (RSSI); reference signal receiving power (RSRP); reference signal receiving quality (RSRQ); or acknowledgement (ACK)/negative acknowledgement (NACK) feedback information.

According to another embodiment of the present disclosure, a storage medium is further provided. The storage medium is configured to store program codes for executing the following steps: acquiring predefined information; and performing, according to the predefined information, information reception according to an omnidirectional mode or a directional mode.

Alternatively, the storage medium is further configured to store program codes for executing the step described below. Whether a reception device performs a listen-before-talk (LBT) mechanism before performing information reception according to the omnidirectional mode or the directional mode is determined in one of following manners: predefinition; pre-agreement between a transmitting device and a reception device; indication through physical layer downlink control information (DCI) signaling; or indication through higher-layer radio resource control (RRC) signaling.

Alternatively, the storage medium is further configured to store program codes for executing the step described below. Before the reception device performs the information reception according to the omnidirectional mode, the steps include: performing the LBT mechanism or interference measurement; and performing predetermined processing based on the LBT result or the interference measurement result.

Alternatively, the storage medium is further configured to store program codes for executing the step described below. The step of performing the predetermined processing based on the LBT result or the interference measurement result includes: when the LBT fails or succeeds, reporting the LBT result to a transmission device on a transmitting side; when the LBT fails or succeeds, sending an indication signal to the transmission device on the transmitting side; or when the interference measurement result meets a predetermined threshold, reporting the interference measurement result to the transmission device; or when the interference measurement result meets the predetermined threshold, sending an indication signal to the transmission device.

Alternatively, the storage medium is further configured to store program codes for executing the step described below. The step of performing the predetermined processing based on the LBT result or the interference measurement result includes: when the LBT fails, performing, the reception device performs a reception mode switching operation; or when the interference measurement result meets a predetermined threshold, the reception device performs the reception mode switching operation; or when the LBT fails and a transmission mode switching indication is enabled, the reception device performs the reception mode switching operation; or when the interference measurement result meets the predetermined threshold and the transmission mode switching indication is enabled, the reception device performs the reception mode switching operation.

Alternatively, the storage medium is further configured to store program codes for executing the step described below. The step that the reception device performs the reception mode switching operation includes: switching from an omnidirectional reception mode to a directional reception mode.

Alternatively, the storage medium is further configured to store program codes for executing the step described below. The step that the reception device performs the reception mode switching operation or acquires the transmission mode switching indication in at least one of following manners: physical layer downlink control information (DCI) signaling indication; predefinition; reception of indication information of the sending device; agreement between the sending device and the reception device; indication through higher-layer radio resource control (RRC) signaling; or event-based triggering.

Alternatively, the storage medium is further configured to store program codes for executing the step described below. A directional beam switched by the reception device is determined in at least one of following manners: indication through physical layer downlink control information (DCI) signaling; indication through higher-layer radio resource control (RRC) signaling; predefinition; determining based on measurement; or determining based on a signal to interference plus noise ratio (SINR).

Alternatively, the storage medium is further configured to store program codes for executing the step described below. After switching from the omnidirectional reception mode to the directional reception mode, the method further includes: performing the LBT mechanism on a switched-to beam.

Alternatively, the storage medium is further configured to store program codes for executing the step described below. Before the reception device performs reception according to the directional mode, the method includes: performing the LBT mechanism on a directional beam.

Alternatively, the storage medium is further configured to store program codes for executing the step described below. The step of performing the LBT mechanism on a beam includes one of: if the LBT is successfully performed on the beam, sending indication information to a transmission device; if the LBT fails on the beam, sending indication information to the transmission device; and if the LBT fails on the beam, continuing to perform the LBT mechanism on the beam or switching to another beam for continuing to perform the LBT mechanism.

Alternatively, the storage medium is further configured to store program codes for executing the step described below. The directional mode includes at least one of: a directional transmit beam or a directional receive beam.

Alternatively, the storage medium is further configured to store program codes for executing the step described below. For the reception device, a relationship between the directional transmit beam and the directional receive beam includes: the directional transmit beam being the same as the directional receive beam; or the directional transmit beam being different from the directional receive beam; or the directional transmit beam partially overlapping the directional receive beam.

Alternatively, the storage medium is further configured to store program codes for executing the step described below. The relationship between the directional transmit beam and the directional receive beam is determined in at least one of the following manners: predefinition; pre-agreement between a base station and a user equipment (UE); indication through physical layer downlink control information (DCI) signaling; or configuration through higher-layer radio resource control (RRC) signaling.

Alternatively, the storage medium is further configured to store program codes for executing the step described below. The step of performing the LBT mechanism on a beam includes: determining signal energy received by the reception device in the directional beam; comparing the signal energy received in the directional beam with a predetermined threshold value; and determining, based on the comparison result, a busy/idle state of a channel in the directional beam.

Alternatively, the storage medium is further configured to store program codes for executing the step described below. The step of determining the signal energy received by the reception device in the directional beam includes: the signal energy received by the reception device in a beam range being equal to a norm of a value, where the value is a product of a beamforming weight of the reception device and a sum of signals received in the beam range by the reception device from surrounding devices. Alternatively, the signal energy received by the reception device in the beam range being equal to a norm of a value, where the value is an accumulated sum of the signals received by the reception device in the beam range from all of the surrounding devices. Alternatively, the signal energy received by the reception device in the beam range being equal to $\|V^*(H_1^*X_1 + H_2^*X_2 + \ldots + H_n^*X_n)\|$ or $\|V^*H_1^*X_1 + V^*H_2^*X_2 + \ldots V^*H_n^*X_n\|$ where V denotes the beamforming weight, $H_1, H_2, \ldots, H_n$ each denote a channel matrix between the reception device and one of the surrounding devices, $X_1, X_2, \ldots, X_n$ each denote a transmit signal vector of one of the surrounding devices of the reception device, * denotes a product operator, $\| \|$ denotes a norm operator, n is the number of the surrounding devices of the reception device, $H_i^*X_i$ denotes a signal sent by an i-th surrounding device and received by the reception device, and $V^*H_i^*X_i$ denotes a signal sent by the i-th surrounding device and received by the reception device in the beam range. Alternatively, the signal energy received by the reception device in the beam range being equal to an accumulated sum of signal energy received from all of the surrounding devices by the reception device in the beam range; or the signal energy received by the reception device in the beam range being equal to $\|V^*H_1^*X_1\|+\|V^*H_2^*X_2\|+\ldots+\|V^*H_n^*X_n\|$. V denotes the beamforming weight, $H_1, H_2, \ldots, H_n$ each denote a channel matrix between the reception device and one of the surrounding devices, $X_1, X_2, \ldots, X_n$ each denote a transmit signal vector of one of the surrounding devices of the reception device, * denotes a product operator, $\|\ \|$ denotes a norm operator, n is the number of the surrounding devices of the reception device, $H_i^*X_i$ denotes the signal sent by the i-th surrounding device and received by the reception device, and $V^*H_i^*X_i$ denotes the signal sent by the i-th surrounding device and received by the reception device in the beam range.

Alternatively, the storage medium is further configured to store program codes for executing the step described below. The step of determining the busy/idle state of the channel in the directional beam includes: upon the signal energy received in the directional beam being not greater than the predetermined threshold value, determining that the channel in the directional beam is idle; upon the signal energy received in the directional beam being greater than the predetermined threshold value, determining that the channel in the directional beam is busy.

Alternatively, the storage medium is further configured to store program codes for executing the step described below. When the reception device performs signal reception by using a plurality of directional beams, the reception device determines, according to signal energy received in each of the plurality of directional beams, busy/idle states of channels on the plurality of directional beams or busy/idle states of channels in a beam region formed by the plurality of directional beams.

Alternatively, the storage medium is further configured to store program codes for executing the step described below. The step of determining, according to the signal energy received in the each of the plurality of directional beams, the busy/idle state of the channel on each of the plurality of directional beams or the busy/idle states of the channels in the beam region formed by the plurality of directional beams includes: if the LBT is successfully performed on at least one of the plurality of directional beams, determining that the plurality of directional beams are available or that the channels are idle, and performing transmission only on the directional beam on which the LBT is successfully performed; or if the LBT is successfully performed on all of the plurality of directional beams, determining that the plurality of directional beams are available or that the channels are idle; or if the LBT fails to be performed on at least one of the plurality of directional beams, determining that the plurality of directional beams are not available or that the channels are busy; or if a number of directional beams, among the plurality of directional beams, on which the LBT is successfully performed reaches a predetermined threshold value, determining that the plurality of directional beams are available or that the channels are idle, and performing transmission only on the directional beam on which the LBT is successfully performed; or if a number of directional beams, among the plurality of directional beams, on which the LBT fails to be performed reaches a predetermined threshold value, determining that the plurality of directional beams are not available or that the channels are busy.

Alternatively, the storage medium is further configured to store program codes for executing the step described below. When the reception device performs signal reception by using a plurality of directional beams, the reception device determines, according to a sum of signal energy received in each of the plurality of directional beams, busy/idle states of channels on the plurality of directional beams or busy/idle states of channels in a beam region formed by the plurality of directional beams.

Alternatively, the storage medium is further configured to store program codes for executing the step described below. When the plurality of directional beams belong to a same antenna element or antenna port, a method for calculating the signal energy received in the beam region formed by the plurality of directional beams includes: signal energy received in the beam region formed by the plurality of directional beams is equal to an accumulated sum of signal energy received by the reception device in a first beam, signal energy received by the reception device in a second beam, . . . and signal energy received by the reception device in an m-th beam. Alternatively, the signal energy received in the beam region formed by the plurality of directional beams is equal to $\|V^{1*}(H_1^*X_1+H_2^*X_2+\ldots+H_n^*X_n)\|+\|V^{2*}(H_1^*X_1+H_2^*X_2+\ldots+H_n^*X_n)\|+\ldots\|V^{m*}(H_1^*X_1+H_2^*X_2+\ldots+H_n^*X_n)\|$, where $V^1, V^2, \ldots, V^m$ denote beamforming weights of m beams, $H_1, H_2, \ldots, H_n$ each denote the channel matrix between the reception device and the surrounding device, $X_1, X_2, \ldots, X_n$ each denote the transmit signal vector of the surrounding device of the reception device, * denotes the product operator, $\|\ \|$ denotes the norm operator, n is the number of surrounding devices of the reception device, m is the number of directional beams transmitted by the reception device, $H_j^*X_j$ denotes a signal sent by a j-th surrounding device and received by the reception device, $V^{i*}H_j^*X_j$ denotes a signal sent by the j-th surrounding device and received by the reception device in an i-th beam range, and $V^{i*}(H_1^*X_1+H_2^*X_2+\ldots+H_n^*X_n)$ denotes signals sent by the surrounding devices and received in the i-th beam. Alternatively, the signal energy received in the beam region formed by the plurality of directional beams is equal to a norm of a value, wherein the value is the accumulated sum of the signal energy received by the reception device in the first beam, the signal energy received by the reception device in the second beam, . . . and the signal energy received by the reception device in the m-th beam. Alternatively, the signal energy received in the beam region formed by the plurality of directional beams being equal to $\|V^{1*}(H_1^*X_1+H_2^*X_2+\ldots+H_n^*X_n)+V^{2*}(H_1^*X_1+H_2^*X_2+\ldots+H_n^*X_n)+\ldots+V^{m*}(H_1^*X_1+H_2^*X_2+\ldots+H_n^*X_n)\|$. $V^1, V^2, \ldots, V^m$ denote beamforming weights of m beams, $H_1, H_2, \ldots, H_n$ each denote the channel matrix between the reception device and the surrounding device, $X_1, X_2, \ldots, X_n$ each denote the transmit signal vector of the surrounding device of the reception device, * denotes the product operator, $\|\ \|$ denotes the norm operator, n is the number of surrounding devices of the reception device, m is the number of directional beams transmitted by the reception device, $H_j^*X_j$ denotes a signal sent by the j-th surrounding device and received by the reception device, $V^{i*}H_j^*X_j$ denotes a signal sent by the j-th surrounding device and received by the reception device in an i-th beam range, and $V^{i*}(H_1^*X_1+H_2^*X_2+\ldots+H_n^*X_n)$ denotes signals sent by the surrounding devices and received in the i-th beam.

Alternatively, the storage medium is further configured to store program codes for executing the step described below. When the plurality of directional beams belong to different antenna elements or antenna ports, a method for calculating signal energy received in the beam region formed by the plurality of directional beams includes: signal energy received in the beam region formed by the plurality of directional beams is equal to an accumulated sum of signal energy received by the reception device in a first beam, signal energy received by the reception device in a second beam, . . . and signal energy received by the reception device in an m-th beam. Alternatively, the signal energy received in the beam region formed by the plurality of directional beams is equal to $\|V^{1*}(H_1^{1*}X_1+H_2^{1*}X_2+ \ldots +H_n^{1*}X_n)\|+\|V^{2*}(H_1^{2*}X_1+H_2^{2*}X_2+ \ldots +H_n^{2*}X_n)\|+ \ldots \|V^{m*}(H_1^{m*}X_1+H_2^{m*}X_2+ \ldots +H_n^{m*}X_n)\|$. $V^1, V^2, \ldots, V^m$ denote beamforming weights of m beams, $H_1^i, H_2^i, \ldots, H_n^i$ each denote the channel matrix between the reception device and one of the n surrounding devices on the i-th beam, $X_1, X_2, \ldots, X_n$ each denote the transmit signal vector of the surrounding device of the reception device, $H_j^{i*}X_j$ denotes a signal sent by a j-th surrounding device and received by the reception device, $V^{i*}H_j^{i*}X_j$ denotes a signal sent by the j-th surrounding device and received by the reception device in the i-th beam range, $V^{i*}(H_1^{i*}X_1+H_2^{i*}X_2+ \ldots +H_n^{i*}X_n)$ denotes signals sent by n surrounding devices and received by the reception device in the i-th beam range, $\|V^{i*}(H_1^{i*}X_1+H_2^{i*}X_2+ \ldots +H_n^{i*}X_n)\|$ denotes signal energies received by the reception device in the i-th beam range from n surrounding devices, * denotes the product operator, $\| \|$ denotes the norm operator, n is the number of surrounding devices of the reception device, m is the number of beams. Alternatively, the signal energy received in the beam region formed by the plurality of directional beams is equal to a norm of the accumulated sum of the signal energy received by the reception device in the first beam, the signal energy received by the reception device in the second beam, . . . and the signal energy received by the reception device in the m-th beam. Alternatively, the signal energy received in the beam region formed by the plurality of directional beams is equal to $\|V^{1*}(H_1^{1*}X_1+H_2^{1*}X_2+ \ldots +H_n^{1*}X_n)+V^{2*}(H_1^{2*}X_1+H_2^{2*}X_2+ \ldots +H_n^{2*}X_n)+ \ldots +V^{m*}(H_1^{m*}X_1+H_2^{m*}X_2+ \ldots +H_n^{m*}X_n)\|$. $V^1, V^2, \ldots, V^m$ denote beamforming weights of m beams, $H_1^i, H_2^i, \ldots, H_n^i$ each denote the channel matrix on the i-th beam between the reception device and one of the n surrounding devices, $X_1, X_2, \ldots, X_n$ each denote the transmit signal vector of the surrounding device of the reception device, $H_j^{i*}X_j$ denotes a signal sent by the j-th surrounding device and received by the reception device, $V^{i*}H_j^{i*}X_j$ denotes a signal sent by the j-th surrounding device and received by the reception device in the i-th beam range, $V^{i*}(H_1^{i*}X_1+H_2^{i*}X_2+ \ldots +H_n^{i*}X_n)$ denotes signals sent by n surrounding devices and received by the reception device in the i-th beam range, * denotes the product operator, $\| \|$ denotes the norm operator, n is the number of surrounding devices of the reception device, m is the number of beams. The signal energy received in the beam region formed by the plurality of directional beams is equal to an accumulated sum of signal energies sent by n1 surrounding devices and received by the reception device in the first beam, signal energies sent by n2 surrounding devices and received by the reception device in the second beam, . . . and signal energies sent by nn surrounding devices and received by the reception device in the m-th beam. Alternatively, the signal energy received in the beam region formed by the plurality of directional beams is equal to $\|V^{1*}(H_1^{1*}X_1^1+H_2^{1*}X_2^1+ \ldots +H_{n1}^{1*}X_{n1}^1)\|+\|V^{2*}(H_1^{2*}X_1^2+H_2^{2*}X_2^2+ \ldots +H_{n2}^{2*}X_{n2}^2)\|+ \ldots \|V^{m*}(H_1^{m*}X_1^m+H_2^{m*}X_2^m+ \ldots +H_{nn}^{m*}X_{nn}^m)\|$. $V^1, V^2, \ldots, V^m$ denote beamforming weights of m beams, $H_1^i, H_2^i, \ldots, H_{nj}^i$ each denote the channel matrix between the reception device and one of the nj surrounding devices on the i-th beam, $X_1^i, X_2^i, \ldots, X_{nj}^i$ denotes the transmit signal vectors of the nj surrounding devices of the reception device on the i-th beam, $H_{nj}^{i*}X_{nj}^i$ denotes a signal sent by a nj-th surrounding device and received by the reception device, $V^{i*}H_{nj}^{i*}X_{nj}^i$ denote a signal sent by the nj-th surrounding device and received by the reception device in the i-th beam range, $V^{i*}(H_1^{i*}X_1^i+H_2^{i*}X_2^i+ \ldots +H_{nj}^{i*}X_{nj}^i)$ denotes signals sent by the nj surrounding devices and received by the reception device in the i-th beam range, $\|V^{i*}(H_1^{i*}X_1^i+H_2^{i*}X_2^i+ \ldots +H_{nj}^{i*}X_{nj}^i)\|$ denotes signal energy sent by the nj surrounding devices and received by the reception device in the i-th beam range, * denotes the product operator, $\| \|$ denotes the norm operator, nj is the number of surrounding devices of the reception device, m is the number of beams. Alternatively, the signal energy received in the beam region formed by the plurality of directional beams being equal to a norm of an accumulated sum of signals sent by the n1 surrounding devices and received by the reception device in the first beam, signals sent by the n2 surrounding devices and received by the reception device in the second beam, . . . and signals sent by the nn surrounding devices and received by the reception device in the m-th beam. Alternatively, the signal energy received in the beam region formed by the plurality of directional beams being equal to $$\|V^{1*}(H_1^{1*}X_1^1+H_2^{1*}X_2^1+ \ldots +H_{n1}^{1*}X_{n1}^1)+V^{2*}(H_1^{2*}X_1^2+H_2^{2*}X_2^2+ \ldots +H_{n1}^{2*}X_{n1}^2)+ \ldots +V^{m*}(H_1^{m*}X_1^m+H_2^{m*}X_2^m+ \ldots +H_{nn}^{m*}X_{nn}^m)\|.$$

$V^1, V^2, \ldots, V^m$ denote beamforming weights of m beams, $H_1^i, H_2^i, \ldots, H_{nj}^i$ each denote the channel matrix between the reception device and one of the nj surrounding devices on the i-th beam, $X_1^i, X_2^i, \ldots, X_{nj}^i$ denote the transmit signal vectors of the nj surrounding devices of the reception device on the i-th beam, $H_{nj}^{i*}X_{nj}^i$ denotes a signal sent by a nj-th surrounding device and received by the reception device, $V^{i*}H_{nj}^{i*}X_{nj}^i$ denotes a signal sent by the nj-th surrounding device and received by the reception device in the i-th beam range, $V^{i*}(H_1^{i*}X_1^i+H_2^{i*}X_2^i+ \ldots +H_{nj}^{i*}X_{nj}^i)$ denotes signals sent by the nj surrounding devices and received by the reception device in the i-th beam range, * denotes the product operator, $\| \|$ denotes the norm operator, nj is the number of surrounding devices of the reception device, m is the number of beams. Alternatively, the signal energy received in the beam region formed by the plurality of directional beams being equal to a norm of an accumulated sum of signals sent by the n surrounding devices and received by the reception device in the first beam, signals sent by the n surrounding devices and received by the reception device in the second beam, . . . and signals sent by the n surrounding devices and received by the reception device in the m-th beam. Alternatively, the signal energy received in the beam region formed by the plurality of directional beams being equal to $$\|V^{1*}(H_1^{1*}X_1^1+H_2^{1*}X_2^1+ \ldots +H_n^{1*}X_n^1)+V^{2*}(H_1^{2*}X_1^2+H_2^{2*}X_2^2+ \ldots +H_n^{2*}X_n^2)+ \ldots +V^{m*}(H_1^{m*}X_1^m+H_2^{m*}X_2^m+ \ldots +H_n^{m*}X_n^m)\|.$$

$V^1, V^2, \ldots, V^m$ denote beamforming weights of m beams, $H_1^i, H_2^i, \ldots, H_n^i$ each denote the channel matrix between the reception device and one of the surrounding devices on the i-th beam, $X_1^i, X_2^i, \ldots, X_n^i$ denote the transmit signal vectors of the surrounding devices of the reception device on the i-th beam, * denotes the product operator, $\| \|$ denotes the norm operator, n is the number of surrounding devices of the reception device, m is the number of beams, $H_j^{i*}X_j^i$ denotes a signal sent by the j-th surrounding device and received by the reception device on the i-th beam, and $V^{i*}H_j^{i*}X_j^i$ is the signal sent by the j-th surrounding device and received by the reception device in the i-th beam range Alternatively, the storage medium is further configured to store program codes for executing the step described below. The beamforming weight includes: a transmit beamforming weight of the reception device; or a receive beamforming weight of the reception device.

Alternatively, the storage medium is further configured to store program codes for executing the step described below. The transmit beamforming weight and/or the receive beamforming weight is determined in one of following manners: in a manner of predefinition; in a manner of configuration by a base station; in a manner of configuration by a user equipment (UE); in a manner of pre-agreement between the base station and the UE; in a manner of indication through physical layer downlink control information (DCI) signaling; or in a manner of performing singular value decomposition (SVD) on a channel matrix H between a transmitting device and the reception device.

Alternatively, the storage medium is further configured to store program codes for executing the step described below. When the reception device performs signal reception by using a plurality of directional beams, channel conditions of the plurality of directional beams are determined according to signal energy received in a beam region formed by the plurality of directional beams.

Alternatively, the storage medium is further configured to store program codes for executing the step described below. Calculation of the signal energy received in the beam region formed by the plurality of directional beams includes: the signal energy received in the beam region formed by the plurality of directional beams is equal to a norm of a value, where the value is a product of a sum of signals received from surrounding devices of the reception device and a beamforming weight formed by the plurality of directional beams.

Alternatively, the storage medium is further configured to store program codes for executing the step described below. When signal energy received in a beam coverage range formed by the plurality of directional beams is not greater than a predetermined threshold value, determining that channels in a beam formed by the plurality of directional beams are idle or that channels in the plurality of directional beams are idle; or when the signal energy received in the beam coverage range formed by the plurality of directional beams is greater than the predetermined threshold value, determining that the channels in the beam formed by the plurality of directional beams are busy or that the channels in the plurality of directional beams are busy.

Alternatively, the storage medium is further configured to store program codes for executing the step described below. When the channels in the beams are detected to be busy, the reception device performs an LBT detection on a finer directional beam in the directional beam on which the LBT fails; or performs the LBT detection on directional beams other than the directional beams on which the LBT fails.

Alternatively, the storage medium is further configured to store program codes for executing the step described below. When the reception device performs the LBT mechanism on a plurality of directional beams, the reception device performs Cat2 LBT simultaneously on the plurality of directional beams; or the reception device performs Cat4 LBT on a main directional beam of the plurality of directional beams, and when the LBT process is about to be completed, the reception device starts performing the Cat2 LBT on other directional beams; or the reception device performs the Cat4 LBT on the plurality of directional beams.

Alternatively, the storage medium is further configured to store program codes for executing the step described below. The main directional beam of the plurality of directional beams is determined in one of following manners: determination by a base station, determination by a user equipment (UE), determination by the base station and the UE, predefinition, indication through physical layer downlink control information (DCI) signaling, or indication through higher-layer radio resource control (RRC) signaling.

Alternatively, the storage medium is further configured to store program codes for executing the step described below. When performing the Cat4 LBT on the plurality of directional beams, random backoff values N are generated for the plurality of directional beams respectively; or the plurality of directional beams use the same random backoff value N.

Alternatively, the storage medium is further configured to store program codes for executing the following step: performing a Cat2 LBT mechanism on a directional beam or using Cat2 LBT having a shorter detection duration in a transmission period, a channel occupancy time, or abeam group; or performing the Cat2 LBT mechanism, a Cat4 LBT mechanism, Cat4 LBT corresponding to a predetermined priority level, or Cat3 LBT on a directional beam outside the transmission period, the channel occupancy time, or the beam group; or performing the Cat4 LBT mechanism, the Cat4 LBT corresponding to the predetermined priority level, or the Cat3 LBT on a directional beam in the transmission period, or the channel occupancy time, or an initial beam group.

Alternatively, the storage medium is further configured to store program codes for executing the step described below. The predetermined priority level or an LBT mechanism used for the directional beam is determined in one of following manners: pre-agreement between a base station and a user equipment (UE); predefinition; indication through physical layer downlink control information (DCI) signaling by the base station; or indication through higher-layer radio resource control (RRC) signaling.

Alternatively, the storage medium is further configured to store program codes for executing the following step: performing a same LBT mechanism or different LBT mechanisms on directional beams in different beam groups or different channel occupancy times or different transmission periods.

Alternatively, the storage medium is further configured to store program codes for executing the step described below. The predefined information includes at least one of: a transmission mode, indication signaling, an information type, frame structure information, a beam identifier (ID), a beamforming weight, a beam type, a beam pattern, a threshold value, an LBT mechanism indication, a time domain resource, a corresponding relationship between the time domain resource and a beam, a frequency domain resource, a frequency domain hopping manner, a channel reciprocity indication, data, a beam switching indication, or a transmission mode switching indication.

Alternatively, the storage medium is further configured to store program codes for executing the step described below. The indication signaling includes at least one of: physical layer downlink control information (DCI) signaling, or higher-layer radio resource control (RRC) signaling.

Alternatively, the storage medium is further configured to store program codes for executing the step described below. The information type includes at least one of: control information, data, a reference signal, or a traffic type.

Alternatively, the storage medium is further configured to store program codes for executing the step described below. The beam type includes: a single-beam type and a multi-beam type.

Alternatively, the storage medium is further configured to store program codes for executing the step described below. The predefined information is determined in at least one of following manners: predefinition, pre-agreement between a base station and a user equipment (UE), indication through physical layer downlink control information (DCI) signaling, or configuration through higher-layer radio resource control (RRC) signaling.

Alternatively, the storage medium is further configured to store program codes for executing the step described below. Before the reception device performs reception according to the directional mode, a non-listen-before-talk (LBT) predetermined processing operation is performed.

Alternatively, the storage medium is further configured to store program codes for executing the step described below. The step of performing the predetermined non-LBT processing operation includes one of the following: performing directional beam randomization; processing using directional beam pattern; or processing using semi-statically configured directional beam.

Alternatively, the storage medium is further configured to store program codes for executing the step described below. The step of performing the directional beam randomization or processing using the directional beam pattern includes: determining a receive beam or a receive beam pattern according to a fixed rule; or determining the receive beam or the receive beam pattern in a random manner.

Alternatively, the storage medium is further configured to store program codes for executing the step described below. The step of determining the receive beam or the receive beam pattern according to the fixed rule includes: determining the receive beam according to a decreasing order of beam index; or determining the receive beam pattern according to a decreasing order of beam pattern index; or determining the receive beam according to an increasing order of beam index; or determining the receive beam pattern according to an increasing order of beam pattern index; or determining the receive beam according to at least one of beams with even indexes/beams with odd indexes; or determining the receive beam pattern according to at least one of beam patterns with even indexes/beam patterns with odd indexes; or determining the receive beam according to beams with even indexes and an increasing order or a decreasing order, or according to beams with odd indexes and in the increasing order or the decreasing order; or determining the receive beam pattern according to beam patterns with even indexes and an increasing order or a decreasing order, or according to beam patterns with odd indexes and in the increasing order or the decreasing order; or determining, from a plurality of beams, a beam as the receive beam, wherein the index of the beam in the plurality of beams modulo an offset is equal to M; or determining, from a plurality of beam patterns, a beam pattern as the receive beam pattern, wherein the index of the beam pattern in the plurality of beam patterns modulo an offset is equal to M; or indicating, through physical layer downlink control information (DCI) signaling, the beam index, the beam pattern, the offset in the beam, or an offset in a beam pattern set used by the reception device; or indicating, through higher-layer radio resource control (RRC) signaling, the beam index, the beam pattern, the offset in the beam, or the offset in the beam pattern set used by the reception device.

Alternatively, the storage medium is further configured to store program codes for executing the step described below. The step of indicating the receive beam or the receive beam pattern through the physical layer DCI signaling or the higher-layer RRC signaling includes: determining the receive beam or the receive beam pattern through a value corresponding to a number of bits of bit information; or determining the receive beam or the receive beam pattern through a bitmap; or determining the receive beam or the receive beam pattern through a beam indication field.

Alternatively, the storage medium is further configured to store program codes for executing the step described below. The fixed rule, the offset or M is determined in one of following manners: predefinition; pre-agreement between a base station and a user equipment (UE); indication through the physical layer DCI signaling; or configuration through the higher-layer RRC signaling.

Alternatively, the storage medium is further configured to store program codes for executing the step described below. The step of determining the receive beam or the receive beam pattern in the random manner includes: generating a positive integer within [1, p] or [0, p−1] in a manner of a random sequence or in a manner of a random function; where p is the number of the beams.

Alternatively, the storage medium is further configured to store program codes for executing the step described below. The random function includes: a uniform distribution function; a binomial distribution function; or a normal distribution function.

Alternatively, the storage medium is further configured to store program codes for executing the step described below. The fixed rule and/or the random manner are determined in one of following manners: predefinition; pre-agreement between a base station and a user equipment (UE); indication through physical layer downlink control information (DCI) signaling; or configuration through higher-layer radio resource control (RRC) signaling.

Alternatively, the storage medium is further configured to store program codes for executing the step described below. The step of processing using the semi-statically configured directional beam includes: in a predetermined period, measuring a configured directional beam or a beam in a directional beam set, and determining, based on measurement information, whether to perform a directional beam switching operation.

Alternatively, the storage medium is further configured to store program codes for executing the step described below. A criterion for determining directional beam switching includes: performing the directional beam switching operation when a load, an interference value, or an information transmission error probability on a current receive beam in the predetermined period is measured to be greater than a predetermined threshold value; or not performing the directional beam switching operation when the load, the interference value, or the information transmission error probability on the current receive beam in the predetermined period is measured to be not greater than the predetermined threshold value.

Alternatively, the storage medium is further configured to store program codes for executing the step described below. Cat2 LBT, or Cat2 LBT having a shorter detection duration, or Cat4 LBT corresponding to a predetermined priority level, is performed on a beam having a larger load, interference value, or information transmission error probability.

Alternatively, the storage medium is further configured to store program codes for executing the step described below. The predetermined priority level is determined through one of: a traffic type; or indication through physical layer downlink control information (DCI) signaling; or predefinition; or different signals, and/or different channels, and/or different beams.

Alternatively, the storage medium is further configured to store program codes for executing the step described below. A channel occupation duration of a beam having a smaller load, interference value, or information transmission error probability is adjusted.

Alternatively, the storage medium is further configured to store program codes for executing the step described below. A measurement quantity to be measured includes: a received signal strength indication (RSSI); reference signal receiving power (RSRP); reference signal receiving quality (RSRQ); or acknowledgement (ACK)/negative acknowledgement (NACK) feedback information.

An electronic device is further provided in an embodiment of the present disclosure and includes:

at least one processor; and a memory communicably connected to the at least one processor.

The memory stores instructions executable by the at least one processor that executes the instructions to execute the method described above.

According to the present disclosure, the signals in the beamforming system are separately processed by performing the LBT mechanism or performing the predetermined non-LBT processing operation, which effectively solves the inefficient signal transmission problem in the beamforming system in the related art. Furthermore, the inefficient signal transmission problem in the beamforming system is solved.

BRIEF DESCRIPTION OF DRAWINGS

The drawings described herein are used for providing an understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

The present disclosure will be described hereinafter in detail with reference to the drawings and in conjunction with embodiments. If not in collision, the embodiments described herein and the features thereof may be combined with each other.

The terms "first", "second" and the like in the specification, claims and above drawings of the present disclosure are used to distinguish between similar objects and are not necessarily used to describe a particular order or sequence.

Embodiment 1

Figure 1:
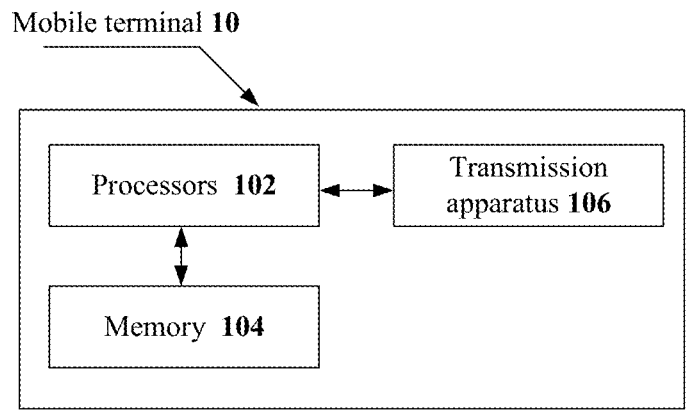
FIG. 1 is a block diagram of a hardware configuration of a mobile terminal for a data transmission method according to an embodiment of the present disclosure.

A method embodiment provided by the embodiment 1 of the present application may be executed in a mobile terminal, a computer terminal or other similar computing apparatuses. In an example, the method is executed in the mobile terminal. FIG. 1 is a block diagram of a hardware configuration of a mobile terminal of a data transmission method according to the embodiment of the present disclosure. As shown in FIG. 1, a mobile terminal 10 may include one or more (only one processor is shown in FIG. 1) processors 102

(the processors 102 may include, but are not limited to, a processing apparatus such as a microcontroller unit (MCU) and a field programmable gate array (FPGA)), a memory 104 configured to store data, and a transmission apparatus 106 configured to implement a communication function. The memory 104 stores instructions executable by at least one processor 102. Execution of the instructions by the at least one processor 102 causes the at least one processor 102 to execute the data transmission method and the data reception method described below. It should be understood by those skilled in the art that the structure shown in FIG. 1 is merely illustrative, and not intended to limit the structure of the electronic apparatus described above. For example, the mobile terminal 10 may further include more or fewer components than that shown in FIG. 1, or may have a configuration different from the configuration shown in FIG. 1.

The memory 104 may be configured to store software programs and modules of application software, such as program instructions/modules corresponding to the data transmission method in the embodiments of the present disclosure. The processor 102 executes the software programs and modules stored in the memory 104 to perform functional applications and data processing, that is, to implement the method described above. The memory 104 may include a high-speed random access memory, and may further include a nonvolatile memory, such as one or more magnetic storage apparatuses, flash memories or other nonvolatile solid-state memories. In some examples, the memory 104 may include memories which are remotely disposed with respect to the one or more processors 102 and these remote memories may be connected to the mobile terminal 10 via a network. Examples of the preceding network include, but are not limited to, the Internet, an intranet, a local area network, a mobile communication network and a combination thereof.

The transmission apparatus 106 is configured to receive or send data via a network. Examples of such a network may include a wireless network provided by a communication provider of the mobile terminal 10. In one example, the transmission apparatus 106 includes a network interface controller (NIC), which may be connected to other network devices via a base station and thus is capable of communicating with the Internet. In one example, the transmission apparatus 106 may be a radio frequency (RF) module, which is configured to communicate with the Internet in a wireless way.

Figure 2:
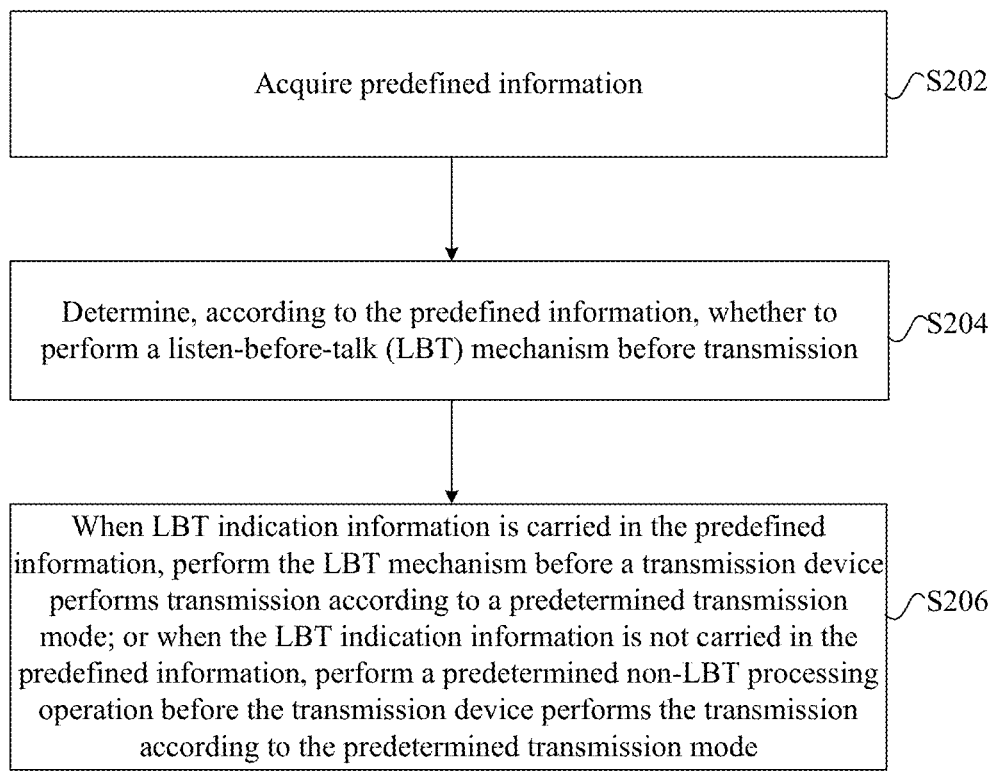
FIG. 2 is a flowchart of a data transmission method according to an embodiment of the present disclosure.

The present embodiment provides a data transmission method to be executed in the mobile terminal or network architecture described above. FIG. 2 is a flowchart of the data transmission method according to the embodiment of the present disclosure. As shown in FIG. 2, the method includes the steps described below.

In S202, predefined information is obtained.

In S204, it is determined, according to the predefined information, whether to perform a listen-before-talk (LBT) mechanism before transmission.

In S206, when LBT indication information is carried in the predefined information, the LBT mechanism is performed before a transmission device performs transmission according to a predetermined transmission mode; or when the LBT indication information is not carried in the predefined information, a predetermined non-LBT processing operation is performed before the transmission device performs the transmission according to the predetermined transmission mode.

With the steps described above, the signals in the beamforming system are separately transmitted by performing the LBT mechanism or performing the predetermined non-LBT processing operation, which effectively solves the inefficient signal transmission problem in the beamforming system.

Alternatively, the predetermined transmission mode may include: an omnidirectional mode or a directional mode. The directional mode may include at least one of: a directional transmit beam or a directional receive beam.

For one transmission device, the directional transmit beam and the directional receive beam may have multiple relationships. For example, the relationship includes: the directional transmit beam being the same as the directional receive beam; or the directional transmit beam being different from the directional receive beam; or the directional transmit beam partially overlapping the directional receive beam.

The relationship between the directional transmit beam and the directional receive beam may be determined in various ways. For example, the relationship between the directional transmit beam and the directional receive beam may be determined in at least one of the following manners: predefinition; pre-agreement between a base station and a UE; indication through physical layer downlink control information (DCI) signaling; or configuration through higher-layer radio resource control (RRC) signaling.

Alternatively, when the transmission device performs transmission according to the directional mode, the step of performing the LBT mechanism before performing the transmission according to the directional mode includes: determining signal energy received by the transmission device in a directional beam; comparing the signal energy received in the directional beam with a predetermined threshold value; and determining, based on the comparison result, a busy/idle state of a channel in the directional beam.

The signal energy received by the transmission device in the directional beam may be determined in one of the following manners.

(1) Signal energy received by the transmission device in a beam range is equal to a norm of a value, where the value is a product of a beamforming weight of the transmission device and a sum of signals received in the beam range by the transmission device from surrounding devices.

(2) The signal energy received by the transmission device in the beam range is equal to a norm of a value, where the value is an accumulated sum of the signals received by the transmission device in the beam range from all of the surrounding devices.

(3) The signal energy received by the transmission device in the beam range is equal to:

$$\|V*(H_1*X_1+H_2*X_2+\ldots+H_n*X_n)\| \text{ or } \|V*H_1*X_1+V*H_2*X_2+\ldots V*H_n*X_n\|$$

V denotes the beamforming weight, $H_1, H_2, \ldots, H_n$ each denote a channel matrix between the transmission device and one of the surrounding devices, $X_1, X_2, \ldots, X_n$ each denote a transmit signal vector of one of the surrounding devices of the transmission device, * denotes a product operator, $\|\ \|$ denotes a norm operator, n is the number of the surrounding devices of the transmission device, $H_i*X_i$ denotes a signal sent by the i-th surrounding device and received by the transmission device, and $V*H_i*X_i$ denotes a signal sent by the i-th surrounding device and received by the transmission device in the beam range.

(4) The signal energy received by the transmission device in the beam range is equal to an accumulated sum of signal energy received from all of the surrounding devices by the transmission device in the beam range.

(5) The signal energy received by the transmission device in the beam range is equal to $\|V^*H_1^*X_1\|+\|V^*H_2^*X_2\|+ \ldots +\|V^*H_n^*X_n\|$. V denotes the beamforming weight, $H_1$, $H_2, \ldots, H_n$ each denote a channel matrix between the transmission device and one of the surrounding devices, $X_1$, $X_2, \ldots, X_n$ each denote a transmit signal vector of one of the surrounding devices of the transmission device, * denotes a product operator, $\| \|$ denotes a norm operator, n is the number of the surrounding devices of the transmission device, $H_i^*X_i$ denotes the signal sent by the i-th surrounding device and received by the transmission device, and $V^*H_i^*X_i$ denotes the signal sent by the i-th surrounding device and received by the transmission device in the beam range.

The step of determining the busy/idle state of the channel in the directional beam includes: upon the signal energy received in the directional beam being not greater than the predetermined threshold value, determining that the channel in the directional beam is idle; or upon the signal energy received in the directional beam being greater than the predetermined threshold value, determining that the channel in the directional beam is busy.

Optionally, when the transmission device performs transmission by using a plurality of directional beams, the transmission device determines, according to signal energy received in each of the plurality of directional beams, busy/idle states of channels on the plurality of directional beams or busy/idle states of channels in a beam region formed by the plurality of directional beams.

Optionally, the step of determining, according to the signal energy received in the each of the plurality of directional beams, the busy/idle states of the channels on the plurality of directional beams or the busy/idle states of the channels in the beam region formed by the plurality of directional beams includes: if the LBT is successfully performed on at least one of the plurality of directional beams, considering that the plurality of directional beams are available or that the channels are idle, and performing transmission only on the directional beam on which the LBT is successfully performed; or if the LBT is successfully performed on all of the plurality of directional beams, considering that the plurality of directional beams are available or that the channels are idle; or if the LBT fails on at least one of the plurality of directional beams, considering that the plurality of directional beams are not available or that the channels are busy; or if the number of directional beams, among the plurality of directional beams, on which the LBT is successfully performed reaches a predetermined threshold value, considering that the plurality of directional beams are available or that the channels are idle, and performing transmission only the directional beam on which the LBT is successfully performed; or if the number of directional beams, among the plurality of directional beams, on which the LBT fails reaches a predetermined threshold value, considering that the plurality of directional beams are not available or that the channels are busy.

Optionally, when the transmission device performs transmission by using a plurality of directional beams, the transmission device determines, according to a sum of signal energies received in the plurality of directional beams, busy/idle states of channels on the plurality of directional beams or busy/idle states of channels in a beam region formed by the plurality of directional beams.

The plurality of directional beams may belong to the same antenna element or antenna port or different antenna elements or antenna ports, which are separately described below.

When the plurality of directional beams belong to the same antenna element or antenna port, a method for calculating signal energy received in the beam region formed by the plurality of directional beams includes one of the following. (1) Signal energy received in the beam region formed by the plurality of directional beams is equal to an accumulated sum of signal energy received by the transmission device in a first beam, signal energy received by the transmission device in a second beam, . . . and signal energy received by the transmission device in an m-th beam. (2) The signal energy received in the beam region formed by the plurality of directional beams is equal to $$\|V^{1*}(H_1^*X_1+H_2^*X_2+ \ldots +H_n^*X_n)\|+\|V^{2*}(H_1^*X_1+H_2^*X_2+ \ldots +H_n^*X_n)\|+ \ldots \|V^{m*}(H_1^*X_1+H_2^*X_2+ \ldots +H_n^*X_n)\|,$$

where $V^1, V^2, \ldots, V^m$ denote beamforming weights of m beams, $H_1, H_2, \ldots, H_n$ each denote the channel matrix between the transmission device and the surrounding device, $X_1, X_2, \ldots, X_n$ each denote the transmit signal vector of the surrounding device of the transmission device, * denotes the product operator, $\| \|$ denotes the norm operator, n is the number of surrounding devices of the transmission device, m is the number of directional beams transmitted by the transmission device, $H_j^*X_j$ denotes a signal sent by the j-th surrounding device and received by the transmission device, $V^{i*}H_j^*X_j$ denotes a signal sent by the j-th surrounding device and received by the transmission device in the i-th beam range, and $V^{i*}(H_1^*X_1+H_2^*X_2+ \ldots +H_n^*X_n)$ denotes signals sent by the surrounding devices and received in the i-th beam. (3) The signal energy received in the beam region formed by the plurality of directional beams is equal to a norm of a value, where the value is the accumulated sum of the signal energy received by the transmission device in the first beam, the signal energy received by the transmission device in the second beam, . . . and the signal energy received by the transmission device in the m-th beam. (4) the signal energy received in the beam region formed by the plurality of directional beams is equal to $$\|V^{1*}(H_1^*X_1+H_2^*X_2+ \ldots +H_n^*X_n)+V^{2*}(H_1^*X_1+H_2^*X_2+ \ldots +H_n^*X_n)+ \ldots +V^{m*}(H_1^*X_1+H_2^*X_2+ \ldots +H_n^*X_n)\|.$$

$V^1, V^2, \ldots, V^m$ denote beamforming weights of m beams, $H_1, H_2, \ldots, H_n$ each denote the channel matrix between the transmission device and the surrounding device, $X_1$, $X_2, \ldots, X_n$ each denote the transmit signal vector of the surrounding device of the transmission device, * denotes the product operator, $\| \|$ denotes the norm operator, n is the number of surrounding devices of the transmission device, m is the number of directional beams transmitted by the transmission device, $H_j^*X_j$ denotes a signal sent by the j-th surrounding device and received by the transmission device, $V^{i*}H_j^*X_j$ denotes a signal sent by the j-th surrounding device and received by the transmission device in an i-th beam range, and $V^{i*}(H_1^*X_1+H_2^*X_2+ \ldots +H_n^*X_n)$ denotes signals sent by the surrounding devices and received in the i-th beam.

When the plurality of directional beams belong to different antenna elements or antenna ports, a method for calculating signal energy received in the beam region formed by the plurality of directional beams may include one of the following. (1) Signal energy received in the beam region formed by the plurality of directional beams is equal to an accumulated sum of signal energy received by the reception device in a first beam, signal energy received by the reception device in a second beam, . . . and signal energy received by the reception device in the m-th beam. (2) The signal energy received in the beam region formed by the plurality of directional beams is equal to $$\|V^{1*}(H_1^{1*}X_1+H_2^{1*}X_2+\ldots+H_n^{1*}X_n)\|+\|V^{2*}(H_1^{2*}X_1+H_2^{2*}X_2+\ldots+H_n^{2*}X_n)\|+\ldots\|V^{m*}(H_1^{m*}X_1+H_2^{m*}X_2+\ldots+H_n^{m*}X_n)\|.$$

$V^1, V^2, \ldots, V^m$ denote beamforming weights of m beams, $H_1^i, H_2^i, \ldots, H_n^i$ each denote the channel matrix between the transmission device and one of the n surrounding devices on the i-th beam, $X_1, X_2, \ldots, X_n$ each denote the transmit signal vector of the surrounding device of the transmission device, $H_j^i*X_j$ denotes a signal sent by the j-th surrounding device and received by the transmission device, $V^{i*}H_j^i*X_j$ denotes a signal sent by the j-th surrounding device and received by the transmission device in the i-th beam range, $V^{i*}(H_1^i*X_1+H_2^i*X_2+\ldots+H_n^i*X_n)$ denotes signals sent by n surrounding devices and received by the transmission device in the i-th beam range, $\|V^{i*}(H_1^i*X_1+H_2^i*X_2+\ldots+H_n^i*X_n)\|$ denotes signal energies received by the transmission device in the i-th beam range from n surrounding devices, * denotes the product operator, $\|\ \|$ denotes the norm operator, n is the number of surrounding devices of the transmission device, m is the number of beams. (3) Signal energy received in the beam region formed by the plurality of directional beams is equal to a norm of the accumulated sum of the signal energy received by the transmission device in the first beam, the signal energy received by the transmission device in the second beam, . . . and the signal energy received by the transmission device in the m-th beam. (4) The signal energy received in the beam region formed by the plurality of directional beams is equal to $$\|V^{1*}(H_1^{1*}X_1+H_2^{1*}X_2+\ldots+H_n^{1*}X_n)+V^{2*}(H_1^{2*}X_1+H_2^{2*}X_2+\ldots+H_n^{2*}X_n)+\ldots+V^{m*}(H_1^{m*}X_1+H_2^{m*}X_2+\ldots+H_n^{m*}X_n)\|.$$

$V^1, V^2, \ldots, V^m$ denote beamforming weights of m beams, $H_1^i, H_2^i, \ldots, H_n^i$ each denote the channel matrix on the i-th beam between the transmission device and one of the n surrounding devices, $X_1, X_2, \ldots, X_n$ each denote the transmit signal vector of the surrounding device of the transmission device, $H_j^i*X_j$ denotes a signal sent by the j-th surrounding device and received by the transmission device, $V^{i*}H_j^i*X_j$ denotes a signal sent by the j-th surrounding device and received by the transmission device in the i-th beam range, $V^{i*}(H_1^i*X_1+H_2^i*X_2+\ldots+H_n^i*X_n)$ denotes signals sent by n surrounding devices and received by the transmission device in the i-th beam range, * denotes the product operator, $\|\ \|$ denotes the norm operator, n is the number of surrounding devices of the transmission device, m is the number of beams. (5) The signal energy received in the beam region formed by the plurality of directional beams is equal to an accumulated sum of signal energies sent by n1 surrounding devices and received by the transmission device in the first beam, signal energies sent by n2 surrounding devices and received by the transmission device in the second beam, . . . and signal energies sent by nn surrounding devices and received by the transmission device in the m-th beam. (6) The signal energy received in the beam region formed by the plurality of directional beams is equal to $$\|V^{1*}(H_1^{1*}X_1^1+H_2^{1*}X_2^1+\ldots+H_{n1}^{1*}X_{n1}^1)\|+\|V^{2*}(H_1^{2*}X_1^2+H_2^{2*}X_2^2+\ldots+H_{n2}^{2*}X_{n2}^2)\|+\ldots\|V^{m*}(H_1^{m*}X_1^m+H_2^{m*}X_2^m+\ldots+H_{nn}^{m*}X_{nn}^m)\|.$$

$V^1, V^2, \ldots, V^m$ denote beamforming weights of m beams, $H_1^i, H_2^i, \ldots, H_{nj}^i$ each denote the channel matrix between the transmission device and one of the nj surrounding devices on the i-th beam, $X_1^i, X_2^i, \ldots, X_{nj}^i$ denotes the transmit signal vectors of the nj surrounding devices of the transmission device on the i-th beam, $H_{nj}^i*X_{nj}^i$ denotes a signal sent by a nj-th surrounding device and received by the transmission device, $V^{i*}H_{nj}^i*X_{nj}^i$ denote a signal sent by the nj-th surrounding device and received by the transmission device in the i-th beam range, $V^{i*}(H_1^i*X_1^i+H_2^i*X_2^i+\ldots+H_{nj}^i*X_{nj}^i)$ denotes signals sent by the nj surrounding devices and received by the transmission device in the i-th beam range, $\|V^{i*}(H_1^i*X_1^i+H_2^i*X_2^i+\ldots+H_{nj}^i*X_{nj}^i)\|$ denotes signal energy sent by the nj surrounding devices and received by the transmission device in the i-th beam range, * denotes the product operator, $\|\ \|$ denotes the norm operator, nj is the number of the surrounding devices of the transmission device, m is the number of beams. (7) The signal energy received in the beam region formed by the plurality of directional beams is equal to a norm of an accumulated sum of signals sent by the n1 surrounding devices and received by the transmission device in the first beam, signals sent by the n2 surrounding devices and received by the transmission device in the second beam, . . . and signals sent by the nn surrounding devices and received by the transmission device in the m-th beam. (8) The signal energy received in the beam region formed by the plurality of directional beams is equal to $\|V^{1*}(H_1^{1*}X_1^1+H_2^{1*}X_2^1+\ldots+H_{n1}^{1*}X_{n1}^1)+V^{2*}(H_1^{2*}X_1^2+H_2^{2*}X_2^2+\ldots+H_{n1}^{2*}X_{n1}^2)+\ldots+V^{m*}(H_1^{m*}X_1^m+H_2^{m*}X_2^m+\ldots+H_{nn}^{m*}X_{nn}^m)\|$. $V^1, V^2, \ldots, V^m$ denote beamforming weights of m beams, $H_1^i, H_2^i, \ldots, H_{nj}^i$ each denote the channel matrix between the transmission device and one of the nj surrounding devices on the i-th beam, $X_1^i, X_2^i, \ldots, X_{nj}^i$ denote the transmit signal vectors of the nj surrounding devices of the transmission device on the i-th beam, $H_{nj}^i*X_{nj}^i$ denotes a signal sent by a nj-th surrounding device and received by the transmission device, $V^{i*}H_{nj}^i*X_{nj}^i$ denotes a signal sent by the nj-th surrounding device and received by the transmission device in the i-th beam range, $V^{i*}(H_1^i*X_1^i+H_2^i*X_2^i+\ldots+H_{nj}^i*X_{nj}^i)$ denotes signals sent by the nj surrounding devices and received by the transmission device in the i-th beam range, * denotes the product operator, $\|\ \|$ denotes the norm operator, nj is the number of the surrounding devices of the transmission device, m is the number of beams. (9) The signal energy received in the beam region formed by the plurality of directional beams is equal to a norm of an accumulated sum of signals sent by the n surrounding devices and received by the transmission device in the first beam, signals sent by the n surrounding devices and received by the transmission device in the second beam, . . . and signals sent by the n surrounding devices and received by the transmission device in the m-th beam. (10) The signal energy received in the beam region formed by the plurality of directional beams is equal to $\|V^{1*}(H_1^{1*}X_1^1+H_2^{1*}X_2^1+\ldots+H_n^{1*}X_n^1)+V^{2*}(H_1^{2*}X_1^2+H_2^{2*}X_2^2+\ldots+H_n^{2*}X_n^2)+\ldots+V^{m*}(H_1^{m*}X_1^m+H_2^{m*}X_2^m+\ldots+H_n^{m*}X_n^m)\|$. $V^1, V^2, \ldots, V^m$ denote beamforming weights of m beams, $H_1^i, H_2^i, \ldots, H_n^i$ each denote the channel matrix between the transmission device and one of the surrounding devices on the i-th beam, $X_1^i, X_2^i, \ldots, X_n^i$ denote the transmit signal vectors of the surrounding devices of the transmission device on the i-th beam, * denotes the product operator, $\|\ \|$ denotes the norm operator, n is the number of surrounding devices of the transmission device, m is the number of beams, i is a positive integer within [1, m], $H_j^i*X_j^i$ denotes a signal sent by the j-th surrounding device and received by the transmission device on the i-th beam, and $V^{i*}H_j^i*X_j^i$ is the signal sent by the j-th surrounding device and received by the transmission device in the i-th beam range.

The beamforming weight may include: a transmit beamforming weight of the transmission device; or a receive beamforming weight of the transmission device.

Optionally, the transmit beamforming weight and/or the receive beamforming weight may be determined in one of following manners: the transmit beamforming weight and/or the receive beamforming weight are predefined; the transmit beamforming weight and/or the receive beamforming weight are configuration by a base station; the transmit beamforming weight and/or the receive beamforming weight are configuration by a user equipment (UE); the transmit beamforming weight and/or the receive beamforming weight are pre-agreed by the base station and the UE; the transmit beamforming weight and/or the receive beamforming weight are indicated through physical layer downlink control information (DCI) signaling; or the transmit beamforming weight and/or the receive beamforming weight are determined by means of performing singular value decomposition (SVD) on a channel matrix H between a transmitting device and the reception device.

Optionally, when the transmission device performs transmission by using a plurality of directional beams, the transmission device determines channel conditions of the plurality of directional beams according to signal energy received in a beam region formed by the plurality of directional beams.

Optionally, the signal energy received in the beam region formed by the plurality of directional beams is calculated as follows. The signal energy received in the beam region formed by the plurality of directional beams being equal to a norm of a product of a sum of signals received from surrounding devices of the transmission device and a beamforming weight formed by the plurality of directional beams.

The busy/idle state of channel is determined in the following manner. Upon the signal energy received in a beam coverage range formed by the plurality of directional beams being not greater than a predetermined threshold value, determining that the channel in the beam formed by the plurality of directional beams is idle or that the channel in the plurality of directional beams is idle. Alternatively, upon the signal energy received in the beam coverage range formed by the plurality of directional beams being greater than the predetermined threshold value, determining that the channel in the beam formed by the plurality of directional beams is busy or that the channel in the plurality of directional beams is busy.

Optionally, when the channel is detected to be busy, the transmission device performs an LBT detection on a finer directional beam in the directional beam on which the LBT fails to be performed; or performs the LBT detection on directional beam other than the directional beam on which the LBT fails.

Optionally, in the case where the transmission device performs the LBT mechanism on a plurality of directional beams: the transmission device performs Cat2 LBT simultaneously on the plurality of directional beams; or the transmission device performs Cat4 LBT on a main directional beam of the plurality of directional beams, and when the LBT process is about to be completed, starts performing the Cat2 LBT on other directional beams; or the transmission device performs the Cat4 LBT on the plurality of directional beams.

Optionally, the main directional beam of the plurality of directional beams may be determined in various manners, for example, the main directional beam is determined by a base station, or the main directional beam is determined by a user equipment (UE), or the main directional beam is determined by the base station and the UE, the main directional beam is predefined, the main directional beam is indicated through physical layer downlink control information (DCI) signaling, or the main directional beam is indicated through higher-layer radio resource control (RRC) signaling.

Optionally, when the Cat4 LBT is performed on the plurality of directional beams, random backoff values N are respectively generated for the plurality of directional beams; or the same random backoff value N is used for all of the plurality of directional beams.

Optionally, a Cat2 LBT mechanism is performed on a directional beam or Cat2 LBT having a shorter detection duration is used in a beam group, a channel occupancy time, or a transmission period. Alternatively, the Cat2 LBT mechanism, a Cat4 LBT mechanism, Cat4 LBT corresponding to a predetermined priority level, or Cat3 LBT is performed on a directional beam outside the beam group, the channel occupancy time, or the transmission period. Alternatively, the Cat4 LBT mechanism, the Cat4 LBT corresponding to the predetermined priority level, or the Cat3 LBT is performed on a directional beam in an initial beam group, or on the directional beam in the channel occupancy time, or the transmission period.

Optionally, the predetermined priority level or the LBT mechanism used for the directional beam may also be determined in one of following manners. The predetermined priority level or the LBT mechanism is pre-agreed by a base station and a user equipment (UE). The predetermined priority level or the LBT mechanism is predefined. The predetermined priority level or the LBT mechanism is indicated through physical layer downlink control information (DCI) signaling by the base station. The predetermined priority level or the LBT mechanism is indicated through higher-layer radio resource control (RRC) signaling.

A same LBT mechanism or different LBT mechanisms may be performed on directional beams in different beam groups or different channel occupancy times or different transmission periods.

Optionally, the predefined information may include at least one of: a transmission mode, indication signaling, an information type, frame structure information, a beam identifier (ID), a beamforming weight, a beam type, a beam pattern, a threshold value, an LBT mechanism indication, a time domain resource, a corresponding relationship between the time domain resource and a beam, a frequency domain resource, a frequency domain hopping manner, a channel reciprocity indication, data, a beam switching indication, or a transmission mode switching indication.

Optionally, the indication signaling may include at least one of: physical layer downlink control information (DCI) signaling, or higher-layer radio resource control (RRC) signaling.

Optionally, the information type may include at least one of: control information, data, a reference signal, or a traffic type.

Optionally, the beam type may include: a single-beam type and a multi-beam type.

Optionally, the predefined information may be determined in at least one of following manners. The predefined information is predefined. The predefined information is pre-agreed between a base station and a user equipment (UE). The predefined information is indicated through physical layer downlink control information (DCI) signaling. The predefined information is configured through higher-layer radio resource control (RRC) signaling.

Optionally, there may be multiple non-LBT predetermined processes, for example, the non-LBT predetermined process includes one of the following: performing directional beam randomization; processing using directional beam pattern; processing using frequency domain hopping; or processing using semi-statically configured directional beam.

The step of performing the directional beam randomization, processing using the directional beam pattern, or processing using spectrum frequency hopping includes: determining a transmission beam, a transmission beam pattern, or a frequency domain hopping position according to a fixed rule; or determining the transmission beam, the transmission beam pattern, or the frequency domain hopping position in a random manner.

Optionally, the step of determining the transmission beam, the transmission beam pattern, or the frequency domain hopping position according to the fixed rule includes: determining the transmission beam according to beam indexes a decreasing order of beam index; or determining the transmission beam pattern according to a decreasing order of beam pattern index; or determining the frequency domain hopping position according to a decreasing order of frequency domain position index; or determining the transmission beam according to an increasing order of beam index; or determining the transmission beam pattern according to an increasing order of beam pattern index; or determining the frequency domain hopping position according to an increasing order of frequency domain position; or determining the transmission beam according to at least one of beams with even indexes/beams with odd indexes; or determining the transmission beam pattern according to at least one of beam patterns with even indexes/beam patterns with odd indexes; or determining the frequency domain hopping position according to at least one of frequency domain positions with even indexes/frequency domain positions with odd indexes; or determining the transmission beam according to beams with even indexes and an increasing order or a decreasing order or according to beams with odd indexes and in the increasing order or the decreasing order; or determining the transmission beam pattern according to beam patterns with even indexes and an increasing order or a decreasing order or according to beam patterns with odd indexes and in the increasing order or the decreasing order; or determining the frequency domain hopping position according to frequency domain positions with even indexes and an increasing order or a decreasing order or according to frequency domain positions with odd indexes and in the increasing order or the decreasing order; or determining, from a plurality of beams, a beam as the transmission beam, where the index of the beam in the plurality of beams modulo an offset is equal to M; or determining, from a plurality of beam patterns, a beam pattern as the transmission beam pattern, where the index of the beam pattern in the plurality of beam patterns modulo an offset is equal to M; or determining a spectrum resource whose frequency domain index modulo an offset being equal to M as the frequency domain hopping position; or indicating, through physical layer downlink control information (DCI) signaling, the beam index, the beam pattern, a frequency domain index in a frequency domain resource, the offset in the beam, an offset in a beam pattern set, or an offset in the frequency domain resource used by the transmission device; or indicating, through higher-layer radio resource control (RRC) signaling, the beam index, the beam pattern, the frequency domain index in the frequency domain resource, the offset in the beam, the offset in the beam pattern set, or the offset in the frequency domain resource used by the transmission device.

Optionally, the step of indicating, through the physical layer DCI signaling or the higher-layer RRC signaling, the transmission beam, the beam pattern or the frequency domain hopping position includes: determining the transmission beam, the beam pattern or the frequency domain hopping position through a value corresponding to a number of bits of bit information; determining the transmission beam, the beam pattern or the frequency domain hopping position through a bitmap; or determining the transmission beam, the beam pattern or the frequency domain hopping position through a beam indication field or a frequency hopping indication field.

Optionally, the fixed rule, the offset or M is determined in one of following manners. The fixed rule, the offset or M is predefined. The fixed rule, the offset or M is pre-agreed between a base station and a user equipment (UE). The fixed rule, the offset or M is indicated through the physical layer DCI signaling. The fixed rule, the offset or M is configured through the higher-layer RRC signaling.

Optionally, the step of determining the transmission beam, the transmission beam pattern, or the frequency domain hopping position in the random manner includes: generating a positive integer between [1, p] or [0, p−1] in a manner of a random sequence or in a manner of a random function. p is the number of beams or the number of frequency domain resources. The random function includes: a uniform distribution function; a binomial distribution function; or a normal distribution function.

Optionally, the fixed rule and/or the random manner may be determined in one of following manners: predefinition; pre-agreement between a base station and a user equipment (UE); indication through physical layer downlink control information (DCI) signaling; or configuration through higher-layer radio resource control (RRC) signaling.

Optionally, the step of processing using the semi-statically configured directional beam may include: in a predetermined period, measuring a configured directional beam or a beam in a directional beam set, and determining, based on measurement information, whether to perform a directional beam switching operation.

Optionally, a criterion for determining directional beam switching includes: performing the directional beam switching operation when a load, an interference value, or an information transmission error probability on a current transmission beam in the predetermined period is measured to be greater than a predetermined threshold value; or not performing the directional beam switching operation when the load, the interference value, or the information transmission error probability on the current transmission beam in the predetermined period is measured to be not greater than the predetermined threshold value.

Optionally, Cat2 LBT, or Cat2 LBT having a shorter detection duration, or Cat4 LBT corresponding to a predetermined priority level, is performed on a beam having a larger load, interference value, or information transmission error probability.

Optionally, the predetermined priority level is determined through at least one of: a traffic type; indication through physical layer downlink control information (DCI) signaling; predefinition; different signals; different channels; or different beams.

Optionally, a channel occupation duration of a beam having a smaller load, a smaller interference value, or a smaller information transmission error probability is adjusted.

Optionally, a measurement quantity to be measured may include: a received signal strength indication (RSSI); reference signal receiving power (RSRP); reference signal receiving quality (RSRQ); or acknowledgement (ACK)/ negative acknowledgement (NACK) feedback information.

Figure 3:
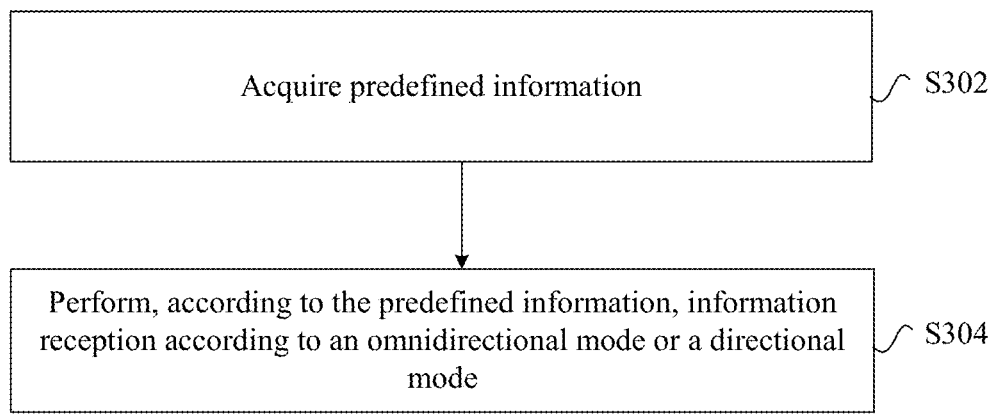
FIG. 3 is a flowchart of a data receiving method according to an embodiment of the present disclosure.

FIG. 3 is a flowchart of a data reception method according to the embodiment of the present disclosure. As shown in FIG. 3, the method includes the steps described below.

In S302, predefined information is obtained.

In S304, information reception processing is performed in an omnidirectional mode or a directional mode according to the predefined information.

Through the above steps, the reception device performs reception and processing on information items separately according to different operations of the omnidirectional mode or the directional mode, thereby effectively improving the processing efficiency of the information.

Optionally, whether the reception device performs a listen-before-talk (LBT) mechanism before performing information reception according to the omnidirectional mode or the directional mode may be determined in one of following manners: predefinition; pre-agreement between a sending device and a reception device; indication through physical layer downlink control information (DCI) signaling; or indication through higher-layer radio resource control (RRC) signaling.

Optionally, before the reception device performs the information reception processing according to the omnidirectional mode, the reception device performs the LBT mechanism or interference measurement; and performs predetermined processing based on the LBT result or the interference measurement result.

The step of performing the predetermined processing based on the LBT result or the interference measurement result may include: when the LBT fails or succeeds, reporting the LBT result to a transmission device on a transmitting side; when the LBT fails or succeeds, sending an indication signal to the transmission device on the transmitting side; or when the interference measurement result meets a predetermined threshold, reporting the interference measurement result to the transmission device; or when the interference measurement result meets the predetermined threshold, sending an indication signal to the transmission device.

Optionally, the step of performing the predetermined processing based on the LBT result or the interference measurement result includes that: when the LBT fails, the reception device performs a reception mode switching operation; or when the interference measurement result meets a predetermined threshold, the reception device performs the reception mode switching operation; or when the LBT fails and a transmission mode switching indication is enabled, the reception device performs the reception mode switching operation; or when the interference measurement result meets the predetermined threshold and the transmission mode switching indication is enabled, the reception device performs the reception mode switching operation.

Optionally, the reception mode switching operation performed by the reception device includes: switching from an omnidirectional reception mode to a directional reception mode.

Optionally, the reception device determines to perform the reception mode switching operation or acquire the transmission mode switching indication in at least one of following manners: physical layer downlink control information (DCI) signaling indication; predefinition; reception of indication information of the sending device; agreement between the sending device and the reception device; indication through higher-layer radio resource control (RRC) signaling; or event-based triggering.

Optionally, a directional beam to which the reception device switches may be determined in at least one of following manners: the directional beam is indicated through physical layer downlink control information (DCI) signaling; the directional beam is indicated through higher-layer radio resource control (RRC) signaling; the directional beam is predefined; the directional beam is determined based on measurement; or the directional beam is determined based on a signal to interference plus noise ratio (SINR).

Optionally, after switching from the omnidirectional reception mode to the directional reception mode, the method may further include: performing the LBT mechanism on the switched-to beam.

Optionally, before the reception device performs reception according to the directional mode, the method may further include: performing the LBT mechanism on the directional beam.

Optionally, the step of performing the LBT mechanism on the beam includes one of: if the LBT is successfully performed on the beam, sending indication information to a transmission device; if the LBT fails on the beam, sending indication information to the transmission device; and if the LBT fails on the beam, continuing to perform the LBT mechanism on the beam or switching to another beam for continuing to perform the LBT mechanism.

When reception processing is performed according to the directional mode, the reception device may also perform similar operations described below corresponding to the transmission by the transmission device.

The directional mode may include at least one of: a directional transmit beam or a directional receive beam.

Optionally, for the reception device, a relationship between the directional transmit beam and the directional receive beam includes: the directional transmit beam being the same as the directional receive beam; or the directional transmit beam being different from the directional receive beam; or the directional transmit beam partially overlapping the directional receive beam.

Optionally, the relationship between the directional transmit beam and the directional receive beam may also be determined in at least one of the following manners. The relationship is predefined. The relationship is pre-agreed by a base station and a UE. The relationship is indicated through physical layer downlink control information (DCI) signaling. The relationship is configured through higher-layer radio resource control (RRC) signaling.

Optionally, the step of performing the LBT mechanism on a beam may include: determining signal energy received by the reception device in the directional beam; comparing the signal energy received in the directional beam with a predetermined threshold value; and determining, based on the comparison result, a busy/idle state of a channel in the directional beam.

The step of determining the signal energy received by the reception device in the directional beam may include: the signal energy received by the reception device in a beam range is equal to norm of a value, where the value is a product of a beamforming weight of the reception device and a sum of signals received in the beam range by the reception device from surrounding devices. Alternatively, the signal energy received by the reception device in the beam range is equal to a norm of an accumulated sum of the signals received by the reception device in the beam range from all of the surrounding devices. Alternatively, the signal energy received by the reception device in the beam range is equal to $\|V*(H_1*X_1+H_2*X_2+ \ldots +H_n*X_n)\|$ or $\|V*H_1*X_1+V*H_2*X_2+ \ldots V*H_n*X_n\|$. V denotes the beamforming weight, $H_1, H_2, \ldots, H_n$ each denote a channel matrix between the reception device and one of the surrounding devices, $X_1, X_2, \ldots, X_n$ each denote a transmit signal vector of one of the surrounding devices of the reception device, * denotes a product operator, $\|\ \|$ denotes a norm operator, n is the number of the surrounding devices of the reception device, $H_i*X_i$ denotes a signal sent by the i-th surrounding device and received by the reception device, and $V*H_i*X_i$ denotes a signal sent by the i-th surrounding device and received by the reception device in the beam range. Alternatively, the signal energy received by the reception device in the beam range is equal to an accumulated sum of signal energy received from all of the surrounding devices by the reception device in the beam range. Alternatively, the signal energy received by the reception device in the beam range is equal to $\|V*H_1*X_1\|+\|V*H_2*X_2\|+ \ldots +\|V*H_n*X_n\|$. V denotes the beamforming weight, $H_1, H_2, \ldots, H_n$ each denote a channel matrix between the reception device and one of the surrounding devices, $X_1, X_2, \ldots, X_n$ each denote a transmit signal vector of one of the surrounding devices of the reception device, * denotes a product operator, $\|\ \|$ denotes a norm operator, n is the number of the surrounding devices of the reception device, $H_i*X_i$ denotes the signal sent by the i-th surrounding device and received by the reception device, and $V*H_i*X_i$ denotes the signal sent by the i-th surrounding device and received by the reception device in the beam range.

Optionally, the busy/idle state of the channel in the directional beam may also be determined in the following manner. When the signal energy received in the directional beam is not greater than the predetermined threshold value, it is determined that the channel in the directional beam is idle; or when the signal energy received in the directional beam is greater than the predetermined threshold value, it is determined that the channel in the directional beam is busy.

When the reception device performs signal reception by using a plurality of directional beams, the reception device determines, according to signal energies received in the plurality of directional beams, busy/idle states of channels on the plurality of directional beams or busy/idle states of channels in a beam region formed by the plurality of directional beams.

Optionally, the step of determining, according to the signal energies received in the plurality of directional beams, the busy/idle states of the channels on the plurality of directional beams or the busy/idle states of the channels in the beam region formed by the plurality of directional beams may include: if the LBT is successfully performed on at least one of the plurality of directional beams, determining that the plurality of directional beams are available or that the channels are idle, and performing the signal reception processing only on the directional beam on which the LBT is successfully performed; or if the LBT is successfully performed on all of the plurality of directional beams, determining that the plurality of directional beams are available or that the channels are idle; or if the LBT fails on at least one of the plurality of directional beams, determining that the plurality of directional beams are not available or that the channels are busy; or if the number of directional beams, among the plurality of directional beams, on which the LBT is successfully performed reaches a predetermined threshold value, determining that the plurality of directional beams are available or that the channels are idle, and performing the signal reception processing only on the directional beam on which the LBT is successfully performed; or if the number of directional beams, among the plurality of directional beams, on which the LBT fails reaches a predetermined threshold value, determining that the plurality of directional beams are not available or that the channels are busy.

Optionally, when the reception device performs signal reception processing by using a plurality of directional beams, the reception device determines, according to a sum of signal energies received in the plurality of directional beams, busy/idle states of channels on the plurality of directional beams or busy/idle states of channels in the beam region formed by the plurality of directional beams.

Optionally, when the plurality of directional beams belong to the same antenna array element or antenna port, the signal energy received in the beam region formed by the plurality of directional beams may be calculated in one of the following manners. The signal energy received in the beam region formed by the plurality of directional beams is equal to an accumulated sum of the signal energy received by the reception device in a first beam, the signal energy received by the reception device in a second beam, . . . and the signal energy received by the reception device in the m-th beam. Alternatively, the signal energy received in the beam region formed by the plurality of directional beams is equal to $\|V^1*(H_1*X_1+H_2*X_2+ \ldots +H_n*X_n)\|+\|V^2*(H_1*X_1+H_2*X_2+ \ldots +H_n*X_n)\|+ \ldots \|V^m*(H_1*X_1+H_2*X_2+ \ldots +H_n*X_n)\|$, $V^1, V^2, \ldots, V^m$ denote beamforming weights of m beams, $H_1, H_2, \ldots, H_n$ each denote the channel matrix between the reception device and the surrounding device, $X_1, X_2, \ldots, X_n$ each denote the transmit signal vector of the surrounding device of the reception device, * denotes the product operator, $\|\ \|$ denotes the norm operator, n is the number of surrounding devices of the reception device, m is the number of the directional beams used in the signal reception of the reception device, $H_j*X_j$ denotes a signal sent by a j-th surrounding device and received by the reception device, $V^i*H_j*X_j$ denotes a signal sent by the j-th surrounding device and received by the reception device in the i-th beam range, and $V^i*(H_1*X_1+H_2*X_2+ \ldots +H_n*X_n)$ denotes signals sent by the surrounding devices and received in the i-th beam. Alternatively, the signal energy received in the beam region formed by the plurality of directional beams is equal to a norm of the accumulated sum of the signal energy received by the reception device in the first beam, the signal energy received by the reception device in the second beam, . . . and the signal energy received by the reception device in the m-th beam. Alternatively, the signal energy received in the beam region formed by the plurality of directional beams being equal to $\|V^1*(H_1*X_1+H_2*X_2+ \ldots +H_n*X_n)+V^2*(H_1*X_1+H_2*X_2+ \ldots +H_n*X_n)+ \ldots +V^m*(H_1*X_1+H_2*X_2+ \ldots +H_n*X_n)\|$. $V^1, V^2, \ldots, V^m$ denote beamforming weights of m beams, $H_1, H_2, \ldots, H_n$ each denote the channel matrix between the reception device and the surrounding device, $X_1, X_2, \ldots, X_n$ each denote the transmit signal vector of the surrounding device of the reception device, * denotes the product operator, $\|\ \|$ denotes the norm operator, n is the number of the surrounding devices of the reception device, m is the number of the directional beams used in the signal reception of the reception device, $H_j*X_j$ denotes a signal sent by the j-th surrounding device and received by the reception device, $V^i*H_j*X_j$ denotes a signal sent by the j-th surrounding device and received by the reception device in the i-th beam range, and $V^{i}*(H_1*X_1+H_2*X_2+ \ldots +H_n*X_n)$ denotes signals sent by the surrounding devices and received in the i-th beam.

Accordingly, the plurality of directional beams may belong to the same antenna array element or antenna port or belong to different antenna array elements or antenna ports, which are respectively described below.

When the plurality of directional beams belong to different antenna array elements or antenna ports, the signal energy received in the beam region formed by the plurality of directional beams is calculated in the following manners. The signal energy received in the beam region formed by the plurality of directional beams is equal to an accumulated sum of the signal energy received by the reception device in a first beam, the signal energy received by the reception device in a second beam, . . . and the signal energy received by the reception device in an m-th beam. Alternatively, the signal energy received in the beam region formed by the plurality of directional beams is equal to $\|V^1*(H_1{}^1*X_1+H_2{}^1*X_2+ \ldots +H_n{}^1*X_n)\|+\|V^2*(H_1{}^2*X_1+H_2{}^2*X_2+ \ldots +H_n{}^2*X_n)\|+ \ldots \|V^{m}*(H_1{}^{m}*X_1+H_2{}^{m}*X_2+ \ldots +H_n{}^{m}*X_n)\|$. $V^1, V^2, \ldots, V^m$ denote beamforming weights of m beams, $H_1{}^i, H_2{}^i, \ldots, H_n{}^i$ each donate a channel matrix between the reception device and one of the n surrounding devices on the i-th beam, $X_1, X_2, \ldots, X_n$ each denote the transmit signal vector of the surrounding device of the reception device, $H_j{}^i*X_j$ denotes a signal sent by the j-th surrounding device and received by the reception device, $V^{i}*H_j{}^i*X_j$ denotes a signal sent by the j-th surrounding device and received by the reception device in the i-th beam range, $V^{i}*(H_1{}^i*X_1+H_2{}^i*X_2+ \ldots +H_n{}^i*X_n)$ denotes signals sent by n surrounding devices and received by the reception device in the i-th beam range, $\|V^{i}*(H_1{}^i*X_1+H_2{}^i*X_2+ \ldots +H_n{}^i*X_n)\|$ denotes signal energies received by the reception device in the i-th beam range from the n surrounding devices, * denotes the product operator, $\|\ \|$ denotes the norm operator, n is the number of surrounding devices of the reception device, m is the number of beams. Alternatively, the signal energy received in the beam region formed by the plurality of directional beams is equal to a norm of the accumulated sum of the signal energy received by the reception device in the first beam, the signal energy received by the reception device in the second beam, . . . and the signal energy received by the reception device in the m-th beam. Alternatively, the signal energy received in the beam region formed by the plurality of directional beams is equal to $\|V^1*(H_1{}^1*X_1+H_2{}^1*X_2+ \ldots +H_n{}^1*X_n)+V^2*(H_1{}^2*X_1+H_2{}^2*X_2+ \ldots +H_n{}^2*X_n)+ \ldots +V^{m}*(H_1{}^{m}*X_1+H_2{}^{m}*X_2+ \ldots +H_n{}^{m}*X_n)\|$. $V^1, V^2, \ldots, V^m$ denote beamforming weights of m beams, $H_1{}^i, H_2{}^i, \ldots, H_n{}^i$ each denote a channel matrix on the i-th beam between the reception device and one of the n surrounding devices, $X_1, X_2, \ldots, X_n$ each denote the transmit signal vector of the surrounding device of the reception device, $H_j{}^i*X_j$ denotes a signal sent by the j-th surrounding device and received by the reception device, $V^{i}*H_j{}^i*X_j$ denotes a signal sent by the j-th surrounding device and received by the reception device in the i-th beam range, $V^{i}*(H_1{}^i*X_1+H_2{}^i*X_2+ \ldots +H_n{}^i*X_n)$ denotes signals sent by the n surrounding devices and received by the reception device in the i-th beam range, * denotes the product operator, $\|\ \|$ denotes the norm operator, n is the number of surrounding devices of the reception device, m is the number of beams. The signal energy received in the beam region formed by the plurality of directional beams is equal to an accumulated sum of signal energies sent by n1 surrounding devices and received by the reception device in the first beam, signal energies sent by n2 surrounding devices and received by the reception device in the second beam, . . . and signal energies sent by nn surrounding devices and received by the reception device in the m-th beam. Alternatively, the signal energy received in the beam region formed by the plurality of directional beams is equal to $\|V^1*(H_1{}^1*X_1{}^1+H_2{}^1*X_2{}^1+ \ldots +H_{n1}{}^1*X_{n1}{}^1)\|+\|V^2*(H_1{}^2*X_1{}^2+H_2{}^2*X_2{}^2+ \ldots +H_{n2}{}^2*X_{n2}{}^2)\|+ \ldots \|V^{m}*(H_1{}^{m}*X_1{}^{m}+H_2{}^{m}*X_2{}^{m}+ \ldots +H_{nn}{}^{m}*X_{nn}{}^{m})\|$. $V^1, V^2, \ldots, V^m$ denote beamforming weights of m beams, $H_1{}^i, H_2{}^i, \ldots, H_{nj}{}^i$ each denote the channel matrix between the reception device and one of the nj surrounding devices on the i-th beam, $X_1{}^i, X_2{}^i, \ldots, X_{nj}{}^i$ denote the transmit signal vectors of the nj surrounding devices of the reception device on the i-th beam, $H_{nj}{}^i*X_{nj}{}^i$ denote a signal sent by a nj-th surrounding device and received by the reception device, $V^{i}*H_{nj}{}^i*X_{nj}{}^i$ denote a signal sent by the nj-th surrounding device and received by the reception device in the i-th beam range, $V^{i}*(H_1{}^i*X_1{}^i+H_2{}^i*X_2{}^i+ \ldots +H_{nj}{}^i*X_{nj}{}^i)$ denote signals sent by the nj surrounding devices and received by the reception device in the i-th beam range, $\|V^{i}*(H_1{}^i*X_1{}^i+H_2{}^i*X_2{}^i+ \ldots +H_{nj}{}^i*X_{nj}{}^i)\|$ denotes signal energy sent by the nj surrounding devices and received by the reception device in the i-th beam range, * denotes the product operator, $\|\ \|$ denotes the norm operator, nj is the number of the surrounding devices of the reception device, m is the number of the beams. Alternatively, the signal energy received in the beam region formed by the plurality of directional beams is equal to a norm of an accumulated sum of signals sent by the n1 surrounding devices and received by the reception device in the first beam, signals sent by the n2 surrounding devices and received by the reception device in the second beam, . . . and signals sent by the nn surrounding devices and received by the reception device in the m-th beam. Alternatively, the signal energy received in the beam region formed by the plurality of directional beams being equal to $\|V^1*(H_1{}^1*X_1{}^1+H_2{}^1*X_2{}^1+ \ldots +H_{n1}{}^1*X_{n1}{}^1)+V^2*(H_1{}^2*X_1{}^2+H_2{}^2*X_2{}^2+ \ldots +H_{n1}{}^2*X_{n1}{}^2)+ \ldots +V^{m}*(H_1{}^{m}*X_1{}^{m}+H_2{}^{m}*X_2{}^{m}+ \ldots +H_{nn}{}^{m}*X_{nn}{}^{m})\|$. $V^1, V^2, \ldots, V^m$ denote beamforming weights of m beams, $H_1{}^i, H_2{}^i, \ldots, H_{nj}{}^i$ denote the channel matrices between the reception device and the nj surrounding devices on the i-th beam, $X_1{}^i, X_2{}^i, \ldots, X_{nj}{}^i$ denote the transmit signal vectors of the nj surrounding devices of the reception device on the i-th beam, $H_{nj}{}^i*X_{nj}{}^i$ denotes a signal sent by a nj-th surrounding device and received by the reception device, $V^{i}*H_{nj}{}^i*X_{nj}{}^i$ denotes a signal sent by the nj-th surrounding device and received by the reception device in the i-th beam range, $V^{i}*(H_1{}^i*X_1{}^i+H_2{}^i*X_2{}^i+ \ldots +H_{nj}{}^i*X_{nj}{}^i)$ denote signals sent by the nj surrounding devices and received by the reception n device in the i-th beam range, * denotes the product operator, $\|\ \|$ denotes the norm operator, nj is the number of the surrounding devices of the reception device, m is the number of the beams. Alternatively, the signal energy received in the beam region formed by the plurality of directional beams is equal to a norm of an accumulated sum of signals sent by the n surrounding devices and received by the reception device in the first beam, signals sent by the n surrounding devices and received by the reception device in the second beam, . . . and signals sent by the n surrounding devices and received by the reception device in the m-th beam. Alternatively, the signal energy received in the beam region formed by the plurality of directional beams is equal to $\|V^1*(H_1{}^1*X_1{}^1+H_2{}^1*X_2{}^1+ \ldots +H_n{}^1*X_n{}^1)+V^2*(H_1{}^2*X_1{}^2+H_2{}^2*X_2{}^2+ \ldots +H_n{}^2*X_n{}^2)+ \ldots +V^{m}*(H_1{}^{m}*X_1{}^{m}+H_2{}^{m}*X_2{}^{m}+ \ldots +H_n{}^{m}*X_n{}^{m})\|$. $V^1, V^2, \ldots, V^m$ denote beamforming weights of m beams, $H_1{}^i, H_2{}^i, \ldots, H_n{}^i$ denote the channel matrices between the reception device and the surrounding devices on the i-th beam, $X_1{}^i, X_2{}^i, \ldots, X_n{}^i$ denote the transmit signal vectors of the surrounding devices of the reception device on the i-th beam, * denotes the product operator, ∥ ∥ denotes the norm operator, n is the number of the surrounding devices of the reception device, m is the number of the beams, $H_j^i*X_j^i$ denotes a signal sent by the j-th surrounding device and received by the reception device on the i-th beam, and $V^{i*}H_j^i*X_j^i$ is the signal sent by the j-th surrounding device and received by the reception device in the i-th beam range.

The beamforming weight may include: a transmit beamforming weight of the reception device; or a receive beamforming weight of the reception device.

Optionally, the transmit beamforming weight and/or the receive beamforming weight may be determined in one of following manners. The transmit beamforming weight and/or the receive beamforming weight is predefined. The transmit beamforming weight and/or the receive beamforming weight is configured by the base station. The transmit beamforming weight and/or the receive beamforming weight is configured by a UE. The transmit beamforming weight and/or the receive beamforming weight is pre-agreed by the base station and the UE. The transmit beamforming weight and/or the receive beamforming weight is indicated through physical layer downlink control information (DCI) signaling. The transmit beamforming weight and/or the receive beamforming weight is determined by means of performing singular value decomposition (SVD) on a channel matrix H between a transmitting device and the reception device.

Accordingly, when the reception device performs signal reception processing by using a plurality of directional beams, the reception device determines channel conditions of the plurality of directional beams according to signal energy received in a beam region formed by the plurality of directional beams.

Accordingly, the signal energy received in the beam region formed by the plurality of directional beams may be calculated in the following manners. The signal energy received in the beam region formed by the plurality of directional beams is equal to a norm of a product of a sum of signals received from the surrounding devices of the reception device and a beamforming weight formed by the plurality of directional beams.

Accordingly, when the signal energy received in the beam coverage range formed by the plurality of directional beams is not greater than a predetermined threshold value, channels in the beam formed by the plurality of directional beams are determined to be idle or channels in the plurality of directional beams are determined to be idle; or when the signal energy received in the beam coverage range formed by the plurality of directional beams is greater than the predetermined threshold value, the channels in the beam formed by the plurality of directional beams are determined to be busy or the channels in the plurality of directional beams are determined to be busy.

Optionally, when the channels are detected to be busy, the reception device performs an LBT detection on a finer directional beam in the directional beam where the LBT fails; or the reception device performs the LBT detection on the directional beam other than the directional beams where the LBT fails.

Accordingly, when the reception device performs the LBT mechanism on a plurality of directional beams, the reception device performs Cat2 LBT simultaneously on the plurality of directional beams; or the reception device performs Cat4 LBT on a main directional beam of the plurality of directional beams, and when the LBT process is about to be completed, starts performing the Cat2 LBT on other directional beams; or the reception device performs the Cat4 LBT on the plurality of directional beams.

Optionally, the main directional beam of the plurality of directional beams may be determined in one of following manners. The main directional beam is determined by a base station. The main directional beam is determined by a UE. The main directional beam is determined by the base station and the UE. The main directional beam is predefined. The main directional beam is indicated through physical layer downlink control information (DCI) signaling. The main directional beam is indicated through higher-layer radio resource control (RRC) signaling.

Optionally, in the process of performing the Cat4 LBT on the plurality of directional beams, random backoff values N are respectively generated for the plurality of directional beams; or the same random backoff value N is used for the plurality of directional beams.

Optionally, a Cat2 LBT mechanism or Cat2 LBT having a shorter detection duration is performed on a directional beam in a beam group, a shared reception period, or a reception period. Alternatively, the Cat2 LBT mechanism, a Cat4 LBT mechanism, Cat4 LBT corresponding to a predetermined priority level, or Cat3 LBT is performed on a directional beam outside the beam group, the shared reception period, or the reception period. Alternatively, the Cat4 LBT mechanism, the Cat4 LBT corresponding to the predetermined priority level, or the Cat3 LBT is performed on a directional beam in an initial beam group, or on the directional beam in the shared reception period or the reception period.

Optionally, the predetermined priority level or an LBT mechanism used for the directional beam may be determined in one of following manners: pre-agreement between a base station and a user equipment (UE); predefinition; indication through physical layer downlink control information (DCI) signaling by the base station; or indication through higher-layer radio resource control (RRC) signaling.

Optionally, a same LBT mechanism or different LBT mechanisms may be performed on directional beams in different beam groups or different shared reception periods or different reception periods.

Accordingly, the predefined information may also include at least one of: a transmission mode, indication signaling, an information type, frame structure information, a beam identifier (ID), a beamforming weight, a beam type, a beam pattern, a threshold value, an LBT mechanism indication, a time domain resource, a corresponding relationship between the time domain resource and a beam, a frequency domain resource, a frequency domain hopping manner, a channel reciprocity indication, data, a beam switching indication, or a transmission mode switching indication.

Optionally, the indication signaling may include at least one of: physical layer downlink control information (DCI) signaling, or higher-layer radio resource control (RRC) signaling.

Optionally, the information type may include at least one of: control information, data, a reference signal, or a traffic type.

Optionally, the beam type may include: a single-beam type and a multi-beam type.

Optionally, the predefined information may be determined in at least one of following manners: predefinition, pre-agreement between a base station and a user equipment (UE), indication through physical layer downlink control information (DCI) signaling, or configuration through higher-layer radio resource control (RRC) signaling.

Optionally, before the reception device performs reception according to the directional mode, the method may include: performing a predetermined non-LBT processing operation.

Optionally, the step of performing the predetermined non-LBT processing operation may include one of the following: performing directional beam randomization; processing using directional beam pattern; or processing using semi-statically configured directional beam.

Optionally, the step of performing directional beam randomization or processing using directional beam pattern includes: determining a receive beam or a receive beam pattern according to a fixed rule; or determining the receive beam or the receive beam pattern in a random manner.

Optionally, the step of determining the receive beam or the receive beam pattern according to the fixed rule may include: determining the receive beam according to a decreasing order of beam index; or determining the receive beam pattern according to a decreasing order of beam pattern index; or determining the receive beam according to an increasing order of beam index; or determining the receive beam pattern according to an increasing order of beam pattern index; or determining the receive beam according to at least one of beams with even indexes/beams with odd indexes; or determining the receive beam pattern according to at least one of beam patterns with even indexes/beam patterns with odd indexes; or determining the receive beam according to beams with even indexes and an increasing order or a decreasing order, or according to beams with odd indexes and in the increasing order or the decreasing order; or determining the receive beam pattern according to beam patterns with even indexes and an increasing order or a decreasing order, or according to beam patterns with odd indexes and in the increasing order or the decreasing order; or determining, from a plurality of beams, a beam as the receive beam, wherein the index of the beam in the plurality of beams modulo an offset is equal to M; or determining, from a plurality of beam patterns, a beam pattern as the receive beam pattern, wherein the index of the beam pattern in the plurality of beam patterns modulo an offset is equal to M; or indicating, through physical layer downlink control information (DCI) signaling, the beam index, the beam pattern, the offset in the beam, or an offset in a beam pattern set used by the reception device; or indicating, through higher-layer radio resource control (RRC) signaling, the beam index, the beam pattern, the offset in the beam, or the offset in the beam pattern set used by the reception device.

Optionally, the step of indicating the receive beam or the receive beam pattern through the physical layer DCI signaling or the higher-layer RRC signaling may include: determining the receive beam or the receive beam pattern through a value corresponding to a number of bits of bit information; determining the receive beam or the receive beam pattern through a bitmap; or determining the receive beam or the receive beam pattern through a beam indication field.

Optionally, the fixed rule, the offset or M may be determined in one of following manners: predefinition; pre-agreement between a base station and a user equipment (UE); indication through the physical layer DCI signaling; or configuration through the higher-layer RRC signaling.

Optionally, the step of determining the receive beam or the receive beam pattern in the random manner may include: generating a positive integer between [1, p] or [0, p−1] in a manner of a random sequence or in a manner of a random function; where p is the number of beams.

Optionally, the random function may include: a uniform distribution function; a binomial distribution function; or a normal distribution function.

Optionally, the fixed rule and/or the random manner may be determined in one of following manners: predefinition; pre-agreement between a base station and a user equipment (UE); indication through physical layer downlink control information (DCI) signaling; or configuration through higher-layer radio resource control (RRC) signaling.

Optionally, the step of processing using semi-statically configured directional beam includes: in a predetermined period, measuring the configured directional beam or a beam in a directional beam set, and determining, based on measurement information, whether to perform a directional beam switching operation.

Optionally, a criterion for determining directional beam switching includes: performing the directional beam switching operation when a load, an interference value, or an information transmission error probability on a current receive beam in the predetermined period is measured to be greater than a predetermined threshold value; or not performing the directional beam switching operation when the load, the interference value, or the information transmission error probability on the current transmission beam in the predetermined period is measured to be not greater than the predetermined threshold value.

Optionally, Cat2 LBT, or Cat2 LBT having a shorter detection duration, or Cat4 LBT corresponding to a predetermined priority level, is performed on a beam having a larger load, interference value, or information transmission error probability.

Optionally, the predetermined priority level may be determined through one of the following manners. The predetermined priority level is determined according to the traffic type. The predetermined priority level is determined according to indication through physical layer downlink control information (DCI) signaling. The predetermined priority level is predefined. The predetermined priority level is determined according to different signals, and/or different channels, and/or different beams.

Optionally, a channel occupation duration of a beam having a smaller load, interference value, or information transmission error probability is adjusted.

Optionally, a measurement quantity to be measured may include: a received signal strength indication (RSSI); reference signal receiving power (RSRP); reference signal receiving quality (RSRQ); or acknowledgement (ACK)/negative acknowledgement (NACK) feedback information.

The above embodiments of the present disclosure are not limited to the unlicensed spectrum in the high-frequency scenario in the NR, and may also be used for shared spectrum or licensed spectrum. The NR has three typical scenarios: enhanced mobile broadband (eMBB); massive machine type communication (mMTC), such as narrow band Internet of Things (NB-IOT); and ultra-reliable low-latency communications (URLLC), such as short transmission time interval (short TTI).

Implementation modes of the present disclosure will be described based on the above embodiments and implementation modes.

In high-frequency scenarios, two beam modes exist: a single-beam and a multi-beam. For the NR system operating in the high-frequency band and expected to be a multi-beam system, which has large path loss and large penetration loss, the NR system will use multiple narrow beams to achieve cell coverage. For the single-beam, the signal transmission may fail on a single-beam, or the transmission may fail due to an LBT failure, so multiple single-beams may be used for transmission.

For low-frequency communication scenarios, the reception end and/or the transmitting end receives or sends signals in an omnidirectional manner. Based on this, the energy-based LBT mechanism is to detect an accumulated sum of signal energies within a certain range (omnidirectional) around the device, so as to determine whether the current channel is idle or the interference condition around the device.

For high-frequency communication scenarios, beamforming is one of the key technologies. For a high-frequency communication receiver, the high-frequency carrier has a small wavelength, so a large number of antenna ports may be concentrated in a small area to increase the gain of beamforming. When both the sending end and the receiving end are configured with beamforming antennas, beamforming may significantly expand the coverage range of the intra-frequency communication and effectively compress the interference between the high-frequency nodes. In addition, in the high-frequency scenario, after the receiving end receives information sent by the sending end, the information needs to be multiplied by a weighted value so as to obtain reception information or signal energy in the beam. Based on this, if the energy-based LBT mechanism is used in the high-frequency scenario to determine whether the current channel is available or determine the interference condition, the method for calculating the detection energy in the relevant low-frequency scenario needs to be modified. For example, the detected signal needs to be multiplied by the weighted value, the energy value is a norm of the product, and then the energy value is compared with the threshold value to determine whether the current channel is available/idle, or determine the magnitude of the interference caused by its signal transmission to the surrounding nodes and/or whether the interference is within the allowable range, so as to determine whether transmission is possible, thereby ensuring fairness coexistence between systems.

When the device detects the surrounding signal energy, the signal energy may be calculated in two methods. One method to calculate is the signal energies received from the homogeneous system and heterogeneous system. The other method to calculate the received signal energies excluding signal energies received from the homogeneous system.

The threshold value involved in the embodiment of the present disclosure may be obtained through at least one of the following: predefinition, configuration through physical layer DCI signaling, configuration through higher-layer RRC signaling, agreement between the base station and the UE, or a combination thereof.

The physical layer DCI signaling include at least one of: DCI format 0, DCI format 0A, DCI format 0B, DCI format 1, DCI format 1A, DCI format 1B, DCI format 1C, DCI format 1D, DCI format 2, DCI format 2A, DCI format 2B, DCI format 2C, DCI format 2D, DCI format 3, DCI format 3A, DCI format 4, DCI format 4A, or DCI format 4B.

The transmission device in the embodiment of the present disclosure may be a base station, a transmission point (TRP), or a UE.

The transmission device in the embodiment of the present disclosure performs the LBT mechanism or performs the predetermined non-LBT processing operation before performing information transmission, which is also applicable to the reception side device, that is, the reception device may optionally perform the LBT mechanism or perform the predetermined non-LBT processing operation before receiving the information sent by the transmitting side device. Optionally, whether the transmitting side device and/or the reception side performs the LBT mechanism and/or the predetermined non-LBT processing operation and/or no LBT operation (which may indicate direct transmission or reception without any operation), and/or the operation of switching from the omnidirectional antenna reception mode to the directional antenna beam reception mode on the reception side, and/or the operation of switching from the omnidirectional antenna transmission mode to the directional antenna beam transmission on the transmitting side, and/or the beam switching may be determined in one of the following manners: predefinition, pre-agreement between the base station and the UE, notification by the base station to the UE through the physical layer DCI signaling, indication through the physical layer DCI signaling, or indication through the higher-layer RRC signaling.

For a transmission device, a relationship between the transmit beam and the receive beam includes: the transmit beam being the same as the receive beam; or the transmit beam being completely different from the receive beam; or the transmit beam partially overlapping the receive beam.

The LBT mechanism in the embodiment of the present disclosure can avoid or reduce the interference of the its own transmission to the surrounding devices, ensure the fairness of the channel contention access between the systems operating on the unlicensed spectrum, and achieve friendly and fair coexistence. Based on this, for the beam-based LBT mechanism, the interference caused by transmission on the beam to a surrounding device is equivalent to the interference generated in the beam when the surrounding device performs transmission, so that the principle of the energy detection in the LBT mechanism can be interpreted or can be equivalent to the principle of energy detection in the omnidirectional LBT. From this perspective, the signal energy in the transmit beam should be detected, or the signal energy in the receive beam is detected. In this case, when the transmit beam is different from the receive beam, the channel busy/idle condition detected based on the receive beam does not actually reflect the channel busy/idle condition on the transmit beam.

The finer directional beam described above refers to a beam narrower than the beam on which the LBT fails. The beam on which the LBT fails is a wide beam, the finer directional beam is a narrow beam, and the coverage range of the narrow beam is in the range of the wide beam. The coverage range and/or direction of the narrow beam or the coverage range and/or direction of the wide beam may be determined in at least one of following manners: determination by a base station, determination by a user equipment (UE), determination by the base station and the UE, predefinition, indication through physical layer DCI signaling, or indication through higher-layer RRC signaling.

The expression that the LBT process is about to be completed is that the LBT process parameter N (such as, the random backoff value N described above) is decremented to a predetermined value. The predetermined value described above may be determined in at least one of the following manners: indication through physical layer DCI signaling, indication through higher-layer RRC signaling, or predefinition.

The Cat2 LBT having a shorter detection duration refers to a Cat 2 LBT mechanism having a detection duration b shorter than a detection duration a.

Implementation Mode 1

The implementation mode provides the LBT mechanism used by the transmission device in the high-frequency scenario which performs information transmission and/or reception in the omnidirectional mode.

In the low-frequency scenario, the transmission device performs information transmission and/or reception in the omnidirectional mode. In a case of using the unlicensed spectrum at the low frequency, the transmission device needs to perform the omnidirectional ED-based LBT mechanism before the transmission in order to meet the regulatory requirements on the unlicensed spectrum. For the omnidirectional ED-based LBT mechanism, the signal energy detected by the transmission device is equal to a norm of an accumulated sum of signals sent by surrounding devices and received by the transmission device within the coverage range. That is, the signal energy detected by the transmission device is an accumulated sum of signal energies sent by the surrounding devices received by the transmission device within the coverage range.

Optionally, the criterion for determining whether the channel is idle is as follows.

If the signal energy received by the transmission device within the coverage range is not greater than a preset threshold value, the channel is considered to be idle, or transmission may be performed.

Alternatively, if the signal energy received by the transmission device within the coverage range is greater than the preset threshold value, the channel is considered to be busy, or transmission cannot be performed.

Whether the transmission device performs transmission in the omnidirectional mode or in the directional mode, and/or whether to perform LBT, and/or whether to perform omnidirectional LBT or directional LBT may be predefined, or pre-agreed between the base station and the UE, or indicated through the physical layer DCI signaling, or indicated through the higher-layer RRC signaling. If the physical layer DCI signaling indication or the higher-layer RRC signaling indication is used, a transmission mode information element (IE) item is added to the DCI signaling or the higher-layer RRC signaling for indicating a use of the directional mode or the omnidirectional mode, and/or an LBT indication IE item and/or an LBT manner IE item are added. For example, the LBT indication IE item includes performing LBT and performing the omnidirectional LBT; and/or performing LBT and performing beam-based LBT; and/or not performing LBT; and/or performing LBT. The LBT manner IE item includes: omnidirectional LBT based and beam-based LBT.

The preset threshold value may be predefined, or agreed between the base station and the UE, or indicated through the physical layer DCI signaling, or indicated through the higher-layer RRC signaling.

The LBT mechanism used for information transmission and reception in the omnidirectional mode in the high-frequency scenario is described below with examples.

Figure 4:
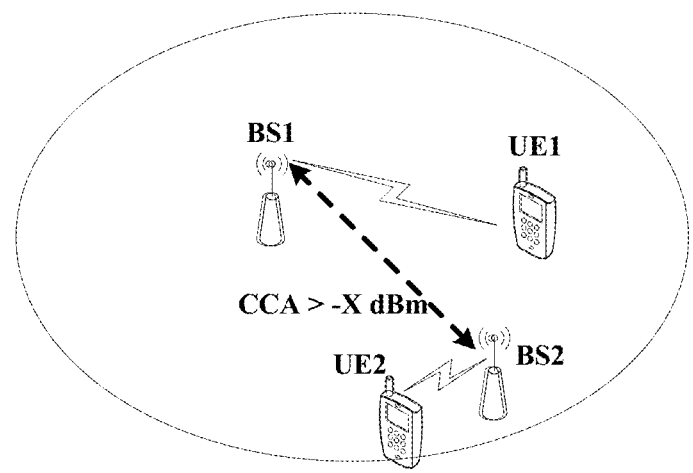
FIG. 4 is a schematic diagram of an omnidirectional ED-based LBT used by a transmission device which performs signal transmission and reception in an omnidirectional mode according to an embodiment of the present disclosure.

FIG. 4 is a schematic diagram of an omnidirectional ED-based LBT. As shown in FIG. 4, a base station 2 is in the coverage range of a base station 1 and the base station 2 sends information to a UE 2. When the base station 1 performs the omnidirectional ED-based LBT, the base station 1 detects signal energy sent by the base station 2 within the coverage range of the base station 1. If the detected signal energy is greater than the preset threshold value, the base station 1 determines the channel is busy, and does not send the information to the UE1. For low-frequency scenarios, such an omnidirectional ED-based LBT mechanism can effectively ensure the channel access fairness between transmission devices and reduce to some extent the probability of collision and conflict between transmission devices.

However, for high-frequency scenarios, due to the large path loss on the uplink/downlink, a directional beam transmission manner needs to be used in the uplink/downlink so that the signal energy is concentrated in one beam range to compensate for the large path loss, and the omnidirectional reception and/or transmission manner cannot be used. Based on this, the LBT scheme for transmission in the beam manner in the high-frequency scenario is described in detail in the following implementation modes.

Implementation Mode 2

The present implementation mode provides an LBT mechanism used in a high frequency scenario in which a transmission device performs transmission in an omnidirectional mode and another transmission device performs transmission in a directional mode.

In the high-frequency scenario, the transmission device may transmit and/or receive information in the omnidirectional mode and/or the directional mode. Similarly, if the unlicensed spectrum is used in the high-frequency scenario, the transmission device needs to perform the LBT mechanism before transmission.

In the case where some transmission devices perform transmission in the omnidirectional mode, while some transmission devices perform transmission in the directional mode in a high frequency scenario, when the transmission device performs the LBT mechanism, using the ED-based LBT mechanism (which may also be referred to as the omnidirectional energy-based LBT mechanism) proposed by the LAA in the Rel-13 and Rel-14 may cause that a channel detection result is inaccurate.

Figure 5:
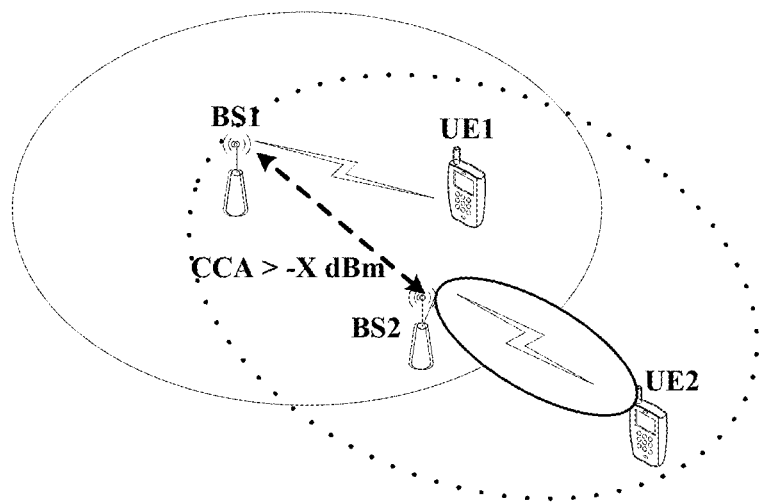
FIG. 5 is a schematic diagram of an omnidirectional ED-based LBT used in a downlink in which a base station 1 performs transmission in an omnidirectional mode and a base station 2 performs transmission in a directional mode according to an embodiment of the present disclosure.

The above case is described with the downlink as an example. As shown in FIG. 5, the base station 1 performs transmission in the omnidirectional mode and the base station 2 performs transmission in the directional mode. The solid circle denotes the coverage range of the base station 1, and the dotted line denotes the area covered by the base station 2. The base station 1 and the base station 2 are within the coverage range of each other.

As shown in FIG. 5, the base station 1 transmits information to the UE1 in the omnidirectional mode. Before the base station 1 performs transmission to the UE1, the base station 1 performs the omnidirectional ED-based LBT mechanism for a clear channel assessment (CCA) detection (the CCA detection is also referred to as an LBT mechanism). When the channel is detected to be idle through the CCA detection, the base station 1 performs transmission to the UE1.

The base station 2 performs transmission to the UE2 in the directional mode. As shown in FIG. 5, the base station 1 has already occupied the channel and is performing transmission to the UE1. At this time, if the base station 2 performs the LBT mechanism (i.e., the omnidirectional ED-based LBT mechanism) for the LAA and performs the CCA detection, the base station 2 detects that the base station 1 that is sending a signal is within the coverage range, and thus determines that the current channel is busy and does not transmit information to the UE2.

Actually the base station 2 performs transmission in the directional beam mode. In some extent, the omnidirectional CCA detection method cannot reflect the channel idle condition in transmission using the directional beam mode. Based on this, a beam-based ED-LBT mechanism needs to be studied.

For example, the base station 2 only detects the signal energy received in the range of the transmit beam. As shown in FIG. 5, the base station 2 can also receive, in the range of the transmit beam, information sent by the base station 1, while actually the energy of the signal transmission of the base station 1 distributed in the range of the transmit beam of the base station 2 is not greater than a preset threshold value, so the base station 2 can transmit information to the UE2. The signal energy from the base station 1 to the transmit beam range of the base station 2 may be calculated in the following manners. The beamforming weight used in the signal transmission of the base station 2 is multiplied by the signal received by the base station 2 from the base station 1, and the product is subjected to a norm operation, and thus the signal energy is $\|V*H12*X1\|$, where V denotes the transmit beamforming weight of the base station 2, H12 denotes a channel matrix between the base station 1 and the base station 2, X1 denotes information sent by the base station 1, H12*X1 denotes a signal (i.e., an interference signal) received by the base station 2 from the surrounding base station 1, and V*H12*X1 denotes a signal (i.e., an interference signal) received by the base station 2 in the range of the send beam from the surrounding base station 1.

From the case where there is one interference device around the base station 2 to the case where there are multiple interference devices around the base station 2, the signal energy received by the transmission device in the range of the transmit beam is a norm of a product of the transmit beamforming weight of the transmission device and a sum of the received signals sent from the surrounding devices. Alternatively, the signal energy received by the transmission device in a directional beam is $\|V*(H_1*X_1+H_2*X_2+ \ldots +H_n*X_n)\|$. V denotes the beamforming weight of the transmitting device, $H_1, H_2, \ldots, H_n$ each denote a channel matrix between the transmission device and one of the surrounding devices, $X_1, X_2, \ldots, X_n$ each denote a transmit signal vector of one of the surrounding devices of the transmission device, * denotes a product operator, $\|\ \|$ denotes a norm operator, n is the number of the surrounding devices of the transmission device.

The beamforming weight of the transmitting device may be predefined, or notified by the base station to the UE through the physical layer DCI signaling, or notified by the base station to the surrounding device via the X2 air interface, or notified by the UE to the surrounding UE through Internet of Things signaling, or configured through higher-layer RRC signaling, or obtained by performing SVD decomposition on the channel matrix H between the transmitting device and the reception device.

It is assumed that the uplink and downlink channels have certain uplink and downlink channel reciprocity. In addition, it is assumed that a state of a channel between the transmitting end and the reception end is known in advance. The channel matrix H is subjected to SVD decomposition: $H=U\Sigma V^H$ to obtain the precoding matrix/vector V of the transmitting end and the matrix/vector U of the reception end, or obtain the transmit beamforming weight and the receive beamforming weight.

Optionally, a criterion for determining whether the LBT mechanism based on the directional beam is successful or whether the channel is idle is as follows.

If the signal energy received by the transmission device within the beam range is not greater than a preset threshold value, the channel is considered to be idle, or transmission can be performed.

Alternatively, if the signal energy received by the transmission device within the beam range is greater than the preset threshold value, the channel is considered to be busy, or transmission cannot be performed.

The CCA detection threshold used by the omnidirectional LBT mechanism may be the same as the CCA detection threshold used by the directional LBT mechanism, or be different from the CCA detection threshold used by the directional LBT mechanism. The threshold may be predefined, or agreed between the base station and the UE, or indicated through the physical layer DCI signaling, or indicated through the higher-layer RRC signaling.

When the CCA detection threshold used by the omnidirectional LBT mechanism is different from the CCA detection threshold used by the directional LBT mechanism, the CCA detection threshold values for different scenarios may be indicated in a predefined manner, or through physical layer DCI signaling or higher-layer RRC signaling, or by adding a CCA threshold indication IE item to the physical layer DCI signaling or the higher-layer RRC signaling.

Implementation Mode 3

In the implementation mode, provided is an LBT mechanism used in a high frequency scenario in which some transmission devices perform transmission in the omnidirectional mode and some transmission devices perform transmission in the directional mode. The difference between the implementation mode 3 and the implementation mode 2 is that the present implementation mode describes an uplink.

Figure 6:
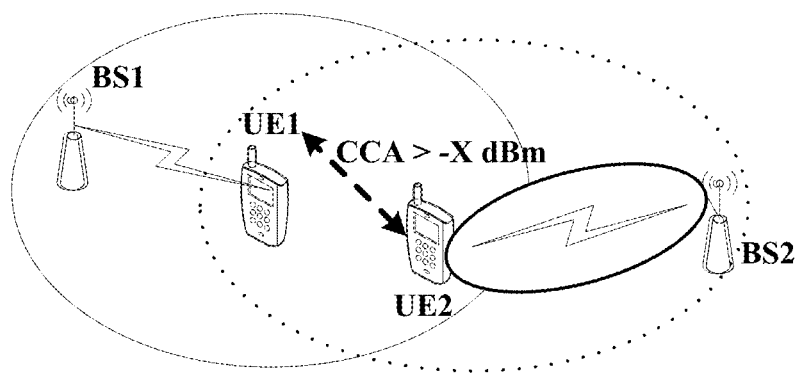
FIG. 6 is a schematic diagram of an omnidirectional ED-based LBT used in an uplink in which a UE1 performs transmission in an omnidirectional mode and a UE2 performs transmission in a directional mode according to an embodiment of the present disclosure.

As shown in FIG. 6, for the uplink, the UE1 performs transmission in the omnidirectional mode, the UE2 performs transmission in the directional mode, and the UE1 is located between the base station 2 and the base station 1. The solid line denotes the coverage range of the UE1, the dotted line denotes the CCA detection range of the UE2, and the narrow beam denotes the range in which the UE2 performs signal transmission.

As shown in FIG. 6, the UE1 performs the CCA detection by using the omnidirectional ED-based LBT mechanism, and performs transmission to the base station 1 to which the UE1 belongs when the channel is determined to be idle.

The UE2 performs transmission to the base station 2 to which the UE2 belongs in the directional beam mode, and performs the CCA detection before transmission. If the omnidirectional ED-based LBT mechanism of the LAA is used (the CCA detection range of the UE2 is centered on the UE2 and of radius r), the signal sent from the UE1 is detected. Since the UE1 is located in the CCA detection range of the UE2, through the CCA detection using the omnidirectional LBT mechanism, the UE2 can receive the signal sent by the UE1, determines the channel is busy and does not perform the transmission to the base station 2 to which the UE2 belongs. Actually, the UE2 performs transmission in the directional beam mode. If the beam-based LBT mechanism is used, the CCA result will indicate that the current channel is available, and the UE2 can transmit information to the base station 2.

Similar to the beam-based LBT method in the implementation mode 2 in which only one interference node exists, the signal energy received by the UE2 in the coverage range of the transmit beam is a norm of a product of the beamforming weight used in the signal transmission of the UE2 and the signal received by the UE2 from the UE1. The signal energy may be $\|V*H12*X1\|$, where V denotes the transmit beamforming weight of UE2, H12 denotes a channel matrix between the UE1 and the UE2, X1 denotes information sent by the UE1, H12*X1 denotes a signal (i.e., an interference signal) received by the UE2 from the surrounding UE1, and V*H12*X1 denotes a signal (i.e., an interference signal) received by the UE2 in the transmit beam range from the surrounding UE1.

To generalize, the signal energy detected by the transmission point in the transmit beam is equal to a norm an accumulated sum of signals, received by the transmission point from all of the surrounding transmission points, with each being multiplied by the transmit beamforming weight. The mathematical expression is as follows. The transmission device has n surrounding devices which are sending signals, the signal or the interference received in the beam range of the transmit beam of the transmission device is $\|V*H_1*X_1+V*H_2*X_2+\ldots V*H_n*X_n\|$. Optionally, the formula may be simplified to $\|V*(H_1*X_1+H_2*X_2+\ldots +H_n*X_n)\|$. $V*H_i*X_i$ denotes the signal sent by the i-th surrounding device and received by the transmission device in the beam range. $V*H_1*X_1+V*H_2*X_2+\ldots V*H_n*X_n$ denote the signals sent by the n surrounding device and received by the transmission device in the beam range. V denotes the beamforming weight of the transmit beam of the transmission device, $H_i$ denotes the channel matrix between the transmission device and the i-th surrounding device, $X_i$ denotes the information transmitted by the i-th surrounding devices of the transmission device, and $H_i*X_i$ denotes the signal sent by the i-th surrounding device and received by the transmission device In addition, the signal energy detected by the transmission point in the transmit beam is equal to a sum of the signal energies received within the beam range by the transmission point from the surrounding transmission points. The mathematical expression is: $\|V*H_1*X_1\|+\|V*H_2*X_2\|+\ldots +\|V*H_n*X_n\|$. V denotes the beamforming weight of the transmit beam of the transmission device, $H_i$ denotes the channel matrix between the transmission device and the i-th surrounding device, $X_i$ denotes the information sent by the i-th surrounding device of the transmission device, $H_i*X_i$ denotes the signal sent by the i-th surrounding device and received by the transmission device, $V*H_i*X_i$ denotes the signal sent by the i-th surrounding device and received by the transmission device on the transmit beam. $\|V*H_i*X_i\|$ denotes the signal energy sent by the i-th surrounding device and received by the transmission device on the transmit beam. $\|V*H_1*X_1\|+\|V*H_2*X_2\|+\ldots +\|V*H_n*X_n\|$ denotes the accumulation sum of the signal energies received on the transmit beam by the transmission device from the n surrounding devices.

Implementation Mode 4

In the implementation mode, provided is an LBT mechanism used in the high-frequency scenario in which the transmission device performs transmission in the directional mode.

For the case where the transmission devices all perform transmission in the directional beam mode and the LBT mechanism is performed before transmission (using the LBT mechanism in the relevant LAA, which is referred to as an omnidirectional ED-based LBT mechanism in the embodiment of the present disclosure), the channel detection result may not fully characterize the channel busy/idle condition of the transmit beam of the transmission device.

Figure 7:
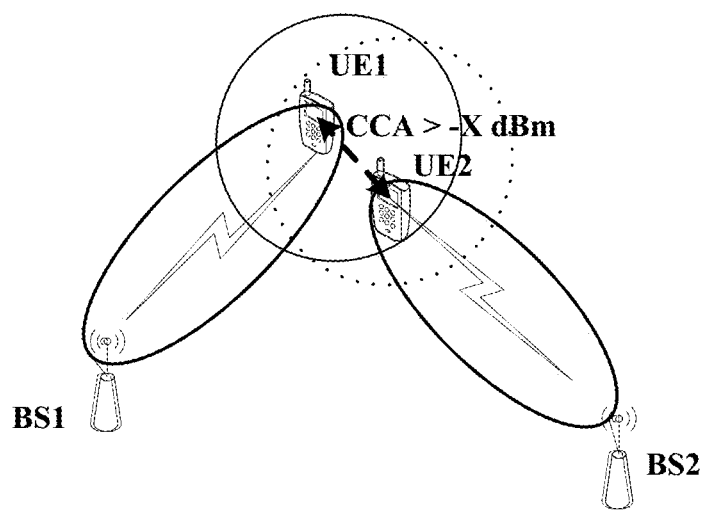
FIG. 7 is a schematic diagram of an omnidirectional ED-based LBT used in an uplink in which a UE1 performs transmission in an omnidirectional mode and a UE2 performs transmission in a directional mode according to an embodiment of the present disclosure.

This case will be described below with examples as shown in FIG. 7.

For uplink transmission, the UE1 performs uplink transmission on the UE1 in the directional beam mode. An omnidirectional ED-based LBT mechanism is performed before the transmission. Upon determining that the channel is idle, the UE1 performs transmission to the base station 1. The UE2 performs transmission to the base station 2 also in the directional beam mode, and uses the omnidirectional ED-based LBT mechanism. Since the omnidirectional LBT mechanism is used, the UE2 can detect, in the omnidirectional coverage range, the signal sent by the UE1 to the base station 1, thereby determining that the current channel is busy and not performing transmission to the base station 2. However, actually the UE1 and the UE2 both perform transmission in the directional beam mode, and no interference is generated between the UE1 and the UE2. Based on this, the omnidirectional ED-based LBT mechanism used in the relevant LAA system is not applicable to the system in which transmission is performed in the beam-based mode in high-frequency scenarios. In the case where the base station side performs transmission in the beam mode, the method provided by the implementation mode may be used for the existing problem and its solving scheme.

Based on this, the beam-based LBT mechanism may be used to determine the channel busy/idle condition in the beam. In the process of performing the beam-based LBT mechanism, the signal energy received in the beam range is calculated in the following method. The beamforming weight of the beam is multiplied by the accumulated sum of the received signals sent by the n surrounding devices. The signal energy received in the beam range is a norm of the above product. Unless specifically stated otherwise, the norm here refers to a 2-norm.

Alternatively, the signal energy received by the transmission device in a directional beam is $\|V*(H_1*X_1+H_2*X_2+\ldots +H_n*X_n)\|$. V denotes the beamforming weight of the transmitting device, * denotes the product operator, $\|\ \|$ denotes the norm operator, and n is the number of the surrounding devices of the transmission device. $V*H_i*X_i$ denotes the signal sent by the i-th surrounding device and received by the transmission device in the transmit beam. $H_i$ denotes the channel matrix between the transmission device and the i-th surrounding device, $X_i$ denotes the information sent by the i-th surrounding device of the transmission device, and $H_i*X_i$ denotes a signal sent by an i-th surrounding device and received by the transmission device The beamforming weight of the transmitting device may be predefined, or notified by the base station to the UE through the physical layer DCI signaling, or notified by the base station to the surrounding device via the X2 air interface, or notified by the UE to the surrounding UE through Internet of Things signaling, or configured through higher-layer RRC signaling, or obtained by performing SVD decomposition on the channel matrix H between the transmitting device and the reception device.

Based on the analysis of the above implementation modes and the existing problems, the beam-based ED-LBT method can be used. It is assumed that the base station 1 performs transmission to the UE1 in a single-beam mode, the base station 2 is located in the beam range of the base station 1 and is performing transmission to the UE2. At this time, the base station 1 sends information X to the UE1 in the beam range, the channel matrix between the base station 1 and the UE1 is denoted by H1, and the signal transmitted by the base station 1 on the transmit beam is denoted by H1*X. Correspondingly, the interference of the signal X, which is sent by the base station 1, to the surrounding device is denoted by H2*X, and H2 is the channel matrix from the base station 1 to the surrounding device (base station or UE). Conversely, the interference caused by the transmission of the surrounding device to the base station 1 is denoted by H2*X2, and X2 is information transmitted by the surrounding device.

For the method in at least one of implementation modes 1 to 4, the beam-based LBT mechanism proposed by the embodiment of the present disclosure will be described below with examples.

Figure 8:
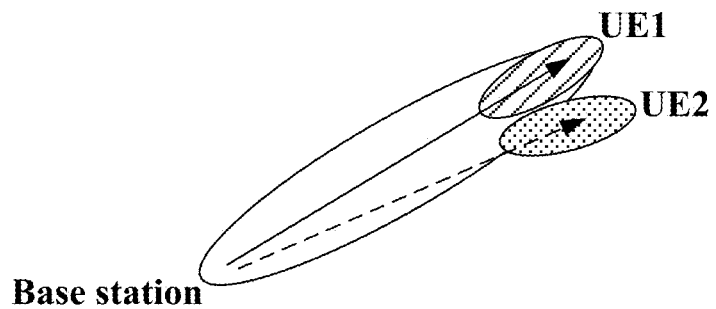
FIG. 8 is a schematic diagram 1 of an interference relationship based on a beam transmission scenario according to an embodiment of the present disclosure.

In an example, there are a transmitting end base station BS1 and a target reception end UE1, and a UE2 is located around or near the target reception end UE1. The interference to the surrounding UE2 node caused by the communication between the BS1 and the UE1 is described below. It is assumed that the channel matrix between the BS1 and the UE1 is denoted as H1, the channel matrix between the BS1 and the UE2 is denoted as H2, and the vector signal sent by the base station BS1 is denoted as X, as shown in FIG. 8.

The precoding matrix/vector or the beamforming weight V1 of the transmitting end is obtained by performing SVD decomposition on the channel matrix H1. Based on this, the information sent by the base station and received by the UE1 is V1*X, and the interference signal sent by the base station and received by the UE2 is V1*H2*X. Optionally, the interference energy to the UE2 generated by communication between the base station and the UE1 is ||V1*H2*X||. ||.|| denotes the norm operator and * denotes a multiplication operator. After X is subjected to normalization or the like, if X=1, the interference energy generated by communication between the base station and the UE1 to the UE2 is ||V1*H2||. The interference value ||V1*H2|| is compared with the threshold value. If the interference value is less than or is less than or equal to the threshold value, the interference caused by the communication in the beam between the base station and the UE1 to the surrounding node is considered to be negligible or to be within the allowable range, or the current channel is considered to be available and the base station can perform transmission to the UE1.

Conversely, if the interference level of the base station to the UE2 is equivalent to the interference of the UE2 to communication from the base station to the UE1 (or from the UE1 to the base station), the interference signal energy ||V1*H2|| caused the UE2 and detected by the base station is accurate. The coverage of the receive beam and the coverage of the transmit beam are consistent coverage. The direction of the receive beam and the direction of the transmit beam are the same or different.

The above interference calculation may be extended to other cases. If the target node B1 has multiple surrounding nodes, such as B2, B3, . . . , Bn, the channel matrices between the base station and the surrounding nodes B1, B2, B3, . . . , Bn are respectively H1, H2, H3, . . . , Hn. In this case, when the base station communicates with the UE1, the interference signal energy detected by the base station is ||V1*H2*X2+V1*H3*X3+ . . . +V1*Hn*Xn||, simplified as ||V1*(H2*X2+H3*X3+ . . . +Hn*Xn)||, or approximately equal to ||V1*(H2+H3+ . . . +Hn)||.

For the uplink, the signal energy can be calculated in the same manner as above.

The method for calculating the signal energy in the beam is illustrated below.

Case 1: Ideally, no other interference nodes exist in the transmit end beam and the reception end beam. It is assumed that the coverage of the transmit beam is the same as the coverage of the receive beam, that is, the energy of the transmit beam is equivalent to the energy received in the beam range. The case is similar to a case where no other interference signal or channel or interference node exists in the beam.

Figure 9:
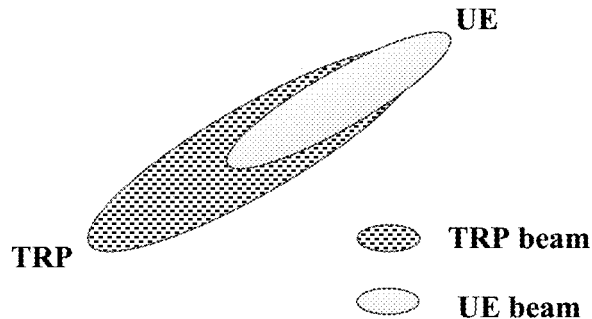
FIG. 9 is a schematic diagram of a transmit beam and a receive beam in an ideal state according to an embodiment of the present disclosure.

As shown in FIG. 9, the CCA detection is performed before the TPR performs transmission on the beam. A criterion for determining whether the CCA detection is successful or whether the transmission can be performed on the beam is: whether the signal energy received in the transmit beam satisfies a certain threshold value. For example, if the signal energy received in the transmit beam is less than the preset threshold, the channel is considered to be idle, and then transmission to the target node can be performed in the transmit beam. Conversely, if the signal energy received in the beam is greater than the preset threshold, the channel is considered to be busy or the beam is used by another node.

Calculation of the signal energy received in the beam includes two cases.

In one case, any signal energy received in the beam is taken into account. That is, signal energy sent by the own node (for example, the same-system node, and/or the node belonging to the same operator, and/or the target node, and/or the node that can be multiplexed) in the beam, and signal energy sent by other nodes (i.e., nodes other than the node itself) sent in the beam are taken into account.

In the other case, signal energies sent in the beam by the nodes other than the own node are taken into account.

Based on the above two cases and according to the characteristics of the high-frequency communication scenario, the calculated signal energy in the beam is equal to a value obtained by multiplying the received information by the beamforming weight. If the calculated value in the beam is comparable to the transmission energy of the transmit beam, it is considered that the channel is available, or that no interference from other nodes exists in the beam, or that the interference of other nodes in the beam is negligible, or that no interference beam exists around the beam.

The preset threshold may be obtained in at least one of the following manners: predefinition, configuration through higher-layer RRC signaling, configuration through physical layer DCI signaling, pre-agreement between the base station and the UE, or a combination thereof.

Here, the physical layer DCI signaling may be high-frequency physical layer DCI signaling or low-frequency physical layer DCI signaling notification, or low-frequency-assisted high-frequency notification. The above manners may be combined in various manners. For example, detection threshold (high-frequency CCA detection threshold, and/or low-frequency CCA detection) is configured through the higher-layer RRC signaling, and the threshold value configured through the higher-layer RRC signaling is triggered into effect through the physical layer DCI signaling. Here, only one combination manner is listed, and other combining manners of the above manners may be used for determining the threshold of high-frequency CCA detection.

Case 2: One interference node exists in the receive beam and/or the transmit beam.

Figure 10:
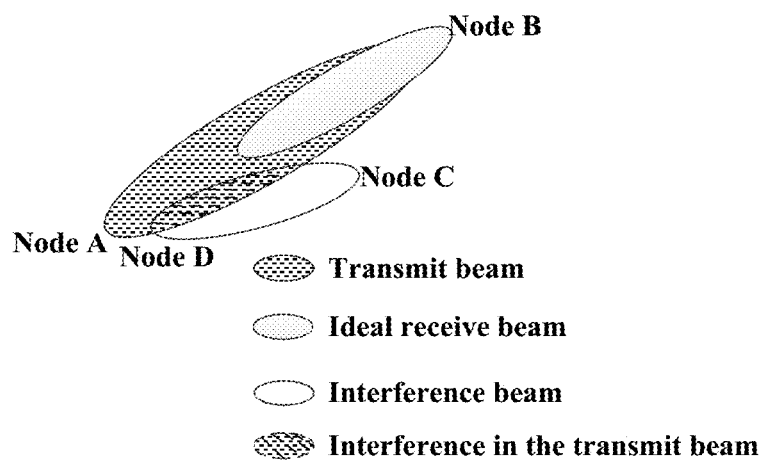
FIG. 10 is a schematic diagram 2 of an interference relationship based on a beam transmission scenario according to an embodiment of the present disclosure.

As shown in FIG. 10, a node A and a node B are an ideal transmit and receive beam pair, and a node C and a node D are an ideal transmit and receive beam pair. Before the node A performs transmission to the node B, the node A performs the CCA detection to determine whether the current channel is idle, and then the transmission between the node A and the node B may be performed. When the node A performs the energy-based CCA detection, signal energy from the node B to the node A is not taken into account in the calculation of the signal energy in the transmit beam of the node A since the node A and the node B have not communicated yet. The signal energy in the transmit beam of the node A is calculated in the following manners.

Manner 1: the signal energies of nodes other than the own node in the beam are calculated. The signal energy calculated in the manner 1 includes not only signal energies in the beam range from nodes that cannot be multiplexed, but also signal energies in the beam range from the nodes that can be multiplexed (including the homogeneous system node, and/or the node belonging to the same operator, and/or the node in the same beam range).

Figure 11:
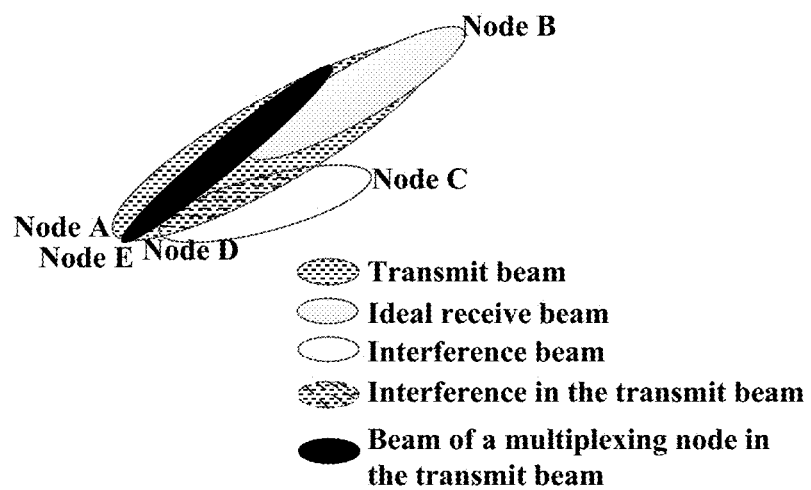
FIG. 11 is a schematic diagram 3 of an interference relationship based on a beam transmission scenario according to an embodiment of the present disclosure.

As shown in FIG. 11, it is assumed that the beam is multiplexed by the node A and a node E, and the node D is an interference node. At this time, the node A calculates the energy in the beam by using the following energy calculation method: ‖(the beam weight of the node A)*(He*Xe+Hd*Xd)‖; or ‖(the beam weight of the node A)*(He*Xe+Hc*Xc)‖; or ‖(the weight of the node E)*He*Xe+(the beam weight of the node A)*Hd*Xd‖.

He, Hd, and Hc denote the channel matrices of the node E, the node D and the node C, respectively. Xe, Xd and Xc denote transmitting signal or signal vectors/matrices.

The interference signal energy in the beam is calculated, and then is compared with the threshold value. If the signal energy in the beam is less than, or is less than or equal to, the threshold value, the signal is considered to be available or idle or available for transmission. Conversely, if the signal energy in the beam is greater than, or is greater than or equal to, the threshold value, the channel is considered to be busy or not available.

Manner 2: The signal energies in the beam and from nodes other than the nodes that can be multiplexed are calculated.

The difference from the manner 1 is that when the node A calculates the energy in the beam, the energy calculation method is: ‖(the beam weight of the node A)*Hd*Xd‖; or ‖(the beam weight of the node A)*Hc*Xc‖*. Finally, the energy received in the beam is compared with the threshold value to determine whether the channel in the current beam is available.

Figure 12:
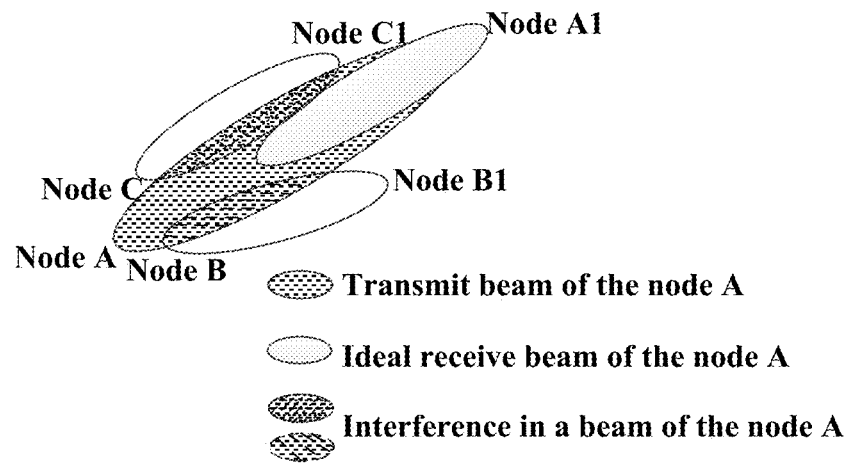
FIG. 12 is a schematic diagram 4 of an interference relationship based on a beam transmission scenario according to an embodiment of the present disclosure.

Case 3: Multiple interference nodes exist in the receive beam and/or the transmit beam. The case 3 is similar to the case 2 in the processing manner, while the difference between the case 3 and the case 2 is that multiple interference nodes or beams exist around the node A, or in the beam of the node A, or around the beam of the node A in the case 3. As shown in FIG. 12, the signal energy calculation method in the send beam is: ‖(the beam weight of the node A)*(Hc*Xc+Hb*Xb)‖, or ‖(the signal of the node C+ the signal of the node B)*the weight of the node A‖.

In addition, when both the reception end and the transmitting end perform transmission in the beam mode, the cases described below exist.

Case 1: The CCA detection is performed on the transmit beam, and is not performed on the receive beam.

Only for the transmitting end, the CCA detection is performed before the transmission is performed on the transmit beam. If the channel in the beam is detected to be idle, the transmission is performed. At this time, since the reception end does not perform the CCA detection in the rage of the receive beam, the information sent by the transmitting end may not be correctly received to some extent due to interference or serious interference in the receive beam.

Conversely, if the transmitting end performs the CCA detection on the transmit beam and detects that the channel is busy, the transmitting end may process in the manner described in the implementation mode X.

Case 2: The CCA detection is performed on both the transmit beam and the receive beam.

For the transmitting end, the processing manner of the CCA detection on the transmit beam is the same as that in the case 1. For the reception side, in the case where the CCA detection is performed on the transmit beam and the channel is detected to be idle, before the transmission on the transmit beam to the reception side, if the reception side device performs the LBT detection on the receive beam and the transmit channel is idle, the transmission can be performed. Since the channel in the range of the receive beam of the reception end is idle, the reception end does not need to feed back or send any information to the transmitting end. Conversely, if the reception end performs the CCA detection and detects that the channel on the receive beam is busy, the reception end performs the CCA detection on a sub-optimal receive beam. If an idle state is detected, the sub-optimal receive beam is used for reception. Optionally, the transmitting side may be notified of beam information on the reception side. Alternatively, the transmitting side is not notified, and the transmitting side may send information on several candidate receive beams. Alternatively, when the reception end performs the CCA detection and detects that the channel on the receive beam is busy, the reception end sends to the transmitting side channel state information of the beam, or interference state information of the receive beam, or information of a receive beam to be switched to or to be used and/or the channel state thereof. Correspondingly, for the transmitting side device, if the transmitting end does not receive the information of the reception end within a certain period of time, the transmitting end considers that the channel of the reception end is available and can perform transmission. Conversely, if the transmitting end receives the information sent by the reception end, the current transmission may be abandoned, or the receive beam of the reception end may be adjusted and the reception end is notified of the adjusted receive beam, or the transmitting end performs transmission by using a transmit beam that matches the receive beam notified by the reception end, or the transmitting end performs transmission by still using the original send beam.

Implementation Mode 5

In the present implementation mode, provided is an LBT mechanism used when a transmission device performs transmission on a directional beam in a case of multiple beams.

In the case where the transmission device is provided with multiple beams, whether the multiple beams are available may be determined in one of the following methods.

Method 1: the channel busy/idle condition of each of the multiple beams is respectively determined according to signal energy received in each single beam.

For example, the base station 1 has three beams. Before performing transmission on the three beams, the base station 1 needs to perform the beam-based LBT mechanism on the three beams respectively. Whether the channel on each single beam is idle is determined by determining whether the signal energy received on the single beam satisfies a preset threshold value. If the signal energy detected on the single beam is greater than the preset threshold value, the channel is determined to be busy. Conversely, if the signal energy detected on the single beam is not greater than the preset threshold value, the channel is determined to be idle. The signal energy detected on the single beam is a norm of a value obtained by multiplying a beamforming weight by an accumulated sum of received signals sent by the surrounding devices. Alternatively, the signal energy detected on the single beam is an accumulated sum of norms of multiple values, each of the multiple values is a product of the transmit beamforming weight of the transmission device and the signal sent by a respective one of the surrounding devices.

Optionally, if the LBT is successfully performed on at least one of the multiple directional beams, it is considered that the multiple directional beams are available or that the channels are idle, and transmission is performed only on the directional beam on which the LBT is successfully performed.

Alternatively, if the LBT is successfully performed on all of the multiple directional beams, it is considered that the multiple directional beams are available or that the channels are idle.

Alternatively, if the LBT fails on at least one of the multiple directional beams, it is considered that the multiple directional beams are not available or that the channels are busy.

Alternatively, if the number of directional beams, among the multiple directional beams, on which the LBT is successfully performed reaches a predetermined threshold value, it is considered that the multiple directional beams are available or that the channels are idle, and transmission is performed only on the directional beam on which the LBT is successfully performed.

Alternatively, if the number of directional beams, among the multiple directional beams, on which the LBT fails reaches a predetermined threshold value, it is considered that the multiple directional beams are not available or that the channels are busy.

Method 2: The channel busy/idle condition of the multiple beams or whether the multiple beams can be used for transmission is determined based on a sum of signal energies received on the multiple directional beams.

There are two cases in the method 2.

Case 1: the multiple directional beams belong to the same antenna element or antenna port.

Signal energy received in the beam region formed by the multiple directional beams is an accumulated sum of the signal energy ($\|V^{1*}(H_1*X_1+H_2*X_2+ \ldots +H_n*X_n)\|$) received by the transmission device in a first beam, the signal energy ($\|V^{2*}(H_1*X_1+H_2*X_2+ \ldots +H_n*X_n)\|$) received by the transmission device in a second beam, . . . and the signal energy ($\|V^{m*}(H_1*X_1+H_2*X_2+ \ldots +H_n*X_n)\|$) received by the transmission device in an m-th beam. The signal energy received in the beam region formed by the multiple directional beams is $\|V^{1*}(H_1*X_1+H_2*X_2+ \ldots +H_n*X_n)\|+\|V^{2*}(H_1*X_1+H_2*X_2+ \ldots +H_n*X_n)\|+ \ldots \|V^{m*}(H_1*X_1+H_2*X_2+ \ldots +H_n*X_n)\|$.

$V^1, V^2, \ldots, V^m$ denote beamforming weights of m beams. $H_1, H_2, \ldots, H_n$ each denote the channel matrix between the transmission device and the surrounding device. $X_1, X_2, \ldots, X_n$ denote the transmit signal vectors of the surrounding devices of the transmission device. $*$ denotes the product operator, $\| \|$ denotes the norm operator, n is the number of the surrounding devices of the transmission device, and m is the number of the directional beams transmitted by the transmission device. $H_j*X_j$ denotes a signal sent by a j-th surrounding device and received by the transmission device, $V^{i*}H_j*X_j$ denotes a signal sent by the j-th surrounding device and received by the transmission device in the i-th beam range, and $V^{i*}(H_1*X_1+H_2*X_2+ \ldots +H_n*X_n)$ denotes signals sent by the surrounding devices and received in the i-th beam.

Alternatively

The signal energy received in the beam region formed by the multiple directional beams is a norm of an accumulated sum of the signal energy ($V^{1*}(H_1*X_1+H_2*X_2+ \ldots +H_n*X_n)$) received by the transmission device in the first beam, the signal energy ($V^{2*}(H_1*X_1+H_2*X_2+ \ldots +H_n*X_n)$) received by the transmission device in the second beam, . . . and signal energy ($V^{m*}(H_1*X_1+H_2*X_2+ \ldots +H_n*X_n)$) received by the transmission device in the m-th beam. The signal energy received in the beam region formed by the multiple directional beams is $\|V^{1*}(H_1*X_1+H_2*X_2+ \ldots +H_n*X_n)+V^{2*}(H_1*X_1+H_2*X_2+ \ldots +H_n*X_n)+ \ldots +V^{m*}(H_1*X_1+H_2*X_2+ \ldots +H_n*X_n)\|$.

$V^1, V^2, \ldots, V^m$ denote the beamforming weights of the m beams, $H_1, H_2, \ldots, H_n$ each denote a channel matrix between the transmission device and a respective one of the surrounding devices, $X_1, X_2, \ldots, X_n$ denote the transmit signal vectors of the surrounding devices of the transmission device, $*$ denotes the product operator, $\| \|$ denotes the norm operator, n is the number of the surrounding devices of the transmission device, m is the number of the directional beams transmitted by the transmission device, $H_j*X_j$ denotes a signal sent by the j-th surrounding device and received by the transmission device, $V^{i*}H_j*X_j$ denotes a signal sent by the j-th surrounding device and received by the transmission device in an i-th beam range, and $V^{i*}(H_1*X_1+H_2*X_2+ \ldots +H_n*X_n)$ denotes signals sent by the surrounding devices and received in the i-th beam.

Case 2: the multiple directional beams belong to different antenna elements or antenna ports.

The signal energy received in the beam region formed by the multiple directional beams is equal to an accumulated sum of the signal energy received by the transmission device in the first beam, the signal energy received by the transmission device in the second beam, . . . , and the signal energy received by the transmission device in the m-th beam.

Alternatively, the signal energy received in the beam region formed by the multiple directional beams is equal to:

$$\|V^{1*}(H_1^1*X_1+H_2^1*X_2+ \ldots +H_n^1*X_n)\|+\|V^{2*}(H_1^2*X_1+H_2^2*X_2+ \ldots +H_n^2*X_n)\|+ \ldots \|V^{m*}(H_1^m*X_1+H_2^m*X_2+ \ldots +H_n^m*X_n)\|$$

$V^1, V^2, \ldots, V^m$ denote the beamforming weights of m beams respectively, $H_1^i, H_2^i, \ldots, H_n^i$ denote the channel matrices on the i-th beam and between the transmission device and the n surrounding devices, $X_1, X_2, \ldots, X_n$ denote the transmit signal vectors of the surrounding devices of the transmission device respectively, $H_j^i*X_j$ denotes the signal sent by the j-th surrounding device and received by the transmission device, $V^{i*}H_j^i*X_j$ denotes the signal sent by the j-th surrounding device and received by the transmission device in the i-th beam range, $V^{i*}(H_1^i*X_1+H_2^i*X_2+ \ldots +H_n^i*X_n)$ denotes signals sent by the n surrounding devices and received by the transmission device in the i-th beam range, $\|V^{i*}(H_1^i*X_1+H_2^i*X_2+ \ldots +H_n^i*X_n)\|$ denotes the signal energies received by the transmission device in the i-th beam range from the n surrounding devices, $*$ denotes the product operator, $\| \|$ denotes the norm operator, n is the number of the surrounding devices of the transmission device, m is the number of the beams.

Alternatively, the signal energy received in the beam region formed by the multiple directional beams is equal to a norm of the accumulated sum of the signal energy received by the transmission device in the first beam, the signal energy received by the transmission device in the second beam, . . . and the signal energy received by the transmission device in the m-th beam.

Alternatively, the signal energy received in the beam region formed by the multiple directional beams is equal to $\|V^{1*}(H_1^1*X_1+H_2^1*X_2+ \ldots +H_n^1*X_n)+V^{2*}(H_1^2*X_1+H_2^2*X_2+ \ldots +H_n^2*X_n)+ \ldots +V^{m*}(H_1^m*X_1+H_2^m*X_2+ \ldots +H_n^m*X_n)\|$.

$V^1, V^2, \ldots, V^m$ denote the beamforming weights of m beams. $H_1^i, H_2^i, \ldots, H_n^i$ denote the channel matrices on the i-th beam between the transmission device and the n surrounding devices. $X_1, X_2, \ldots, X_n$ denote the transmit signal vectors of the surrounding devices of the transmission device. $H_j^i*X_j$ denotes the signal sent by the j-th surrounding device and received by the transmission device. $V^i*H_j^i*X_j$ denotes the signal sent by the j-th surrounding device and received by the transmission device in the i-th beam range. $V^i*(H_1^i*X_1+H_2^i*X_2+\ldots+H_n^i*X_n)$ denotes signals sent by the n surrounding devices and received by the transmission device in the i-th beam range. * denotes the product operator, $\| \|$ denotes the norm operator, n is the number of surrounding devices of the transmission device, and m is the number of the beams.

Alternatively, the signal energy received in the beam region formed by the multiple directional beams is equal to an accumulated sum of the signal energy ($\|V^1*(H_1^1*X_1^1+H_2^1*X_2^1+\ldots+H_{n1}^1*X_{n1}^1)\|$) sent by n1 surrounding devices and received in the first beam, the signal energy ($\|V^2*(H_1^2*X_1^2+H_2^2*X_2^2+\ldots+H_{n2}^2*X_{n2}^2)\|$) sent by n2 surrounding devices and received in the second beam, . . . and the signal energy ($\|V^m*(H_1^m*X_1^m+H_2^m*X_2^m+\ldots+H_{nn}^m*X_{nn}^m)\|$) sent by nn surrounding devices and received in the m-th beam. The signal energy received in the beam region formed by the multiple directional beams is $\|V^1*(H_1^1*X_1^1+H_2^1*X_2^1+\ldots+H_{n1}^1*X_{n1}^1)\|+\|V^2*(H_1^2*X_1^2+H_2^2*X_2^2+\ldots+H_{n2}^2*X_{n2}^2)\|+\ldots\|V^m*(H_1^m*X_1^m+H_2^m*X_2^m+\ldots+H_{nn}^m*X_{nn}^m)\|$.

$V^1, V^2, \ldots, V^m$ denote the beamforming weights of m beams respectively, $H_1^i, H_2^i, \ldots, H_{nj}^i$ denote the channel matrices between the transmission device and the nj surrounding devices on the i-th beam respectively, $X_1^i, X_2^i, \ldots, X_{nj}^i$ denote the transmit signal vectors of the nj surrounding devices of the transmission device on the i-th beam respectively, $H_{nj}^i*X_{nj}^i$ denotes a signal sent by the nj-th surrounding device and received by the transmission device, $V^i*H_{nj}^i*X_{nj}^i$ denote the signal sent by the nj-th surrounding device and received by the transmission device in the i-th beam range, $V^i*(H_1^i*X_1^i+H_2^i*X_2^i+\ldots+H_{nj}^i*X_{nj}^i)$ denotes signals sent by the nj surrounding devices and received by the transmission device in the i-th beam range, $\|V^i*(H_1^i*X_1^i+H_2^i*X_2^i+\ldots+H_{nj}^i*X_{nj}^i)\|$ denotes signal energies sent by the nj surrounding devices and received by the transmission device in the i-th beam range, * denotes the product operator, $\| \|$ denotes the norm operator, nj is the number of the surrounding devices of the transmission device, m is the number of beams.

Alternatively

The signal energy received in the beam region formed by the multiple directional beams is equal to a norm of an accumulated sum of signals ($V^1*(H_1^1*X_1^1+H_2^1*X_2^1+\ldots+H_{n1}^1*X_{n1}^1)$) sent by the n1 surrounding devices and received in the first beam, signals ($V^2*(H_1^2*X_1^2+H_2^2*X_2^2+\ldots+H_{n1}^2*X_{n1}^2)$) sent by the n2 surrounding devices and received in the second beam, . . . and signals ($V^m*(H_1^m*X_1^m+H_2^m*X_2^m+\ldots+H_{nn}^m*X_{nn}^m)$) sent by the nn surrounding devices and received in the m-th beam. The signal energy received in the beam region formed by the multiple directional beams is $\|V^1*(H_1^1*X_1^1+H_2^1*X_2^1+\ldots+H_{n1}^1*X_{n1}^1)+V^2*(H_1^2*X_1^2+H_2^2*X_2^2+\ldots+H_{n1}^2*X_{n1}^2)+\ldots+V^m*(H_1^m*X_1^m+H_2^m*X_2^m+\ldots+H_{nn}^m*X_{nn}^m)\|$.

$V^1, V^2, \ldots, V^m$ denote the beamforming weights of m beams, $H_1^i, H_2^i, \ldots, H_{nj}^i$ each denote the channel matrix between the transmission device and one of the nj surrounding devices on the i-th beam, $X_1^i, X_2^i, \ldots, X_{nj}^i$ denote the transmit signal vectors of the nj surrounding devices of the transmission device on the i-th beam, $H_{nj}^i*X_{nj}^i$ denotes a signal sent by a nj-th surrounding device and received by the transmission device, $V^i*H_{nj}^i*X_{nj}^i$ denotes the signal sent by the nj-th surrounding device and received by the transmission device in the i-th beam range, $V^i*(H_1^i*X_1^i+H_2^i*X_2^i+\ldots+H_{nj}^i*X_{nj}^i)$ denotes signals sent by the nj surrounding devices and received by the transmission device in the i-th beam range, * denotes the product operator, $\| \|$ denotes the norm operator, nj is the number of the surrounding devices of the transmission device, m is the number of the beams. n1, n2, . . . , nn may be the same, or different numbers. If the number of interference devices in each beam is the same, in the case where the multiple directional beams belong to different antenna elements, the signal energy received in the beam region formed by the multiple directional beams is:

$$\|V^{1*}(H_1^1*X_1^1+H_2^1*X_2^1+\ldots+H_n^1*X_n^1)+V^{2*}(H_1^2*X_1^2+H_2^2*X_2^2+\ldots+H_n^2*X_n^2)+\ldots+V^{m*}(H_1^m*X_1^m+H_2^m*X_2^m+\ldots+H_n^m*X_n^m)\|.$$

$V^1, V^2, \ldots, V^m$ denote the beamforming weights of the beams respectively, $H_1^i, H_2^i, \ldots, H_n^i$ denote the channel matrices between the transmission device and the surrounding devices on the i-th beam, $X_1^i, X_2^i, \ldots, X_n^i$ denote the transmit signal vectors of the surrounding devices of the transmission device on the i-th beam, * denotes the product operator, $\| \|$ denotes the norm operator, n is the number of the surrounding devices of the transmission device, m is the number of the beams, i is a positive integer within [1, m].

Method 3: the channel busy/idle condition of the multiple directional beams is determined according to the signal energy received in the beam region formed by the multiple directional beams. The signal energy received in the beam region formed by the multiple directional beams is equal to a norm of a value which is obtained by multiplying a sum of signals received from surrounding devices of the transmission device by the beamforming weight formed by the multiple directional beams.

For the methods 2 and 3, when the signal energy received in the beam coverage range formed by the multiple directional beams is not greater than a predetermined threshold value, it is determined that channel in the beam formed by the multiple directional beams is idle, or that channel in the multiple directional beams is idle, or that transmission can be performed on the multiple directional beams.

Alternatively, when the signal energy received in the beam coverage range formed by the multiple directional beams is greater than the predetermined threshold value, it is determined that the channel in the beam formed by the alternatively directional beams is busy or that the channel in the alternatively directional beams is busy, or that transmission cannot be performed on the alternatively directional beams.

The advantage of the method 2 and the method 3 is that only one LBT detection is needed to determine whether the multiple directional beams are available, which reduces to a certain extent the energy loss caused by execution of the LBT mechanism.

Implementation Mode 6

In the implementation mode, provided is a channel access method in the high-frequency scenario in which the transmitting end performs transmission in the beam mode and the reception end uses the omnidirectional reception mode. Downlink transmission is taken as an example. A TRP1 performs transmission to the UE1, and a TRP2 performs transmission to the UE2. The TRP1 sends information to the UE1 in the beam mode and the TRP2 sends information to UE2 also in the beam mode. The UE1 receives the information sent by the transmitting end in an omnidirectional manner and the UE2 receives the information sent by the transmitting end in the omnidirectional manner too, and the UE1 and the UE2 are within the reception range of each other.

Figure 13:
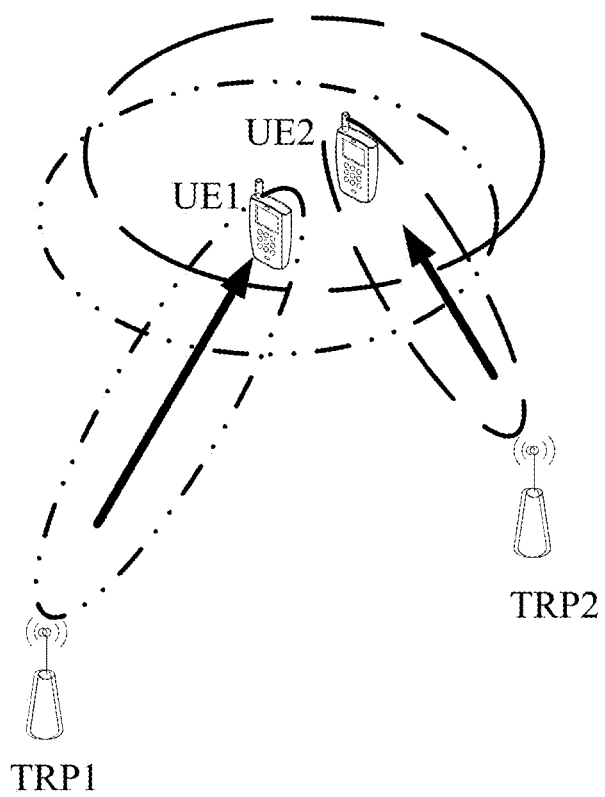
FIG. 13 is a schematic diagram of transmission in a beamforming manner and reception in an omnidirectional manner according to an embodiment of the present disclosure.

As shown in FIG. 13, it is assumed that before the TRP2 performs transmission to the UE2, the TRP2 performs the ED-based CCA detection in a beam. When the detection result indicates the channel is idle, the TRP2 sends information to the UE2. Similarly, before the TRP1 performs transmission to the UE1, the TRP1 also needs to perform ED-based CCA detection in a beam. The beam-based LBT mechanism described in at least one of the implementation modes 2 to 5 may be used as the method for detecting whether a channel in the beam is available or idle. The focus is the method of calculating the signal energy received in the beam and the detection threshold value used for determining whether the channel is in the beam idle.

At this time, since each of the TRP1 and the TRP2 performs transmission only in its own beam, the signal sent by the TRP2 cannot be detected by the TRP1. Therefore, the TRP1 determines that the channel is idle based on the CCA detection, and transmits information to the UE1. In view of the above, since the reception ends UE1 and UE2 are within the reception range of each other, neither the UE1 nor the UE2 can correctly receive the information sent by their respective TRP.

The reception device may operate in the following manners.

Declaration: Before the reception side receives the information, whether the reception side device performs the LBT mechanism (including at least one of: not performing the LBT mechanism, performing the omnidirectional-mode LBT mechanism, and performing the directional-mode LBT mechanism), and/or whether the reception side device performs the non-LBT-mechanism predetermined processing operation, and/or whether the reception side device performs switching from the omnidirectional mode to the directional mode may be determined through one of: indication through physical layer DCI signaling, configuration through higher-layer RRC signaling, predefinition, or pre-agreement between the base station and the UE.

The manner 1 is as follows. Before receiving the information from the transmitting end, the reception end performs the CCA detection or interference measurement. According to the CCA detection result or the interference measurement condition, the reception end sends the CCA detection result or the interference measurement result to the transmitting end device. Alternatively, the reception end sends indication information to the transmitting end device. Optionally, the transmitting end determines whether to perform the transmission operation. The reception device performs reception in an omnidirectional antenna mode, so the omnidirectional LBT mechanism, such as the LBT mechanism used for the LAA system, is used when CCA detection is performed.

Alternatively, the reception device performs the LBT mechanism or interference measurement in the range of the receive beam, so that the reception device can determine the channel condition in the receive beam. If the channel in the beam is detected to be idle, the information is received directly. Optionally, the reception device may send indication information to the transmitting end for notifying the transmitting end of a beam identifier (ID), and/or the LBT result in the beam, and/or the interference measurement information. Conversely, if the channel in the beam is detected to be busy, the reception device sends indication information to the transmitting end device for notifying the transmitting end of the CCA detection result and/or the interference condition on the reception side.

The measured item in the interference measurement may be RSSI, RSRP, and RSRQ. The indication information may be RSSI, RSRP and RSRQ measurement result, or ACK/NACK.

The CCA detection or the interference measurement is used for acquiring the interference condition of the node.

In another case, the reception end also performs reception in the beam mode. Before performing reception, the reception end performs the beam-based LBT mechanism so as to determine whether the channel in the current beam is idle or determine the interference condition in the current beam. Optionally, the reception end sends the LBT result or the interference measurement condition to the transmitting end, so that the transmitting end determines whether to continue the transmission operation.

The manner 2 is as follows. The reception end switches from the omnidirectional reception mode to the directional beam reception mode.

If the reception device performs the LBT detection according to the omnidirectional reception mode and detects that the current channel is busy, or detects that the surrounding interference level reaches a certain threshold, the reception device switches to the directional beam reception mode. Alternatively, the reception device reports the CCA detection result or the interference measurement value, and the transmitting end dynamically instructs through physical layer DCI signaling the reception device to switch to the directional beam reception mode. The interference threshold value may be predefined, or pre-agreed between the base station and the UE, or indicated through the physical layer DCI signaling, or indicated through the higher-layer RRC signaling.

After switching to the directional beam reception mode, the reception device may perform the beam-based LBT mechanism, or does not perform the beam-based LBT mechanism (since the directional beam after switching is relatively narrow, or the configured beam has small traffic load or small interference, the probability of conflict and collision between nodes is reduced or avoided to some extent).

The directional beam is a relatively preferred beam obtained by beam training and indicated by the base station through DCI signaling or predefined. One or more receive beams may exist on the reception side. When multiple receive beams exist, S optimal beams are obtained by beam training. The S optimal beams are top S ones among the beams arranged based on their SINR values in the largest-to-smallest order.

In the case where the reception device performs the beam-based LBT mechanism, if the signal energy detected in the receive beam is not greater than a preset threshold value, the reception device can perform the reception normally. The reception device does not need to send indication information to the transmitting end. Conversely, if the signal energy detected in the beam range is greater than the preset threshold value, the reception device may perform the following processing.

Processing manner 1: The reception device performs the beam-based LBT mechanism on other candidate beams.

The LBT performing sequence of the candidate beams is as follows. The LBT may be performed on the candidate beams sequentially in a polling manner. Alternatively, the LBT may be performed from the optimal beam to the suboptimal beam. Alternatively, the LBT may be performed in a predefined sequence. Alternatively, the LBT may be performed on beams randomly selected from the candidate beams.

If a channel on a beam is detected to be idle, the reception device reports the receive beam information to the transmitting end. Optionally, the direction of the transmitting beam may be adjusted or may not be adjusted to match the receive beam.

Processing manner 2: The beam-based LBT mechanism is re-performed on a fine beam corresponding to the beam on which LBT fails.

If the above two detection manners both indicate that the channel on the beam is busy, the reception end notifies the transmitting end to abandon the transmission. The notification information may be transmitted through a licensed carrier or other available carriers in the unlicensed spectrum.

The mode switching may be based on the interference measurement condition or the CCA detection result, or triggered through physical layer DCI signaling, or configured through higher-layer RRC signaling. The directional beam may be predefined, or predetermined by the transmitting end for the reception end, or determined by the reception end itself, or jointly determined by the transmitting end and the reception end, or indicated through physical layer DCI signaling, or determined through high-layer RRC signaling, or predetermined by the transmitting end and the reception end, or obtained through beam training, or randomly selected from the candidate beams, or one of the candidate beams having the largest SINR, or the like.

Similarly, for the uplink scenario in which the transmitting end uses the beam mode while the reception end uses the omnidirectional mode, the processing method is the same as the processing manner described above.

Similarly, the processing manner for the case where the transmitting end uses the omnidirectional mode while the reception end uses the beam mode is also the same as the processing manner described above.

In another case, if the reception end detects that the channel in the reception range is idle, the reception end does not need to send information to the transmitting end, and directly performs reception.

In the case where the reception device sends indication information to the transmitting device, or reports interference measurement information or the CCA detection result or the like, if the transmitting end does not receive the information within the predetermined time, the transmitting end determines that interference around the reception device is relatively small or that the channel is detected to be idle through the CCA detection. The predetermined time may be predefined, or pre-agreed between the base station and the UE, or indicated through the physical layer DCI signaling, or indicated through the higher-layer RRC signaling. The predetermined time may be the time of feeding back an ACK/NACK, such as 1 us, 2 us, 4 us, 9 us, 16 us, etc.

The method for the reception end to perform reception in the omnidirectional mode in the implementation mode is also applicable to the transmitting end device.

Implementation Mode 7

The present implementation mode provides a processing method for the case where the transmission is performed in the directional beam mode and the beam-based LBT fails.

For the failure of the beam-based LBT mechanism on the beam, the following three manners are provided.

Manner 1: Once a channel state of a beam is detected to be busy, the beam is considered to be unavailable, or transmission on the beam is abandoned.

Manner 2: When the channel on the corresponding beam is detected to be busy, a channel condition on a finer beam in the beam on which LBT fails is detected. Here, the finer beam is referred to as a secondary beam. A beam that is finer than the secondary beam is referred to as a tertiary beam, and so on.

For the manner 2, an operation performed on multiple secondary beams in the beam on which LBT fails to includes one of the following operations.

Operation 1: the LBT mechanism is performed on multiple secondary beams in a manner of time division multiplexing (TDM).

For the operation 1, if multiple beams belong to a beam, or belong to a beam group, or are in the same transmission period, LBT may be performed according to one of the following schemes (the LBT mechanism is the beam-based LBT mechanism).

Scheme 1: The LBT is sequentially performed on the corresponding beams in a polling manner.

Scheme 2: The LBT is performed on beams selected in a random manner.

This is useful for quickly determining which secondary beam the interfering node is located in, thereby adjusting or determining which secondary beam in the beam is used for transmission.

For the above two schemes, if Cat4 LBT or Cat2 LBT is used on the beam on which LBT fails/succeeds, the Cat2 LBT or Cat2 LBT having a short duration may be used on the secondary beam, to satisfy the shortest detection duration for fair coexistence.

Secondly, for the above two schemes, the following rules are provided.

Rule 1: As long as a secondary beam is detected to be idle through the CCA detection, the CCA detection on other secondary beams is stopped. The secondary beam on which the CCA is successfully performed is used for the transmission.

Rule 2: When the CCA detection indicates that a secondary beam is busy and energy is greater than a specified threshold and less than a threshold value of a primary beam, it is determined that the fine beam can be multiplexed and can be used for transmission.

Rule 3: When a secondary beam is detected to be idle through the CCA detection, the CCA detection is continued. When the number of the secondary beams which are detected to be idle reach a preset number, the transmission is performed on the idle fine beam, or the transmission is performed on the optimal fine beam selected from the idle fine beams.

Rule 4: By traversing the secondary beams, the transmission is performed on at least one of the secondary fine beams that are detected to be idle through the CCA detection.

Operation 2: The beam-based LBT mechanism is performed on multiple secondary beams at the same time. This operation includes the following four schemes.

Scheme 1: Cat2 LBT is performed on multiple secondary beams at the same time. As long as at least one secondary beam is detected to be idle, the primary beam (which can be considered as an upper-level beam of the secondary beams, that is, a beam wider than the secondary beam) is considered to be available. Form the secondary beams which are detected successfully to be idle, at least one of the idle secondary beams is selected for transmission.

Scheme 2: the Cat4 LBT is performed on a main secondary beam of the multiple secondary beams. When the cat4 LBT is about to be completed, the Cat2 LBT starts being performed on other secondary beams, and the secondary beam on which the LBT process is completed may be used for transmission.

Scheme 3: Cat4 LBT is performed on multiple secondary beams, the value N of each of the multiple secondary beams is independently updated, or the multiple secondary beams use the same N, and the secondary beam on which the LBT process is completed may be used for transmission.

Scheme 4: LBT (Cat4 LBT or Cat2 LBT) is performed on the multiple secondary beams at the same time. As long as the number of the secondary beams which are detected to be idle meet the preset number, the primary beam (which may be considered as the upper-level beam of the secondary beams, that is, the beam wider than the secondary beam) is considered to be available, or the idle secondary beam is used for transmission.

Figure 14:
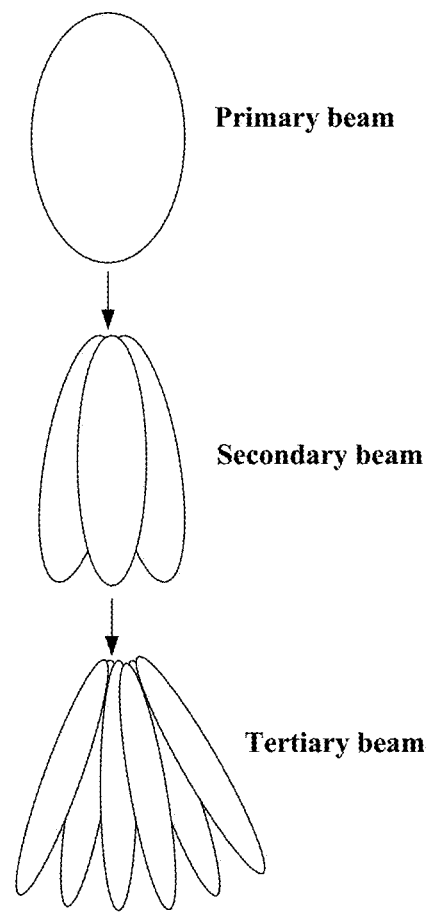
FIG. 14 is a schematic diagram of multi-level beams according to an embodiment of the present disclosure.

The way in the manner 2 may also be used for the tertiary beam, or finer quaternary beams. See FIG. 14.

Manner 3: The candidate beams other than the beam on which the channel is detected to be busy is detected, or the channel condition of a beam around the busy beam is detected. The CCA may be performed on multiple candidate beams at the same time, or the CCA detection may be sequentially performed in the TDM manner. As long as an idle beam is detected, transmission is performed on the beam. The method of processing the fine beam in the manner 2 may be used in the manner 3.

In order to enhance coverage, a multi-beam transmission mode and a single-beam repeating transmission mode are introduced. In the multi-beam transmission mode, multiple beams may be sent simultaneously or may be sent in the TDM manner, or multiple beams may be sent simultaneously and periodically, or multiple beams may be sent periodically in the TMD manner, or multiple beams may be sent simultaneously in a non-periodic trigger manner (including: the multiple beams being in different frequency domain resources, and/or different spatial domain resources, etc.), or multiple beams may be sent in the TDM manner and in the non-periodic trigger manner. For the single-beam repeating transmission mode, multiple repeated single-beam transmissions may be performed in the TDM manner. The single beams sent in the TDM manner may have the same beam direction, or different beam directions, or a combination thereof (that is, some single beams having the same direction and some single beams having different directions).

Declaration: When the beams are sent in the TDM manner, the beams may be continuous or non-continuous in the time domain.

Based on the above content, the channel access mechanism in the multi-beam mode and the single-beam repeating transmission mode will be described in detail in the following implementation modes.

Implementation Mode 8

In this implementation mode, provided is a channel access manner when multiple beams are transmitted in the TDM manner in the time domain. In the present implementation mode, the channel access manners in different situations are described with an example in which only one beam is transmitted in each transmission of the multi-beam mode. Similarly, the method in this implementation mode is also applicable to the single-beam repeating transmission manner or multi-transmission manner.

The channel contention access manner may be described with the case where multiple beams are transmitted in the TDM manner and are continuous in the time domain, and with the case where the multiple beams are transmitted in the TDM manner and are discrete in the time domain.

Case 1: Multiple beams are transmitted in the TDM manner and are continuous in the time domain.

Figure 16:
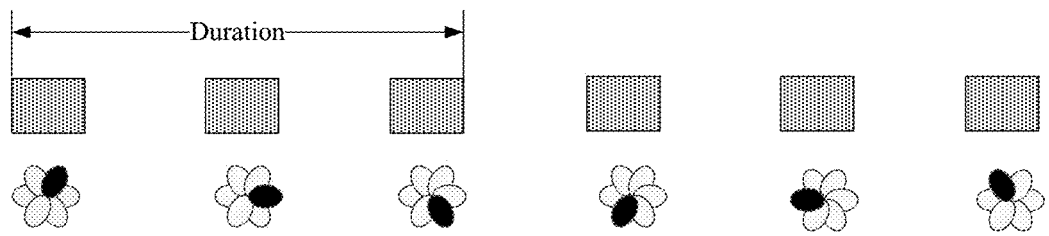
FIG. 16 is a schematic diagram of processing a beam outside a transmission period according to an embodiment of the present disclosure.

The multiple beams are transmitted in a transmission period, or a shared beam transmission period, or a maximum channel occupancy time (MCOT). As shown in FIG. 16, the LBT scheme used by the multiple beams includes at least one of the following manners.

Cat4 LBT is performed on the first beam. Cat2 LBT is performed on the subsequent beams regardless of the LBT result of the first beam.

Cat4 LBT is performed on the first beam. If the LBT is performed successfully, the LBT may not be performed on the subsequent beams.

Cat4 LBT is performed on the first beam. If the LBT is performed successfully, Cat4 LBT is performed on the subsequent beams, a contention windows (CW) of the Cat4 LBT performed on each of the subsequent beams is smaller than the contention window used in the previous beam.

Cat4 LBT is performed on the first beam, and if the LBT is performed successfully, Cat 2 LBT may be performed on the subsequent beams.

Cat4 LBT is performed on the first beam. In the case where the LBT on the first beam is succeeds, if the number of successful contentions for the carrier according to the Cat2 LBT meets a predetermined number, LBT may not be performed on the remaining beams.

Cat2 LBT is performed on the first beam, and the above Cat4 LBT schemes are used for the subsequent beams.

Cat4/Cat2 LBT is performed on a previous beam, and if the LBT fails, the LBT type of the next beam is indicated by the base station or the next beam still uses the LBT mechanism of the previous beam.

If the LBT fails on a certain beam, the LBT may be performed on secondary beams (i.e., finer beams). Alternatively, another carrier is used for sending the corresponding information on the beam.

Figure 15:
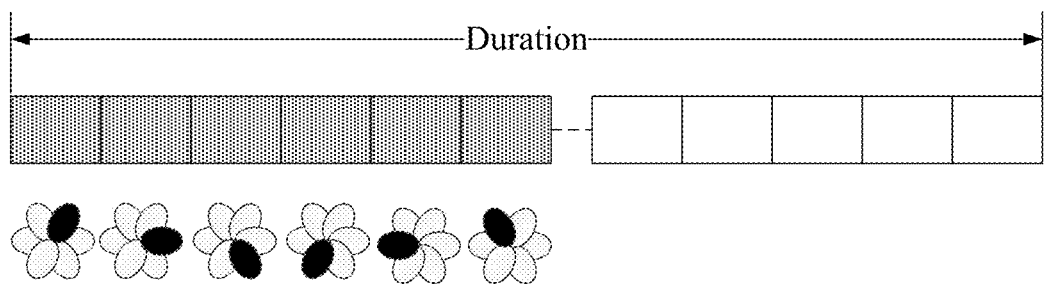
FIG. 15 is a schematic diagram of processing a beam in a transmission period according to an embodiment of the present disclosure.

In FIG. 15, the time domain resource corresponding to the beam may be an orthogonal frequency division multiplexing (OFDM) symbol, or a scheduling unit, or a transmission time interval (TTI), or a slot, or a mini-slot, or the like.

Declaration: The description of the first beam may be replaced by the description of the previous beam.

Case 2: Multiple beams are transmitted in the TDM manner and are discrete in the time domain. See FIG. 16.

For the LBTs in a shared Maximum Channel Occupy Time (MCOT), or a transmission period or a duration, a conclusion in the LAA may be applicable: in one transmission period/shared MCOT/duration, Cat4 LBT is used by the first beam and Cat2 LBT is used by the subsequent beams.

In order to enable information on the remaining beams to be transmitted quickly or to implement beam training and other functions, the beam outside the transmission period/shared MCOT/duration may use Cat2 LBT or Cat2 LBT with the minimum time interval.

When the LBT fails on the beam, LBT may be performed on the secondary beams or more sub level beams. Alternatively, the beam direction is changed and the LBT is re-performed.

Implementation Mode 9

In the implementation mode, provided is a channel access manner for the scheme multiple beams are simultaneously transmitted in the time domain.

Scheme 1: Cat2 LBT is simultaneously performed on multiple beams.

If the number of beams on which LBT is successfully performed meets a predetermined threshold value, at least one of the beams on which LBT is successfully performed may be used for transmission.

If there exist LBT failures on the multiple beams, the LBT continues to be performed on the beams on which LBT is successfully performed, and the LBT continues to be performed on the beams on which LBT fails with adjusting the beam direction or beam range (for example, secondary beams) until all beam are detected to be idle, or until the number of beams on which LBT is successfully performed meets the predetermined threshold value. For the beam on which LBT fails, as long as its secondary beam is detected to be idle through LBT, this beam is considered to be idle, and the transmission is only performed on the secondary beam.

Simultaneous transmission of the multiple beams can be performed only if each of the multiple beams is detected to be idle.

Scheme 2: Cat4 LBT is simultaneously performed on the multiple beams.

Each beam independently generates an N value.

The multiple beams share an N value.

In the process of performing the Cat4 LBT on each beam, execution of LBT on the sub-level beams is started when the LBT fails. As long as the LBT is successfully performed in the sub-level beam, the value N is also decreased.

If a beam on which the LBT process is completed in advance exists, the beam sends a discovery signal, or a reference signal, or a reserving signal, or an occupancy signal, or the like, or the LBT on the beam continues.

If the number of beams on which the LBT is completed reaches a predefined threshold value, LBT on other beams can be stopped, or Cat2 LBT or Cat2 LBT having the minimum time interval is performed on other beams.

Scheme 3: a combination manner of Cat4 LBT and Cat2 LBT is used by the multiple beams. Cat4 LBT is used on a selected main beam and Cat2 is performed on other beams. The difference from the relevant scheme is that execution of the Cat2 LBT and execution of the Cat4 LBT are started at the same time. If the LBT is successfully performed on other beams or on an expected beam, the Cat4 LBT process on the main beam may be simplified, or the LBT type may be changed.

Scheme 4: the multiple beams are divided into several beam groups, and then the above three schemes may be used. The difference is that the first LBT is performed with taking a beam group as a unit. Only when the channel on the beam group is detected to be busy, the second LBT is performed with a smaller beam unit. Proceeding in this fashion, LBT is performed on single beams. This scheme can effectively reduce the number of times the LBT is performed and save the power consumption of the UE.

Implementation Mode 10

In the implementation mode, provided is a beam-based LBT manner for different signals, and/or different channels, and/or different beams, and/or different traffic, and/or different priority levels.

Signals and/or channels may use different types of beams (a wide beam, and a fine beam), or the same type of beam, or a combination of beam types. For example, a wide beam is used as the control beam and a fine beam is used as the data beam. The wide beam used for the control information includes multiple fine data beams. In this case, multiple fine beams in each wide beam may be regarded as a beam group, or a beam duration, or a beam MCOT, or a shared group/transmission period. In addition, multiple fine beams in the wide beam may use the same LBT manner as the wide beam, or use a LBT manner, such as Cat 3/4 LBT having smaller CWs, or Cat2 LBT or no LBT, that is more simplified or faster than an LBT mechanism on the wide beam. Optionally, the multiple fine beams may use different LBT mechanisms or the same LBT mechanism having different LBT parameters. In addition, different wide beams may also be regarded as a shared MCOT, a beam group, a beam duration, a beam MCOT, or a shared group/transmission period, or may also be regarded as different beams, different MCOTs, different beam groups, different beam durations, or different shared groups/transmission periods. Different beams, different beam groups, different MCOTs, different beam durations or different transmission periods are regarded as a new beam for transmission, and Cat4/3 LBT or Cat2 LBT may be used.

In order to ensure that the LBT is fully performed for the control information, the Cat4 LBT may be used for the control beam or the wide beam, and narrow data beams in the wide beam range may be understood as a transmission beam within an MCOT. At this time, the data beams may use a simplified LBT or no LBT is performed on the data beams, or LBT is performed on the first data beam and is not performed on the subsequent beams, and the like.

Different wide beams may use the same LBT. Alternatively, different wide beams use different LBTs with the LBT on a subsequent wide beam being simplified than the LBT on the previous wide. This facilitates fast access and information transmission.

Figure 17:
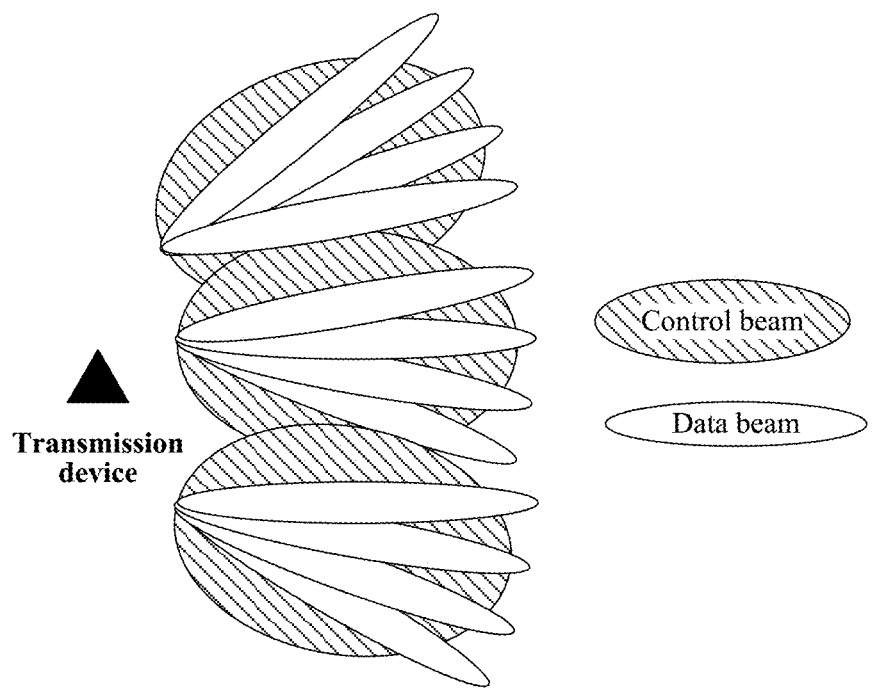
FIG. 17 is a schematic diagram of beams used by different signals and/or different channels and/or different traffic types according to an embodiment of the present disclosure.

As shown in FIG. 17, if the LBT fails on a data beam in the first control beam and the direction of the data beam needs to be adjusted, the adjusted data beam is located in the second control beam or the third control beam. The ownership of the beam or the interference relationship changes, so the LBT needs to be performed in a default LBT mechanism, or a LBT mechanism indicated by the physical layer DCI signaling, or according to an LBT rule in the beam.

Implementation Mode 11

In the implementation mode, provided is a contention access method used in multiplexing with a homogeneous system or heterogeneous system.

(1) Multiplexing with the Homogeneous System

The beam may be at a cell level, or a UE-specific level, or a beam group level.

Multiplexing in the beam

For the TRP, operator, or UE in the homogeneous system, multiplexing is in the configured beam.

The transmitting end detects signal energy in the beam. If the beam is determined to be idle, the transmitting end may perform operations in the following manner.

The transmitting end sends a preamble signal or an identification signal throughout the beam, which are used for the multiplexing transmitting end to perform identification. The identification signal carries the following contents: a beam direction, a beam broadband, a beam index, an index of a fine beam in the beam, transmitting power, a TRP identifier, a UE identifier, a beam-group identifier, and the like.

Figure 18:
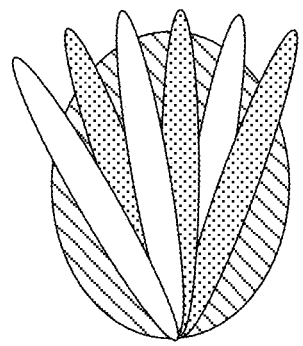
FIG. 18 is a schematic diagram of a wide beam pattern and a fine beam pattern according to an embodiment of the present disclosure.

The transmitting end performs transmission on a predetermined beam pattern in the beam. The multiplexing node detects that the channel in the beam is busy, and detects that the channel on the corresponding beam pattern is busy and the channel on other beam pattern is idle, and thus the beam can be multiplexed by this node, or this node can perform transmission on a finer beam in this beam. See FIG. 18.

Multiplexing Between Beams

Different TRPs, or different operators, or different UEs multiplex different beams. Their beam patterns may be obtained through coordination, or pre-definition, or signaling indication. Based on this, the LBT is performed on the beams before transmission is performed on the beams. If the LBT succeeds, transmission is performed on the corresponding beams. If the LBT fails, the LBT is performed on finer beams (also referred to as secondary beams).

In addition, in the case where the multiplexing node is configured with multiple beams, when the multiplexing node detects that the channel on one of the multiple beams is busy, the multiplexing node may switch to another candidate beam for performing LBT, thereby determining whether this beam may be multiplexed.

(2) Multiplexing with Heterogeneous System

The multiplexing between different systems may be implemented according to the manner of multiplexing between beams. Alternatively, the multiplexing between different systems may be implemented through determining their respective beams by means of exchanging the beam information. Alternatively, the multiplexing between different systems may be implemented through the LBT manner, that is, the manner that who successfully contends for the beam who uses the beam.

Implementation Mode 12

For the characteristics of the high-frequency communication scenario, mutual communication is performed in a beam manner. The narrow beam is used for transmission, reducing to some extent the collision probability in the high-frequency scenario. Based on this, in the high-frequency scenario, before the transmission node performs transmission on specified spectrum (including: licensed spectrum, or unlicensed spectrum, or shared spectrum), the transmission node may not perform the LBT or use the dynamic LBT manner. In the implementation mode, the method that the nodes do not perform an LBT operation or use a dynamic LBT manner to reduce or decrease collision between resources or nodes in the high-frequency scenario will be described in detail.

Manner 1: Beam/beamforming randomization processing is used. The processing may avoid the problem of fixed interference caused by fixed beams to other nodes.

The beam includes a transmit beam or a receive beam. That is, for the transmitting end or the receiving end, the used transmit beam or receive beam is randomly selected in a beam set. The beam may be randomly selected by a base station, or randomly selected by a UE, or randomly selected by the base station and the UE.

The beam set may be a candidate beam set or a configured beam set. The beam set may be determined or obtained in the following manners. The beam set is predefined. The beam set is determined by a base station autonomously. The beam set is determined by a UE autonomously. The beam set is determined through higher-layer RRC signaling. The beam set is determined through physical layer DCI signaling. Alternatively, the beam set is determined through any combination of the above manners.

The beam randomization method is implemented by using a fixed rule. For example, it is assumed that the transmission device has 6 beams. In a sequential polling manner, the transmission device uses a beam 1 for the first transmission, a beam 2 for the second transmission, and so on, and a beam 6 for the sixth transmission. Alternatively, the transmission is performed on beams with even indexes, that is, on the beam 2, the beam 4, and the beam 6. Alternatively, the transmission is performed on on the beams with even indexes in a sequential polling manner, that is, the first transmission is performed on the beam 2, the second transmission is performed on the beam 4, and the third transmission is performed on the beam 6. Alternatively, the transmission is performed on a beam indicated through physical layer DCI signaling or higher-layer RRC signaling. For example, the beam ID, the beam index, or the offsets of the transmission beam with respect to the multiple beams are indicated in the DCI signaling. Alternatively, bit information is used for indication, for example, 000100 indicates transmission on the beam 4, 001000 indicates transmission on the beam 3, and 0 12 0 0 0 0 indicates that transmission of the transmission device 12 is on the beam 2. The number of bits is the number of the beams. Alternatively, a value indicated by the bit information is used to indicate the beam on which the transmission is performed. For example, 001 indicates transmission on the beam 1, 010 indicates transmission on the beam, and so on. Alternatively, the beam used for transmission is obtained by the beam index modulo the offset. For example, there are 6 beams, their beam indexes are 0, 1, 2, 3, 4 and 5, the offset is 2, the higher-layer signaling or physical layer DCI signaling indicates that an index M is 0, so the transmission device performs transmission on beams where the beam index modulo the offset is 0, that is, transmission is performed on the beam 1, the beam 3 and the beam 5.

The beam randomization method is implemented in a random manner. For example, a beam used for transmission is randomly selected from multiple beams. For example, for p beams, a positive integer or the specified number of positive integers within [0, p−1] or [0, p−1] are generated according to a uniform distribution function, a binomial distribution function, or a normal distribution function. p is the number of beams.

Alternatively, a combination of the fixed rule and the random method is used. For example, a beam used for transmission is selected in a random manner from beams whose beam indexes are even. In the example there are six beams, the even-index beams are the beam 2, the beam 4, and the beam 6. In combination with the random selection method, one or more beams for transmission are randomly selected from the beam 2, the beam 4, and the beam 6.

The manner of using a fixed rule and/or the beam random selection manner are also applicable to the frequency hopping method. That is, the number of beams is replaced by the number of frequency domains, or the beam information is replaced by the frequency domain information.

Manner 2: The interference problem is avoided by semi-statically configuring beams or adjusting beams. That is, the configured beams or the beams in the beam set are measured within a certain period. Whether to perform a directional beam switching is determined based on the measurement information. A criterion for determining whether to perform the directional beam switching includes: performing the directional beam switching when a measured load, a measured interference value, or a measured information transmission error probability on the current transmission beam in the certain period is greater than a predetermined threshold value; or not performing the directional beam switching when the measured load, the measured interference value, or the measured information transmission error probability on the current transmission beam in the certain period is not greater than the predetermined threshold value. Cat4 LBT with a small contention window, or Cat2 LBT, or a simpler LBT mechanism is performed on a beam having a larger load, interference value, or information transmission error probability. The channel occupation duration of the beam having a smaller load, interference value, or information transmission error probability is adjusted. For example, the channel occupation duration is increased.

The basic operation principle is as follows.

Step 1: A beam set or candidate beams are configured.

The beam set or the candidate beams may be configured through physical layer DCI signaling, predefinition, or higher-layer RRC signaling, or obtained through any combination thereof.

Step 2: At least one beam in the configured beam set is activated. The configured beam may be activated through the physical layer DCI signaling, a media access control control element (MACCE), predefinition, or higher-layer RRC signaling.

At least one of the step 1 and the step 2 described above may be combined or omitted; or replaced with a beam set configuration by the device.

Step 3: The interference condition or load condition of at least one beam in the beam set is measured, and the beam to be used is adjusted based on the measurement result. That is, whether the beam is available is not determined LBT, while measurement is used to determine whether the channel is available or whether collision or conflict exists between nodes or resources.

If the energy in the beam is measured to be greater than the threshold value during the measurement period, the load in the beam is considered to be relatively large. Conversely, if the energy in the beam is measured to be less than the threshold value during the measurement period, the load or the conflict probability is considered to be small, so transmission may be switched to this beam. Optionally, LBT may be performed or may not be performed on the selected beam. The measurement may be performed by the base station, or may be performed by the UE and then reported to the base station, or may be measured by the UE. The subject determining to perform beam switching may be the base station and/or the UE.

Optionally, the channel occupation duration on the beam may also be adjusted based on the measurement result of the beam. For example, the LBT may be performed in the occupation duration but the LBT detection result is not used as the basis for determining whether the channel is available, or the LBT is not performed in the occupation duration. The LBT detection result may be used as a basis for multiplexing between nodes in the beam, or used for reducing the probability of collision between nodes in the system or between nodes under the operator.

The measurement reference quantity used for measurement may be an received signal strength indication (RSSI), radio resource management (RRM), a reference signal receive power (RSRP), or feedback information.

The measurement on the beam may be a periodic measurement, or an aperiodic measurement, or a mixing of periodic measurement and aperiodic measurement. The period of the periodic measurement, and/or the trigger of the aperiodic measurement, and/or the number of measurements, and/or the interval between measurements may be configured through higher-layer RRC signaling, or notified through physical layer DCI signaling, or predefined, or obtained through any combination thereof.

Manner 3: The dynamic LBT manner is used.

The manner 3 refers to that LBT may be performed or may not be performed before transmission on the beam.

In a case where the LBT is not performed, according to the measured load condition of the beam, a direct method is used, that is, the LBT is not performed for transmission or reception on a beam having lower load. Since the beam has a smaller load, the probability of conflict or collision is reduced to some extent. Alternatively, LBT is performed on a beam having a larger load to reduce conflict or collision between nodes or resources.

Alternatively, for candidate beams, LBT is performed on a beam randomly selected from the candidate beams, and/or LBT is not performed on other beams, or LBT is performed on the selected beam having larger load or lower load, and/or LBT is not performed.

Manner 4: A beam pattern manner or a frequency hopping manner is used.

For the manner 4, different beam patterns are defined for different nodes or different systems or the frequency hopping manner is used to avoid interference between nodes or resource collision.

For the beam pattern manner, the transmit beam patterns and/or the receive beam patterns or the pattern set are predefined. The pattern of the transmit beam and/or receive beam may be a fixed beam/beam pattern configured in advance for transmission or reception, or may be a randomly selected beam or beam pattern for transmission or reception. For example, the beam IDs configured for the UE1 are #1, #2, #3, #4, #5, and #6. The beam pattern is a pattern in which the beam IDs are in an increasing order or in a decreasing order, or a pattern in which the beam IDs are in a predefined order, or a pattern in which the beam IDs are in an order pre-agreed by the base station and the UE, or a sequence. In another manner, the device randomly selects a beam from 6 configured beams for transmission and/or reception.

Similarly, for the frequency hopping manner, the conflict or collision may be avoided or reduced in a manner of fixed frequency hopping or in a manner of random frequency hopping. In the manner of fixed frequency hopping, the position or rule of frequency hopping may be predefined. In this manner, interference between nodes may be fixed. In the manner of random frequency hopping, hopping is performed according to a random sequence, which reduces the conflict probability to some extent or to a large extent. For example, there are 8 frequency domain resources, and each transmission of the transmission device occupies one frequency domain resource. The transmission device performs transmission on these frequency domain resources in an increasing order of frequency domain resource index. Alternatively, the transmission device performs transmission on these frequency domain resources in a decreasing order of frequency domain resource index. Alternatively, the transmission is performed according to the offset, and/or the number of resources of a continuous transmission, and/or the transmission is performed at positions corresponding to frequency domain resource intervals. For example, the offset is 3, the continuous transmission length is 2, and the transmission device may perform transmission on the frequency domain resource whose index is 2 and the frequency domain resource whose index is 3 (the frequency domain resource index starts from 0). Alternatively, on the 8 available frequency domain resources, the transmission is performed on a frequency domain resource position generated according to a random function. Alternatively, the transmission is performed on the starting position of the frequency domain resources for transmission. For example, a generated random number is 2, and the transmission device performs transmission on the frequency domain resource whose index is 1 (the frequency domain resource index starts from 0). Alternatively, the transmission starts at the frequency domain resource whose index is 1 and is continued at the frequency domain resources with larger indexes. For example, the number of continuous resources in the frequency domain is 3, that is, transmission is performed on the frequency domain resources having indexes 1, 2 and 3. Alternatively, the interval on the frequency domain is 2, that is, transmission is performed on the frequency domain resources having indexes 1, 4 and 7, or transmission is performed on the frequency domain resources having indexes 1, 3, 5 and 7.

For example, the UEs under the homogeneous system, or the same operator, or the same TRP use the same beam pattern. Different systems, or different TRPs, or different operators, or different UEs use different beam patterns. The beam pattern may be predefined, or pre-agreed between the base station and the UE, or negotiated between base stations (or TRPs), or negotiated between UEs, or notified by the base station through the physical layer DCI signaling, or notified through the higher-layer RRC signaling, or obtained through any combination thereof.

For another example, the probability of collision or conflict between nodes is reduced in the frequency domain hopping manner.

From the description of the implementation modes described above, it will be apparent to those skilled in the art that the method of any implementation mode described above may be implemented by means of software plus a necessary general-purpose hardware platform, or may of course be implemented by hardware. Based on this understanding, the solutions provided by the embodiments of present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, or the like) to execute the methods according to each implementation mode of the present disclosure.

Implementation Mode 2

A data transmission apparatus is further provided in the implementation mode. The apparatus is configured to implement the above-mentioned embodiments and implementation modes. What has been described will not be repeated. As used below, a term "module" may be software, hardware or a combination thereof capable of implementing predetermined functions. The apparatus described below in the embodiment may be implemented by software, but implementation by hardware or by a combination of software and hardware is also possible and conceived.

Figure 19:
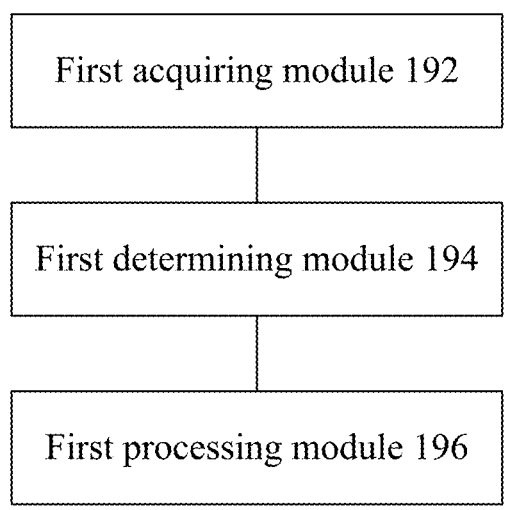
FIG. 19 is a structural block diagram of a data transmission apparatus according to an embodiment of the present disclosure.

FIG. 19 is a structural block diagram of a data transmission apparatus according to an embodiment of the present disclosure. As shown in FIG. 19, the apparatus includes a first acquiring module 192, a first determining module 194, and a first processing module 196. The data transmission apparatus is described below.

The first acquiring module 192 is configured to obtain predefined information. The first determining module 194 is connected to the first acquiring module 192 and is configured to determine, according to the predefined information, whether to perform a listen-before-talk (LBT) mechanism before transmission. The first processing module 196 is connected to the first determining module 194 and is configured to perform the LBT mechanism before a transmission device performs transmission according to a predetermined transmission mode when LBT indication information is carried in the predefined information, or perform a predetermined non-LBT processing operation before the transmission device performs the transmission according to the predetermined transmission mode when the LBT indication information is not carried in the predefined information.

Figure 20:
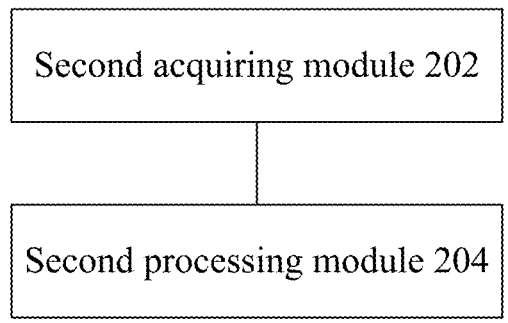
FIG. 20 is a structural block diagram of a data transmission apparatus according to an embodiment of the present disclosure.

FIG. 20 is a structural block diagram of a data transmission apparatus according to an embodiment of the present disclosure. As shown in FIG. 19, the apparatus includes a second acquiring module 202 and a second processing module 204. The data transmission apparatus is described below.

The second acquiring module 202 is configured to obtain predefined information. The second processing module 204 is connected to the second acquiring module 202 and is configured to perform, according to the predefined information, information reception processing according to an omnidirectional mode or a directional mode.

Figure 21:
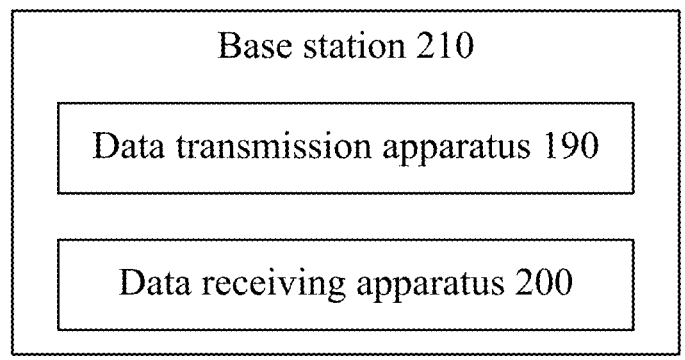
FIG. 21 is a structural block diagram of a base station according to an embodiment of the present disclosure.

FIG. 21 is a structural block diagram of a base station according to an embodiment of the present disclosure. As shown in FIG. 21, a base station 210 apparatus includes the above-mentioned data transmission apparatus 190 and/or data reception apparatus 200.

Figure 22:
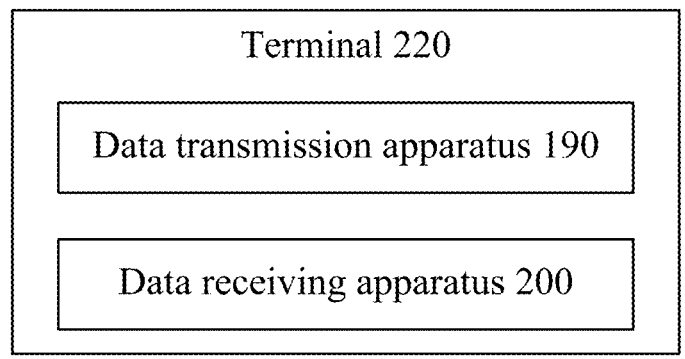
FIG. 22 is a structural block diagram of a terminal according to an embodiment of the present disclosure.

FIG. 22 is a structural block diagram of a terminal according to an embodiment of the present disclosure. As shown in FIG. 22, a terminal 220 includes the above-mentioned data transmission apparatus 190 and/or data reception apparatus 200.

The various modules described above may be implemented by software or hardware. Implementation by hardware may, but may not necessarily, be performed in the following manner: the various modules described above are located in a same processor or located in different processors in any combination form.

A storage medium is further provided in the embodiments of the present disclosure. Optionally, in the embodiment, the storage medium may be configured to store program codes for executing the steps in the data transmission method and/or data reception method described in the above embodiments.

The storage medium may be computer-readable storage medium, such as transient computer-readable storage medium or non-transient computer-readable storage medium.

Optionally, in the embodiment, the storage medium may include, but is not limited to, a USB flash disk, a read-only memory (ROM), a random access memory (RAM), a mobile hard disk, a magnetic disk, an optical disk or another medium capable of storing program codes.

Optionally, in the embodiment, a processor executes the steps in the above-mentioned data transmission method and/or data reception method according to the program codes stored in the storage medium.

Optionally, for examples in the embodiment, reference may be made to the examples described in the embodiments and optional implementation modes described above, and the examples will not be repeated in the embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only embodiments of the present disclosure and are not intended to limit the present disclosure, and for those skilled in the art, the present disclosure may have various modifications and variations. Any modifications, equivalent substitutions, improvements and the like within the scope of the present disclosure shall fall within the scope of the present disclosure.

INDUSTRIAL APPLICABILITY

The data transmission method and apparatus, the data reception method and apparatus, the base station and the terminal provided in the present application effectively solve the inefficient signal transmission problem in the beamforming system.

What is claimed is:

1. A data transmission method, comprising:
acquiring predefined information;
determining, according to the predefined information, whether to perform a listen-before-talk (LBT) mechanism before transmission;
upon the predefined information carrying LBT indication information, performing the LBT mechanism before a transmission device performs transmission according to a directional mode; or
upon the predefined information not carrying the LBT indication information, performing a predetermined non-LBT processing operation before the transmission device performs transmission according to the directional mode;
wherein the directional mode comprises at least one of: a directional transmit beam, or a directional receive beam;
wherein for one transmission device, a relationship between the directional transmit beam and the directional receive beam comprises:
the directional transmit beam being the same as the directional receive beam; or
the directional transmit beam being different from the directional receive beam; or
the directional transmit beam partially overlapping the directional receive beam;
wherein the relationship between the directional transmit beam and the directional receive beam is determined in at least one of following manners:
predefinition; pre-agreement between a base station and a user equipment (UE); indication through physical layer downlink control information (DCI) signaling; or configuration through higher-layer radio resource control (RRC) signaling.

2. The method of claim 1, further comprising:
performing a Cat2 LBT mechanism or a Cat2 LBT mechanism having a shorter detection duration on a directional beam in a transmission period, a channel occupancy time, or a beam group; or
performing the Cat2 LBT mechanism, a Cat4 LBT mechanism, a Cat4 LBT mechanism corresponding to a predetermined priority level, or a Cat3 LBT mechanism on a directional beam outside the transmission period, the channel occupancy time, or the beam group; or
performing the Cat4 LBT mechanism, the Cat4 LBT mechanism corresponding to the predetermined priority level, or the Cat3 LBT mechanism on a directional beam in the transmission period, or the channel occupancy time, or an initial beam group.

3. The method of claim 2, wherein the predetermined priority level or the LBT mechanism used for the directional beam is determined in one of following manners: pre-agreement between a base station and a user equipment (UE); predefinition; indication through physical layer downlink control information (DCI) signaling by the base station; or indication through higher-layer radio resource control (RRC) signaling.

4. The method of claim 1, wherein the predefined information comprises at least one of:
a transmission mode, indication signaling, an information type, frame structure information, a beam identifier (ID), a beamforming weight, a beam type, a beam pattern, a threshold value, an LBT mechanism indication, a time domain resource, a corresponding relationship between the time domain resource and a beam, a frequency domain resource, a frequency domain hopping manner, a channel reciprocity indication, data, a beam switching indication, or a transmission mode switching indication;
wherein the indication signaling comprises at least one of: physical layer downlink control information (DCI) signaling, or higher-layer radio resource control (RRC) signaling; or
wherein the information type comprises at least one of: control information, data, a reference signal, or a traffic type; or
wherein the beam type comprises: a single-beam type and a multi-beam type; or
wherein the predefined information is determined in at least one of following manners: the predefined information is predefined, the predefined information is pre-agreed by a base station and a user equipment (UE), the predefined information is indicated through physical layer downlink control information (DCI) signaling, or the predefined information is configured through higher-layer radio resource control (RRC) signaling.

5. The method of claim 1, wherein in a case where the transmission device performs the LBT mechanism on a plurality of directional beams, the method comprises:
performing Cat2 LBT simultaneously on the plurality of directional beams; or
performing Cat4 LBT on one or more main directional beam of the plurality of directional beams, and when the LBT process is about to be completed, starting performing Cat2 LBT on other directional beams; or
performing the Cat4 LBT on the plurality of directional beams.

6. The method of claim 5, wherein the main directional beam of the plurality of directional beams is determined in one of following manners:
the main directional beam is determined by a base station, the main directional beam is determined by a user equipment (UE), the main directional beam is determined by the base station and the UE, the main directional beam is predefined, the main directional beam is indicated through physical layer downlink control information (DCI) signaling, or the main directional beam is indicated through higher-layer radio resource control (RRC) signaling.

7. The method of claim 1, wherein in a case where the transmission device performs transmission according to the directional mode, performing the LBT mechanism before performing the transmission according to the directional mode comprises:

determining signal energy received by the transmission device in the directional beam;

in a case of the signal energy received in the directional beam being not greater than a predetermined threshold value, determining that the at least one channel in the directional beam is idle; or in a case of the signal energy received in the directional beam being greater than the predetermined threshold value, determining that the at least one channel in the directional beam is busy.

8. The method of claim 7, wherein determining the signal energy received by the transmission device in the directional beam comprises:

signal energy received by the transmission device in a beam range being equal to a norm of a value, wherein the value is multiplying a sum of signals received in the beam range by the transmission device from surrounding devices by a beamforming weight of the transmission device; or the signal energy received by the transmission device in the beam range being equal to a norm of an accumulated sum of the signals received in the beam range by the transmission device from all of the surrounding devices; or the signal energy received by the transmission device in the beam range being equal to $\|V*(H_1*X_1+H_2*X_2+ \ldots +H_n*X_n)\|$ or $\|V*H_1*X_1+V*H_2*X_2+ \ldots V*H_n*X_n\|$, wherein V denotes the beamforming weight, $H_1, H_2, \ldots, H_n$ denote channel matrices between the transmission device and the surrounding devices respectively, $X_1, X_2, \ldots, X_n$ denote transmit signal vectors the surrounding devices of the transmission device respectively, * denotes a product operator, $\| \|$ denotes a norm operator, n is a number of the surrounding devices of the transmission device, $H_i*X_i$ denotes a signal sent by the i-th surrounding device and received by the transmission device, and $V*H_i*X_i$ denotes a signal sent by the i-th surrounding device and received by the transmission device in the beam range; or the signal energy received by the transmission device in the beam range being equal to an accumulated sum of signal energies received by the transmission device in the beam range from all of the surrounding devices; or the signal energy received by the transmission device in the beam range being equal to $\|V*H_1*X_1\|+\|V*H_2*X_2\|+ \ldots +\|V*H_n*X_n\|$, wherein V denotes the beamforming weight, $H_1, H_2, \ldots, H_n$ denote the channel matrices between the transmission device and the surrounding devices respectively, $X_1, X_2, \ldots, X_n$ denote transmit signal vectors of the surrounding devices of the transmission device, * denotes the product operator, $\| \|$ denotes the norm operator, n is the number of the surrounding devices of the transmission device, $H_i*X_i$ denotes the signal sent by the i-th surrounding device and received by the transmission device, and $V*H_i*X_i$ denotes the signal sent by the i-th surrounding device and received by the transmission device in the beam range.

9. The method of claim 7, wherein in a case where the transmission device performs transmission by using a plurality of directional beams, the method comprises:

determining, according to a sum of signal energies received in the plurality of directional beams, busy/idle states of at least one channel on the plurality of directional beams or busy/idle states of at least one channel in a beam region formed by the plurality of directional beams, wherein in a case where the plurality of directional beams belong to a same antenna element or antenna port, wherein a method for calculating the signal energy received in the beam region formed by the plurality of directional beams comprises:

the signal energy received in the beam region formed by the plurality of directional beams being equal to an accumulated sum of signal energy received by the transmission device in a first beam, signal energy received by the transmission device in a second beam, . . . and signal energy received by the transmission device in an m-th beam; or the signal energy received in the beam region formed by the plurality of directional beams being equal to $\|V^{1}*(H_1*X_1+H_2*X_2+ \ldots +H_n*X_n)\|+\|V^{2}*(H_1*X_1+H_2*X_2+ \ldots +H_n*X_n)\|+ \ldots \|V^{m}*(H_1*X_1+H_2*X_2+ \ldots +H_n*X_n)\|$, wherein $V^1, V^2, \ldots, V^m$ denote beamforming weights of the m beams, $H_1, H_2, \ldots, H_n$ denote the channel matrices between the transmission device and the surrounding devices respectively, $X_1, X_2, \ldots, X_n$ denote the transmit signal vectors of the surrounding device of the transmission device, * denotes the product operator, $\| \|$ denotes the norm operator, n is the number of the surrounding devices of the transmission device, m is the number of the directional beams for transmission of the transmission device, $H_1*X_1$ denotes a signal sent by the j-th surrounding device and received by the transmission device, $V^{i}*H_j*X_j$ denotes a signal sent by the j-th surrounding device and received by the transmission device in the i-th beam range, and $V^{i}*(H_1*X_1+H_2*X_2+ \ldots +H_n*X_n)$ denotes signals sent by the surrounding devices and received in the i-th beam; or the signal energy received in the beam region formed by the plurality of directional beams being equal to a norm of the accumulated sum of the signal energy received by the transmission device in the first beam, the signal energy received by the transmission device in the second beam, . . . and the signal energy received by the transmission device in the m-th beam; or the signal energy received in the beam region formed by the plurality of directional beams being equal to $\|V^{1}*(H_1*X_1+H_2*X_2+ \ldots +H_n*X_n)+V^{2}*(H_1*X_1+H_2*X_2+ \ldots +H_n*X_n)+ \ldots +V^{m}*(H_1*X_1+H_2*X_2+ \ldots +H_n*X_n)\|$ wherein $V^1, V^2, \ldots, V^m$ denote beamforming weights of the m beams, $H_1, H_2, \ldots, H_n$ denote the channel matrices between the transmission device and the surrounding devices, $X_1, X_2, \ldots, X_n$ denote the transmit signal vectors of the surrounding devices of the transmission device, * denotes the product operator, $\| \|$ denotes the norm operator, n is the number of the surrounding devices of the transmission device, m is the number of directional beams for transmission of the transmission device, $H_j*X_j$ denotes the signal sent by the j-th surrounding device and received by the transmission device, $V^{i}*H_j*X_j$ denotes the signal sent by the j-th surrounding device and received by the transmission device in the i-th beam range, and $V^{i}*(H_1*X_1+H_2*X_2+ \ldots +H_n*X_n)$ denotes signals sent by the surrounding devices and received in the i-th beam, or wherein in a case where the plurality of directional beams belong to different antenna elements or antenna ports, a method for calculating the signal energy received in the beam region formed by the plurality of directional beams comprises:

the signal energy received in the beam region formed by the plurality of directional beams being equal to an accumulated sum of signal energy received by the transmission device in a first beam, signal energy received by the transmission device in a second beam, . . . and signal energy received by the transmission device in an m-th beam; or the signal energy received in the beam region formed by the plurality of directional beams being equal to $\|V^1*(H_1^1*X_1+H_2^1*X_2+ \ldots +H_n^1*X_n)\|+\|V^2*(H_1^2*X_1+H_2^2*X_2+ \ldots +H_n^2*X_n)\|+ \ldots \|V^m*(H_1^m*X_1+H_2^m*X_2+ \ldots +H_n^m*X_n)\|$, wherein $V^1, V^2, \ldots, V^m$ denote beamforming weights of the m beams, $H_1^i, H_2^i, \ldots, H_n^i$ denote the channel matrices between the transmission device and the n surrounding devices on the i-th beam, $X_1, X_2, \ldots, X_n$ denote the transmit signal vectors of the surrounding devices of the transmission device, $H_j^i*X_j$ denotes the signal sent by the j-th surrounding device and received by the transmission device, $V^{i*}H_j^i*X_j$ denotes the signal sent by the j-th surrounding device and received by the transmission device in the i-th beam range, $V^{i*}(H_1^i*X_1+H_2^i*X_2+ \ldots +H_n^i X_n)$ denotes signals sent by the n surrounding devices and received by the transmission device in the i-th beam range, $\|V^{i*}(H_1^i*X_1+H_2^i*X_2+ \ldots +H_n^i*X_n)\|$ denotes signal energy received by the transmission device in the i-th beam range from the n surrounding devices, * denotes the product operator, $\|\ \|$ denotes the norm operator, n is the number of the surrounding devices of the transmission device, m is the number of the beams, or the signal energy received in the beam region formed by the plurality of directional beams being equal to a norm of the accumulated sum of the signal energy received by the transmission device in the first beam, the signal energy received by the transmission device in the second beam, . . . and the signal energy received by the transmission device in the m-th beam; or the signal energy received in the beam region formed by the plurality of directional beams being equal to $\|V^1*(H_1^1*X_1+H_2^1*X_2+ \ldots +H_n^1*X_n)+V^2*(H_1^2*X_1+H_2^2*X_2+ \ldots +H_n^2*X_n)+ \ldots +V^m*(H_1^m*X_1+H_2^m*X_2+ \ldots +H_n^m*X_n)\|$, wherein $V^1, V^2, \ldots, V_m$ denote beamforming weights of the m beams, $H_1^i, H_2^i, \ldots, H_n^i$ denote the channel matrices between the transmission device and the n surrounding devices on the i-th beam, $X_1, X_2, \ldots, X_n$ denote the transmit signal vectors of the surrounding devices of the transmission device, $H_j^i*X_i$ denotes the signal sent by the j-th surrounding device and received by the transmission device, $V^{i*}H_j^i*X_1$ denotes the signal sent by the j-th surrounding device and received by the transmission device in the i-th beam range, $V^{i*}(H_1^i*X_1+H_2^i*X_2+ \ldots +H_n^i*X_n)$ denotes signals sent by the n surrounding devices and received by the transmission device in the i-th beam range, * denotes the product operator, $\|\ \|$ denotes the norm operator, n is the number of the surrounding devices of the transmission device, m is the number of the beams;

the signal energy received in the beam region formed by the plurality of directional beams being equal to an accumulated sum of signal energies sent by n1 surrounding devices and received by the transmission device in the first beam, signal energies sent by n2 surrounding devices and received by the transmission device in the second beam, . . . and signal energies sent by nn surrounding devices and received by the transmission device in the m-th beam; or the signal energy received in the beam region formed by the plurality of directional beams being equal to $\|V^1*H_1^1*X_1^1+H_2^1*X_2^1+ \ldots +H_{n1}^1*X_{n1}^1\|+\|V^{2*}(H_1^2*X_1^2+H_2^2*X_2^2+ \ldots +H_{n2}^2*X_{n2}^2)\|+ \ldots \|V^{m*}(H_1^m*X_1^m+H_2^m*X_2^m+ \ldots +H_{nn}^m*X_{nn}^m)\|$, wherein $V^1, V^2, \ldots, V^m$ denote beamforming weights of the m beams, $H_1^i, H_2^i, \ldots, H_{nj}^i$ denote the channel matrices between the transmission device and the nj surrounding devices on the i-th beam, $X_1^i, X_2^i, \ldots, X_{nj}^i$ denote the transmit signal vectors of the nj surrounding devices of the transmission device on the i-th beam, $H_{nj}^i*X_{nj}^i$ denotes a signal sent by a nj-th surrounding device and received by the transmission device, $V^{i*}H_{nj}^i*X_{nj}^i$ denote a signal sent by the nj-th surrounding device and received by the transmission device in the i-th beam range, $V^{i*}(H_1^i*X_1^i+H_2^i*X_2^i+ \ldots +H_{nj}^i*X_{nj}^i)$ denotes signals sent by the nj surrounding devices and received by the transmission device in the i-th beam range, $\|V^{i*}(H_1^i*X_1^i+H_2^i*X_2^i+ \ldots +H_{nj}^i*X_{nj}^i)\|$ denotes the signal energies sent by the nj surrounding devices and received by the transmission device in the i-th beam range, * denotes the product operator, $\|\ \|$ denotes the norm operator, nj is the number of the surrounding devices of the transmission device, m is the number of the beams; or the signal energy received in the beam region formed by the plurality of directional beams being equal to a norm of an accumulated sum of signals sent by the n1 surrounding devices and received by the transmission device in the first beam, signals sent by the n2 surrounding devices and received by the transmission device in the second beam, . . . and signals sent by the nn surrounding devices and received by the transmission device in the m-th beam; or the signal energy received in the beam region formed by the plurality of directional beams being equal to $\|V^1*(H_1^1*X_1^1+H_2^1*X_2^1+ \ldots +H_{n1}^1*X_{n1}^1)+V^{2*}(H_1^2*X_1^2+H_2^2*X_2^2+ \ldots +H_{n1}^2*X_{n1}^2)+ \ldots +V^{m*}(H_1^m*X_1^m+H_2^m*X_2^m+ \ldots +H_{nn}^m*X_{nn}^m)\|$, wherein $V^1, V^2, \ldots, V^m$ denote beamforming weights of the m beams, $H_1^i, H_2^i, \ldots, H_{nj}^i$ denote the channel matrices between the transmission device and the nj surrounding devices on the i-th beam, $X_1^i, X_2^i, \ldots, X_{nj}^i$ denote the transmit signal vectors of the nj surrounding devices of the transmission device on the i-th beam, $H_{nj}^i*X_{nj}^i$ denotes the signal sent by the nj-th surrounding device and received by the transmission device, $V^{i*}H_{nj}^i*X_{nj}^i$ denotes the signal sent by the nj-th surrounding device and received by the transmission device in the i-th beam range, $V^{i*}(H_1^i*X_1^i+H_2^i*X_2^i+ \ldots +H_{nj}^i*X_{nj}^i)$ denotes signals sent by the nj surrounding devices and received by the transmission device in the i-th beam range, * denotes the product operator, $\|\ \|$ denotes the norm operator, nj is the number of the surrounding devices of the transmission device, m is the number of the beams; or the signal energy received in the beam region formed by the plurality of directional beams being equal to as a norm of an accumulated sum of signals sent by the n surrounding devices and received by the transmission device in the first beam, signals sent by the n surrounding devices and received by the transmission device in the second beam, . . . and signals sent by the n surrounding devices and received by the transmission device in the m-th beam; or the signal energy received in the beam region formed by the plurality of directional beams being equal to $\|V^{1*}(H_1^{1*}X_1^1+H_2^{1*}X_2^1+ \ldots +H_n^{1*}X_n^1)+V^{2*}(H_1^{2*}X_1^2+H_2^{2*}X_2^2+ \ldots +H_n^{2*}X_n^2)+ \ldots +V^{m*}(H_1^{m*}X_1^m+H_2^{m*}X_2^m+ \ldots +H_n^{m*}X_n^m)\|$, wherein $V^1, V^2, \ldots, V^m$ denote beamforming weights of the m beams, $H_1^i, H_2^i, \ldots, H_n^i$ denote the channel matrices between the transmission device and the surrounding devices on the i-th beam, $X_1^i, X_2^i, \ldots, X_n^i$ denote the transmit signal vectors of the surrounding devices of the transmission device on the i-th beam, * denotes the product operator, $\|\ \|$ denotes the norm operator, n is the number of the surrounding devices of the transmission device, m is the number of the beams, i is a positive integer within [1, m], $H_j^{i*}X_j^i$ denotes a signal sent by the j-th surrounding device and received by the transmission device on the i-th beam, and $V^{i*}H_j^{i*}X_j^i$ is the signal sent by the j-th surrounding device and received by the transmission device in the i-th beam range.

10. The method of claim 7, wherein in a case where the at least one channel in the plurality of directional beams is detected to be busy, the method comprises:

performing, by the transmission device, an LBT detection on finer directional beams than the directional beam on which the LBT fails; or performing, by the transmission device, the LBT detection on another one of the plurality of directional beams other than the directional beam on which the LBT fails.

11. The method of claim 1, wherein in a case where the transmission device performs transmission by the directional mode with a plurality of directional beams, the method comprises:

determining, according to signal energy received in a beam region formed by the plurality of directional beams, busy/idle states of at least one channel on the plurality of directional beams; or determining, according to the signal energy received in the beam region formed by the plurality of directional beams, busy/idle states of at least one channel in the beam region formed by the plurality of directional beams; or determining, according to signal energy received in each of the plurality of directional beams, busy/idle states of the at least one channel on the plurality of directional beams; or determining, according to the signal energy received in each of the plurality of directional beams, busy/idle states of the at least one channel in the beam region formed by the plurality of directional beams.

12. The method of claim 11, wherein determining, according to the signal energy received in each of the plurality of directional beams, the busy/idle states of the at least one channel on the plurality of directional beams, or determining, according to the signal energy received in each of plurality of directional beams, busy/idle states of the at least one channel in the beam region formed by the plurality of directional beams comprises:

if the LBT is successfully performed on at least one of the plurality of directional beams, determining that the plurality of directional beams are available or that the at least one channel is idle, and performing transmission only on the directional beam on which the LBT is successfully performed; or if the LBT is successfully performed on all of the plurality of directional beams, determining that the plurality of directional beams are available or that the at least one channel is idle; or if the LBT fails on at least one of the plurality of directional beams, determining that the plurality of directional beams are not available or that the at least one channel is busy; or if a number of directional beams, among the plurality of directional beams, on which the LBT is successfully performed reaches a predetermined threshold value, determining that the plurality of directional beams are available or that the at least one channel is idle, and performing transmission only on the directional beam on which the LBT is successfully performed; or if a number of directional beams, among the plurality of directional beams, on which the LBT fails reaches a predetermined threshold value, determining that the plurality of directional beams are not available or that the at least one channel is busy.

13. The method of claim 11, further comprising:

when signal energy received in a beam coverage range formed by the plurality of directional beams or in each of the plurality of directional beams is not greater than a predetermined threshold value, determining that at least one channel in a beam formed by the plurality of directional beams or in each of the plurality of directional beams is idle or that at least one channel in the plurality of directional beams is idle; or when the signal energy received in the beam coverage range formed by the plurality of directional beams or in each of the plurality of directional beams is greater than the predetermined threshold value, determining that the at least one channel in the beam formed by the plurality of directional beams or in each of the plurality of directional beams is busy or that the at least one channel in the plurality of directional beams is busy.

14. A data receiving method, comprising:

acquiring predefined information; and performing, based on the predefined information, information reception processing according a directional mode;

wherein the directional mode comprises at least one of: a directional transmit beam; or a directional receive beam;

wherein for one reception device, a relationship between the directional transmit beam and the directional receive beam comprises:

the directional transmit beam being the same as the directional receive beam; or the directional transmit beam being different from the directional receive beam; or the directional transmit beam partially overlapping the directional receive beam;

wherein the relationship between the directional transmit beam and the directional receive beam is determined in at least one of following manners:

predefinition; pre-agreement between a base station and a user equipment (UE); indication through physical layer downlink control information (DCI) signaling; or configuration through higher-layer radio resource control (RRC) signaling;

wherein whether a reception device performs a listen-before-talk (LBT) mechanism before receiving information according to the directional mode is determined in one of following manners: predefinition; pre-agreement between a sending device and a reception device;

indication through physical layer downlink control information (DCI) signaling; or indication through higher-layer radio resource control (RRC) signaling.

15. The method of claim 14, wherein before the reception device performs the information reception processing, the method comprises:
  performing the LBT mechanism, or interference measurement; and
  performing predetermined processing based on an LBT result or an interference measurement result,
  wherein performing the predetermined processing based on the LBT result or the interference measurement result comprises:
  in a case where the LBT fails or succeeds, reporting the LBT result to a transmission device on a sending side; or
  in the case where the LBT fails or succeeds, sending an indication signal to the transmission device on the sending side; or
  in a case where the interference measurement result meets a predetermined threshold, reporting the interference measurement result to the transmission device; or
  in the case where the interference measurement result meets the predetermined threshold, sending an indication signal to the transmission device, or wherein performing the predetermined processing based on the LBT result or the interference measurement result comprises:
  in a case where the LBT fails, performing, by the reception device, a reception mode switching operation; or
  in a case where the interference measurement result meets a predetermined threshold, performing, by the reception device, the reception mode switching operation; or
  in a case where the LBT fails and a transmission mode switching indication is enabled, performing, by the reception device, the reception mode switching operation; or
  in a case where the interference measurement result meets the predetermined threshold and the transmission mode switching indication is enabled, performing, by the reception device, the reception mode switching operation.

16. A data reception apparatus, comprising: a processor and a memory, wherein the processor is configured to execute instructions in the memory, and the instructions comprises instructions for executing the data receiving method of claim 14.

17. The method of claim 14, wherein in a case where a reception device performs signal reception processing by the directional mode with a plurality of directional beams, the method comprises:
  determining, according to signal energy received in a beam region formed by the plurality of directional beams, busy/idle states of at least one channel on the plurality of directional beams; or
  determining, according to the signal energy received in the beam region formed by the plurality of directional beams, busy/idle states of at least one channel in the beam region formed by the plurality of directional beams; or
  determining, according to signal energy received in each of the plurality of directional beams, busy/idle states of the at least one channel on the plurality of directional beams; or
  determining, according to the signal energy received in each of the plurality of directional beams, busy/idle states of the at least one channel in the beam region formed by the plurality of directional beams.

18. A data transmission apparatus, comprising: a processor and a memory, wherein the processor is configured to execute instructions in the memory, wherein the instructions comprise:
  instructions for obtaining predefined information;
  instructions for determining, according to the predefined information, whether to perform a listen-before-talk (LBT) mechanism before transmission; and
  instructions for: upon LBT indication information being carried in the predefined information, performing the LBT mechanism before a transmission device performs transmission according to a directional mode; or
  upon the LBT indication information being not carried in the predefined information, performing a predetermined non-LBT processing operation before the transmission device performs the transmission according to the directional mode;
  wherein the directional mode comprises at least one of: a directional transmit beam, or a directional receive beam;
  wherein for one transmission device, a relationship between the directional transmit beam and the directional receive beam comprises:
  the directional transmit beam being the same as the directional receive beam; or
  the directional transmit beam being different from the directional receive beam; or
  the directional transmit beam partially overlapping the directional receive beam;
  wherein the relationship between the directional transmit beam and the directional receive beam is determined in at least one of following manners:
  predefinition; pre-agreement between a base station and a user equipment (UE); indication through physical layer downlink control information (DCI) signaling; or configuration through higher-layer radio resource control (RRC) signaling.

* * * * *